Dec. 24, 1940.  J. P. BENOIT ET AL  2,225,899
MACHINE FOR MOLDING GLASS ARTICLES
Filed April 15, 1937  49 Sheets-Sheet 1

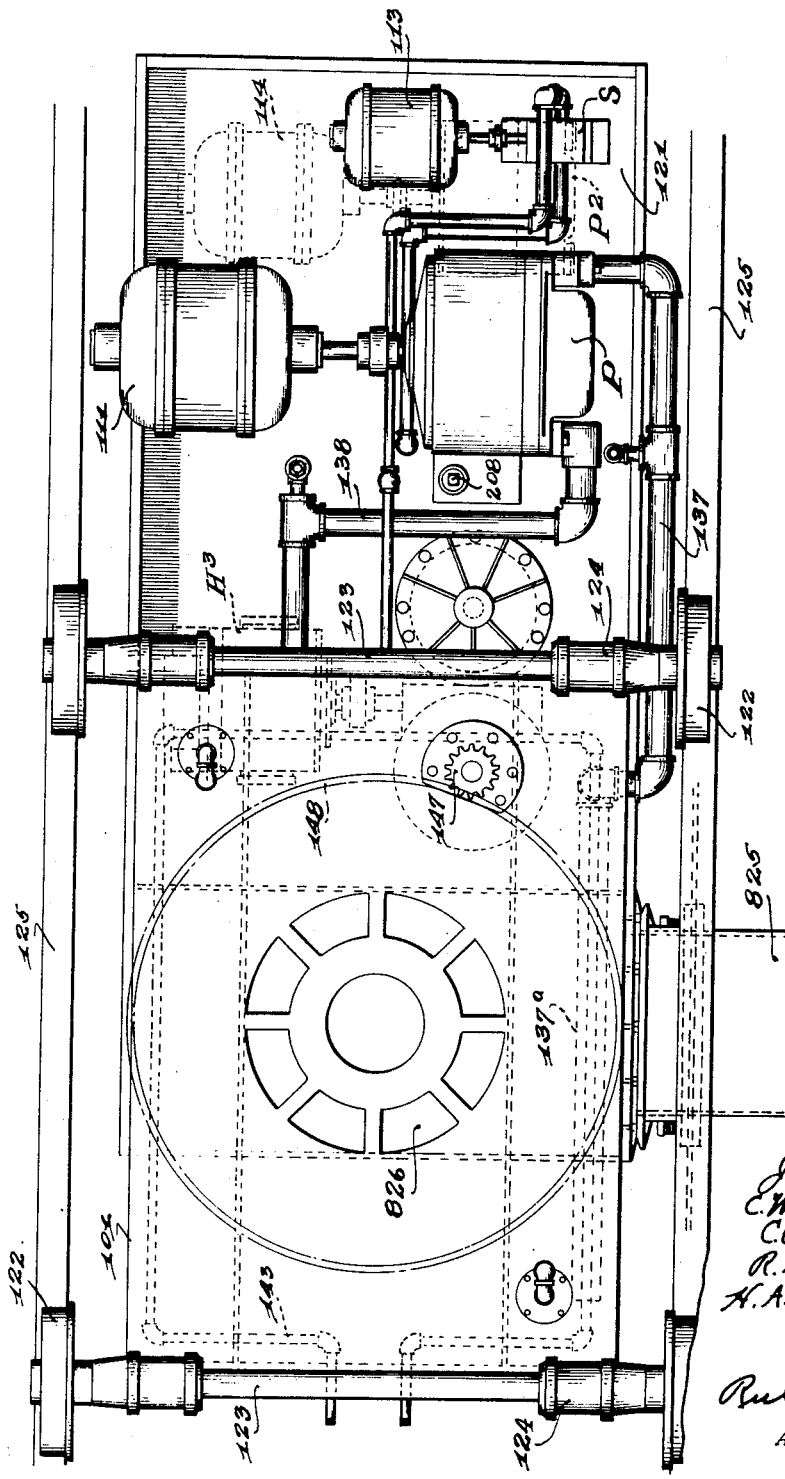

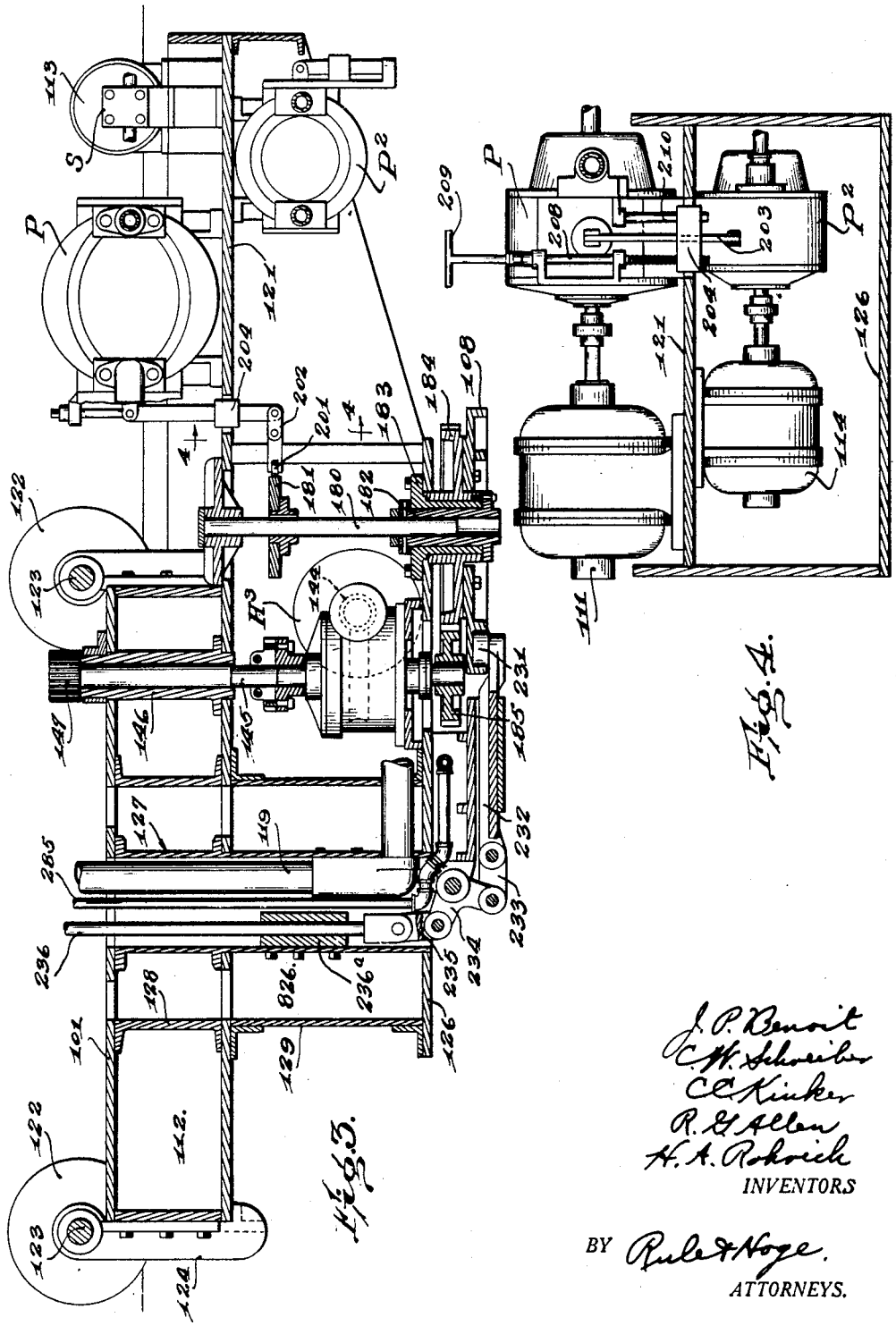

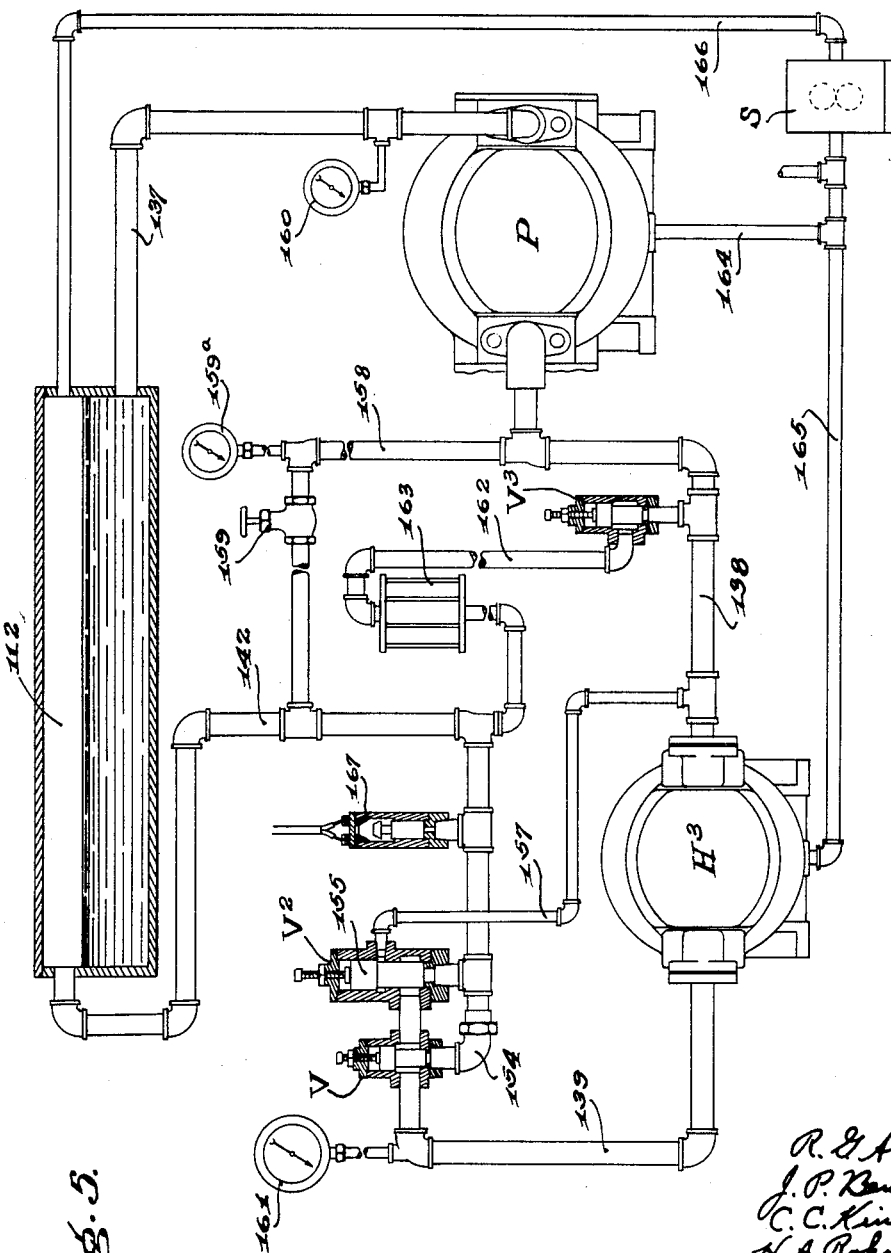

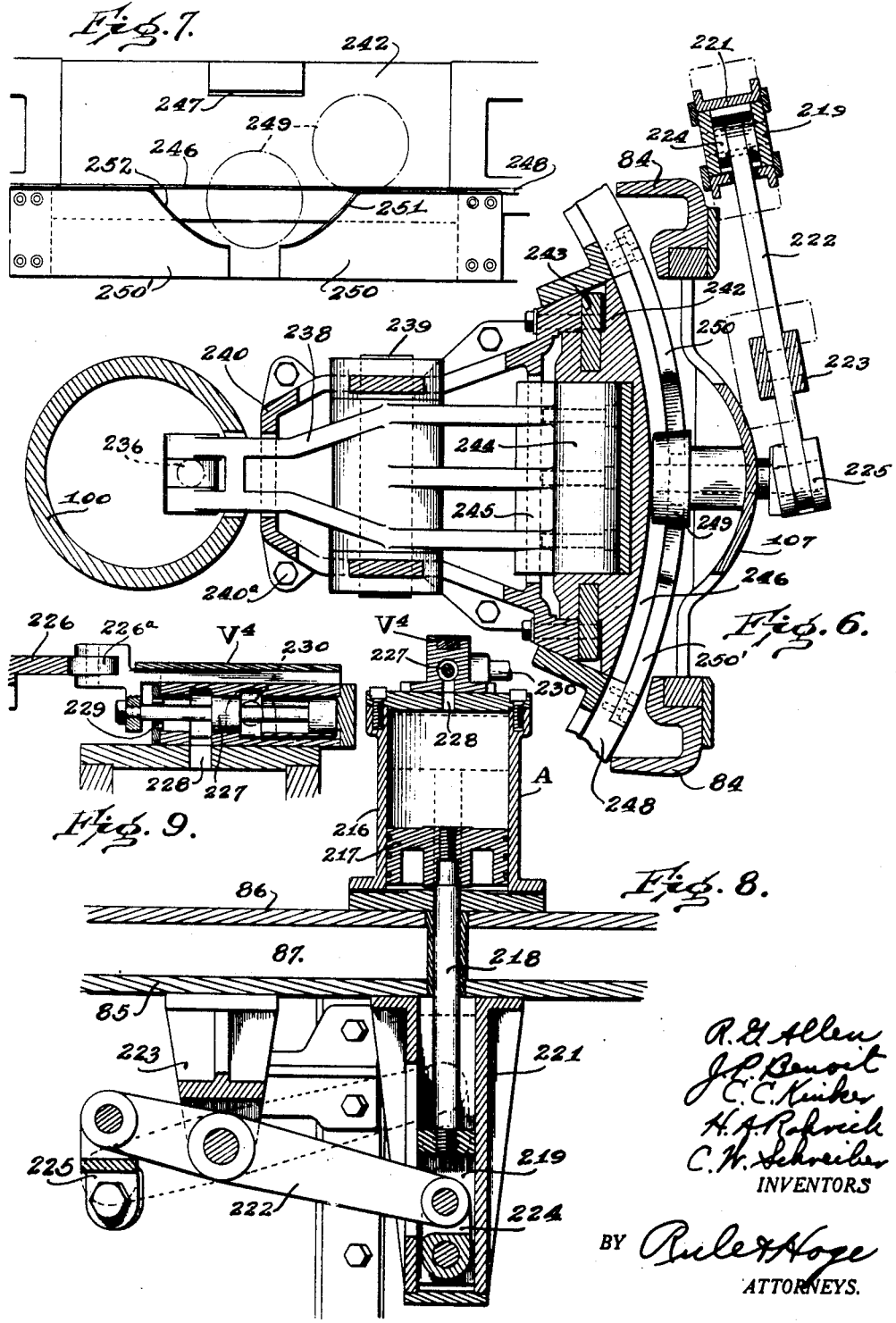

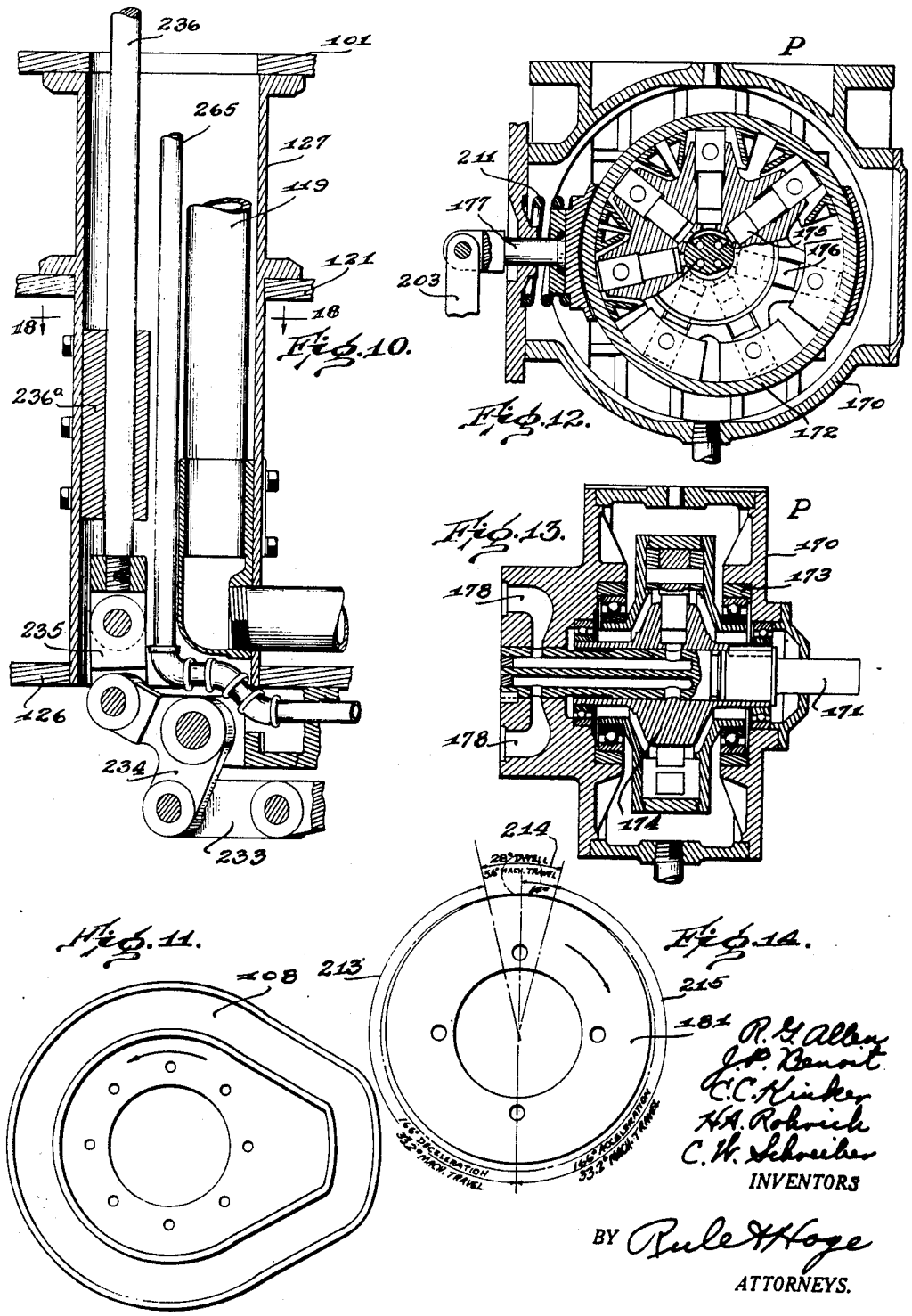

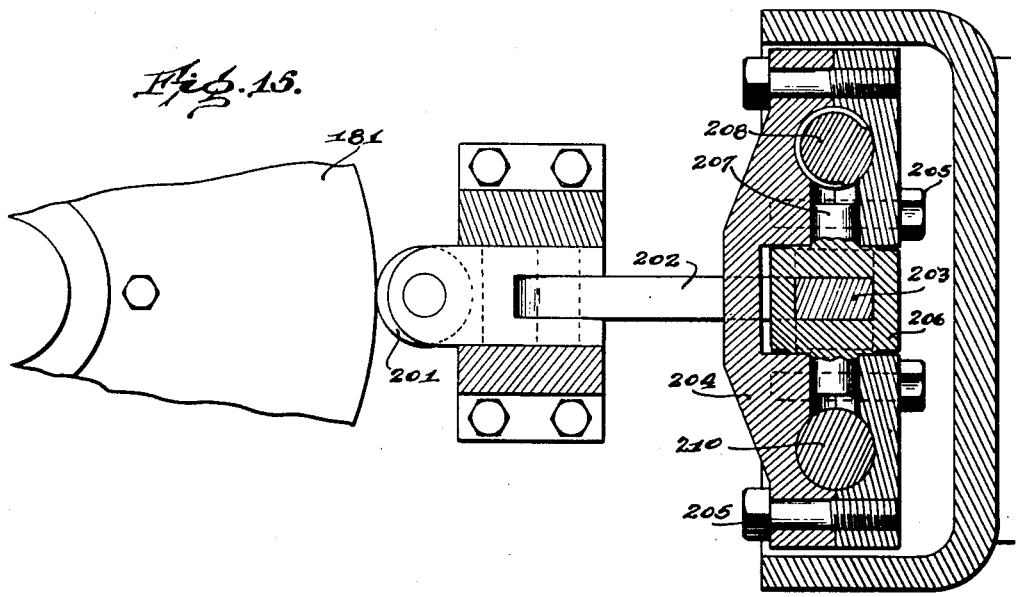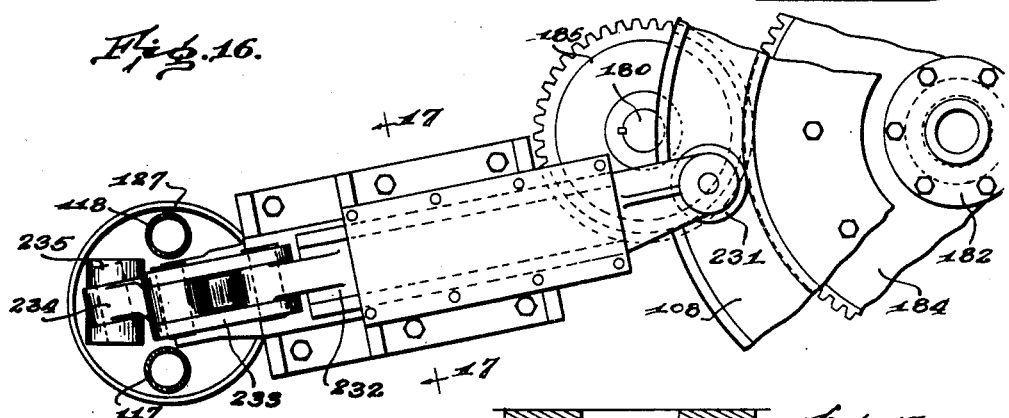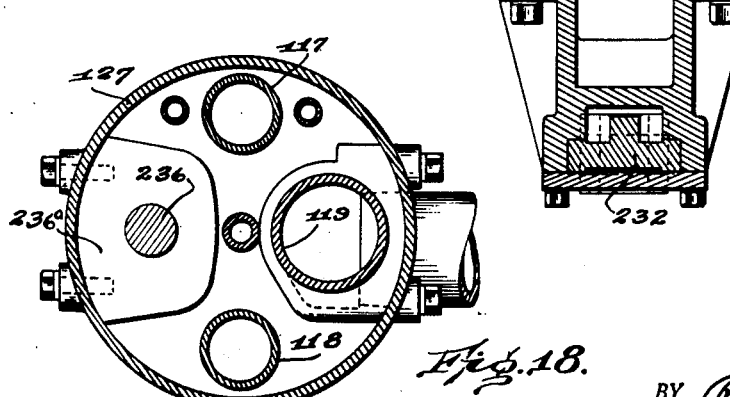

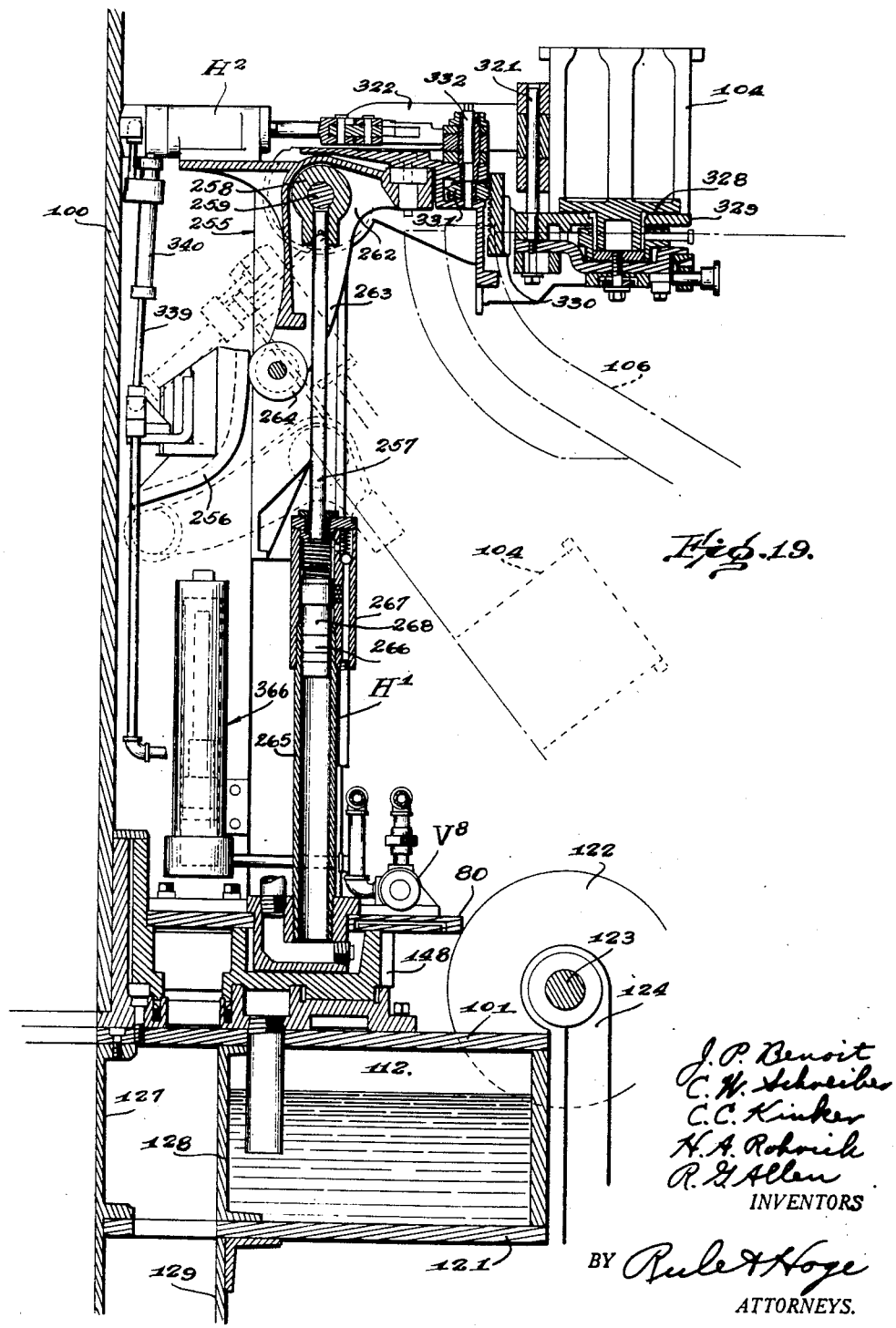

Dec. 24, 1940.   J. P. BENOIT ET AL   2,225,899
MACHINE FOR MOLDING GLASS ARTICLES
Filed April 15, 1937   49 Sheets-Sheet 9

J. P. Benoit
C. H. Schreiber
C. C. Kinker
H. A. Rohrich
R. G. Allen
INVENTORS

BY Rule & Hoge
ATTORNEYS.

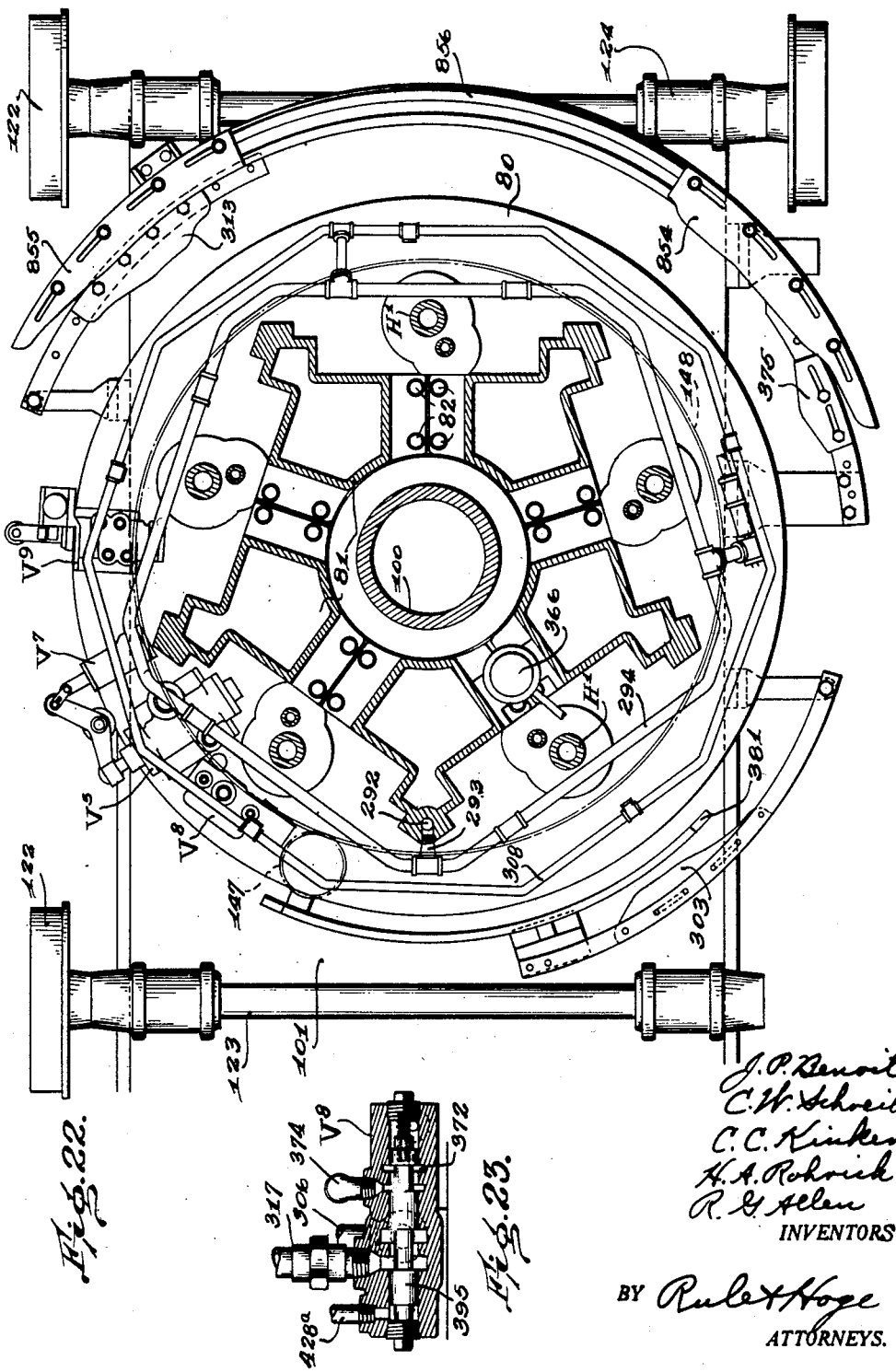

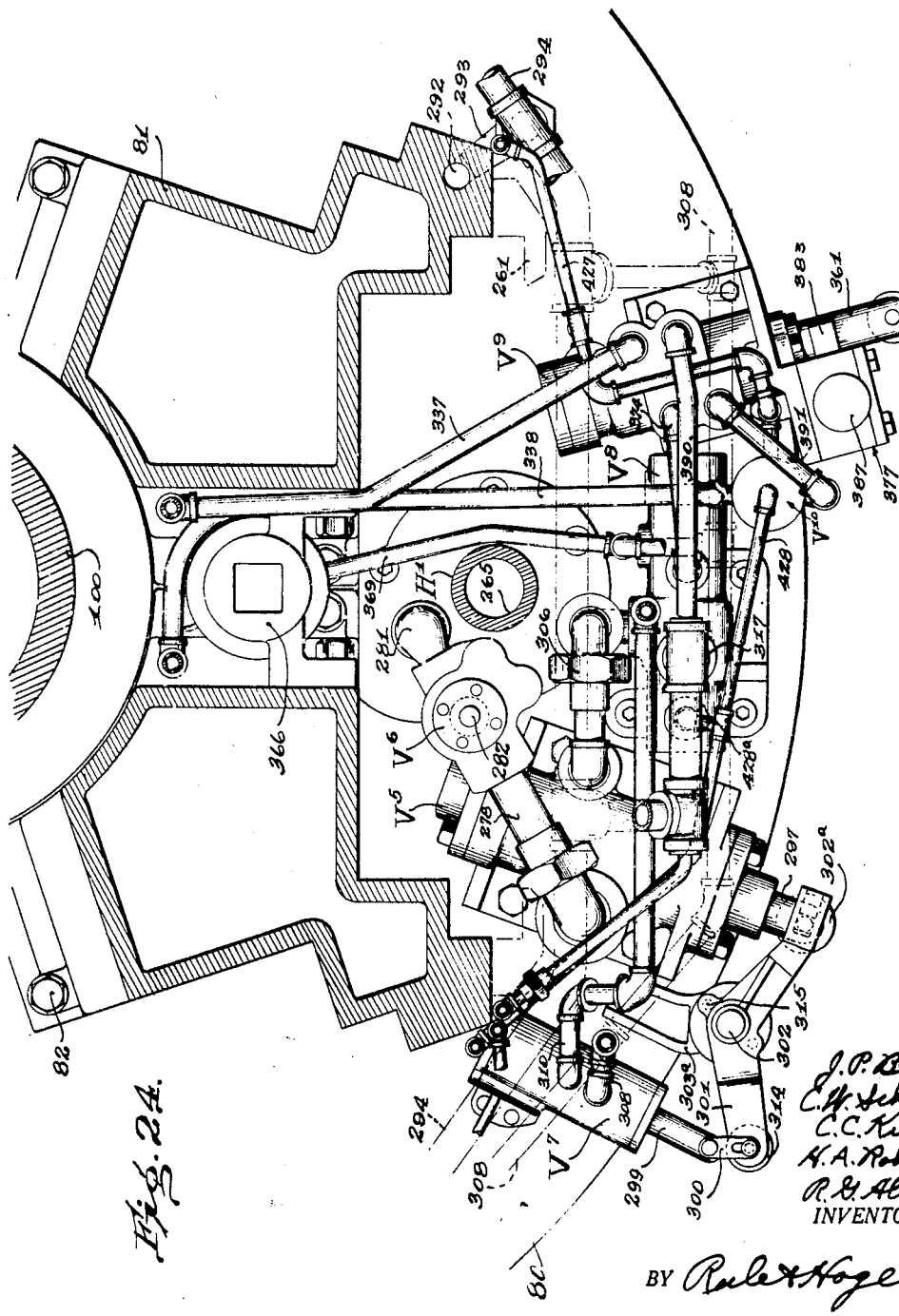

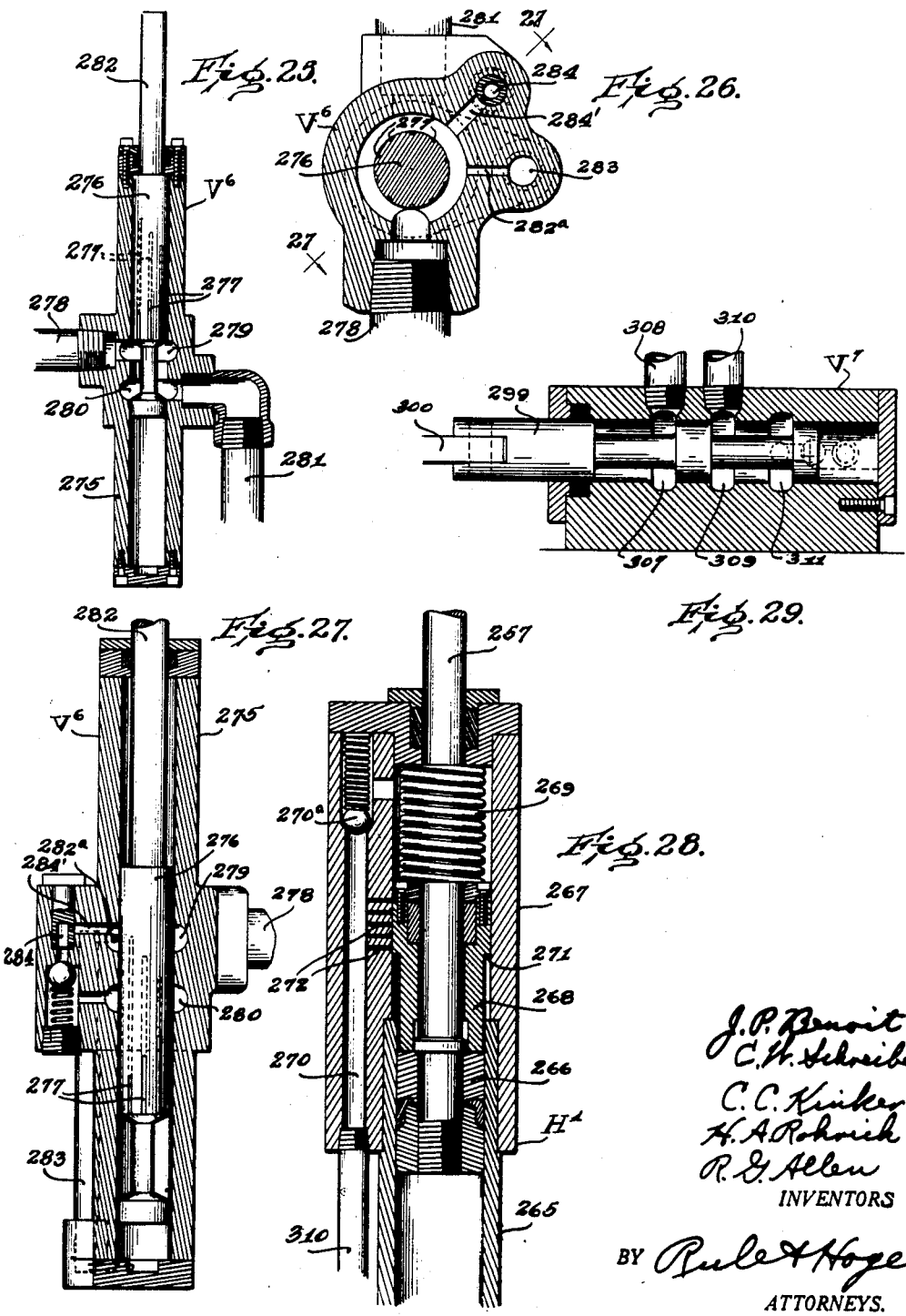

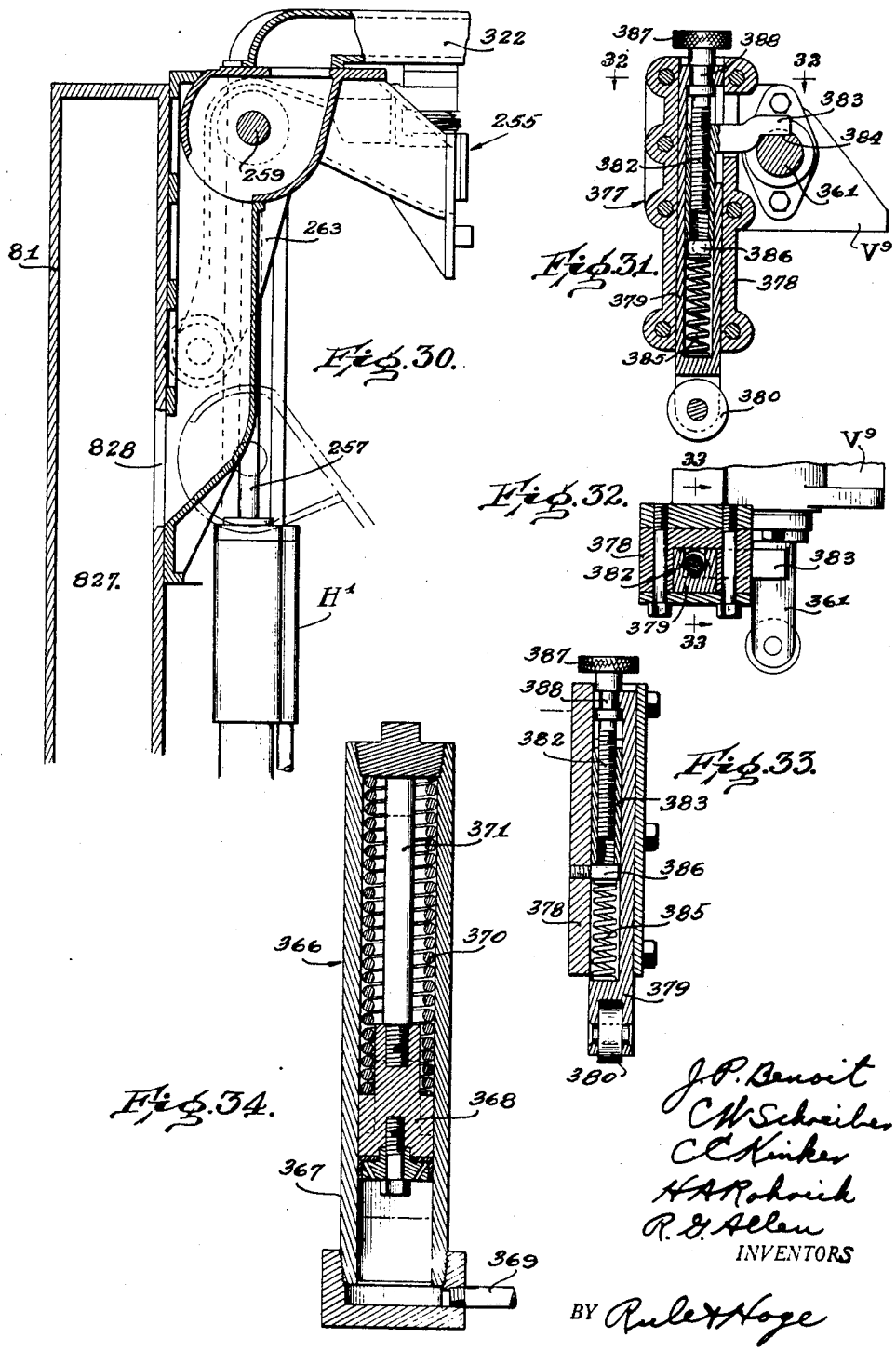

Dec. 24, 1940.    J. P. BENOIT ET AL    2,225,899
MACHINE FOR MOLDING GLASS ARTICLES
Filed April 15, 1937    49 Sheets-Sheet 14
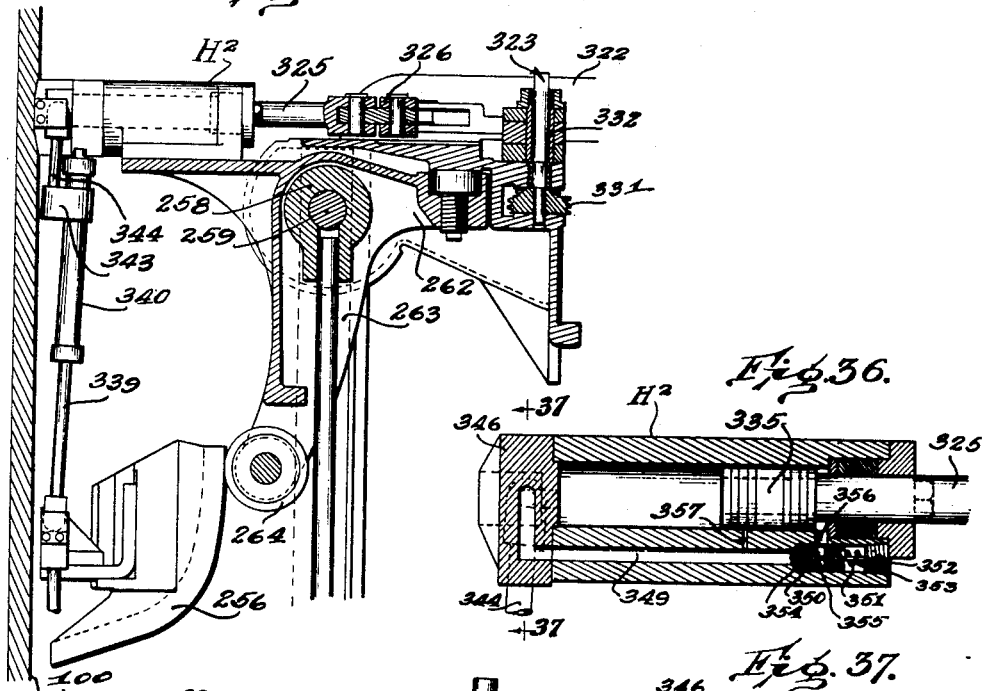
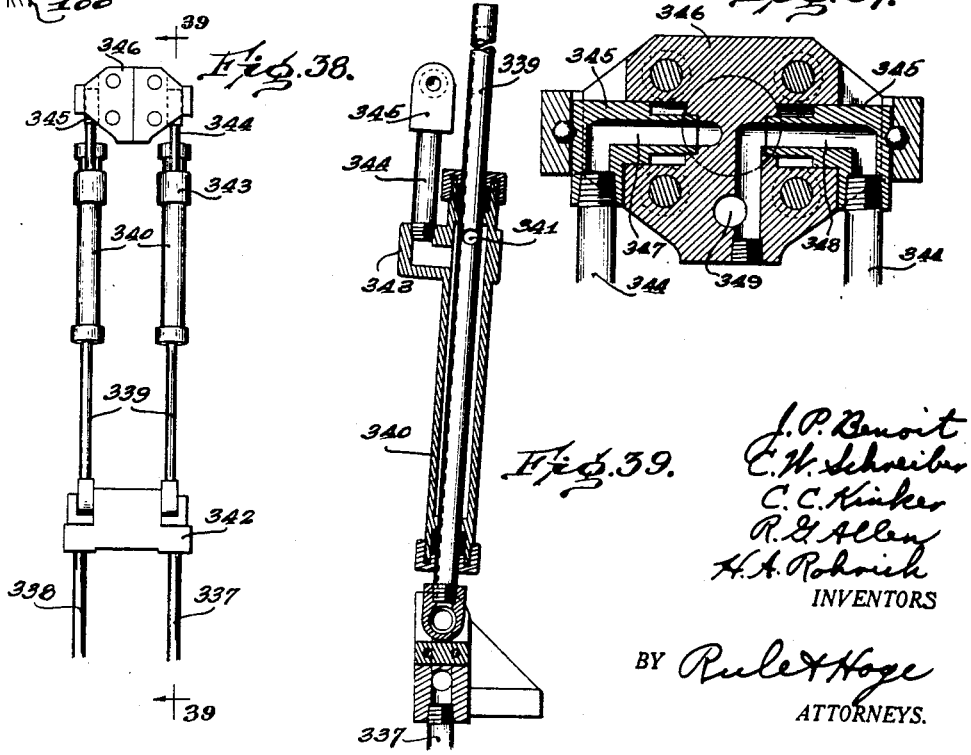

Dec. 24, 1940.  J. P. BENOIT ET AL  2,225,899
MACHINE FOR MOLDING GLASS ARTICLES
Filed April 15, 1937  49 Sheets-Sheet 15
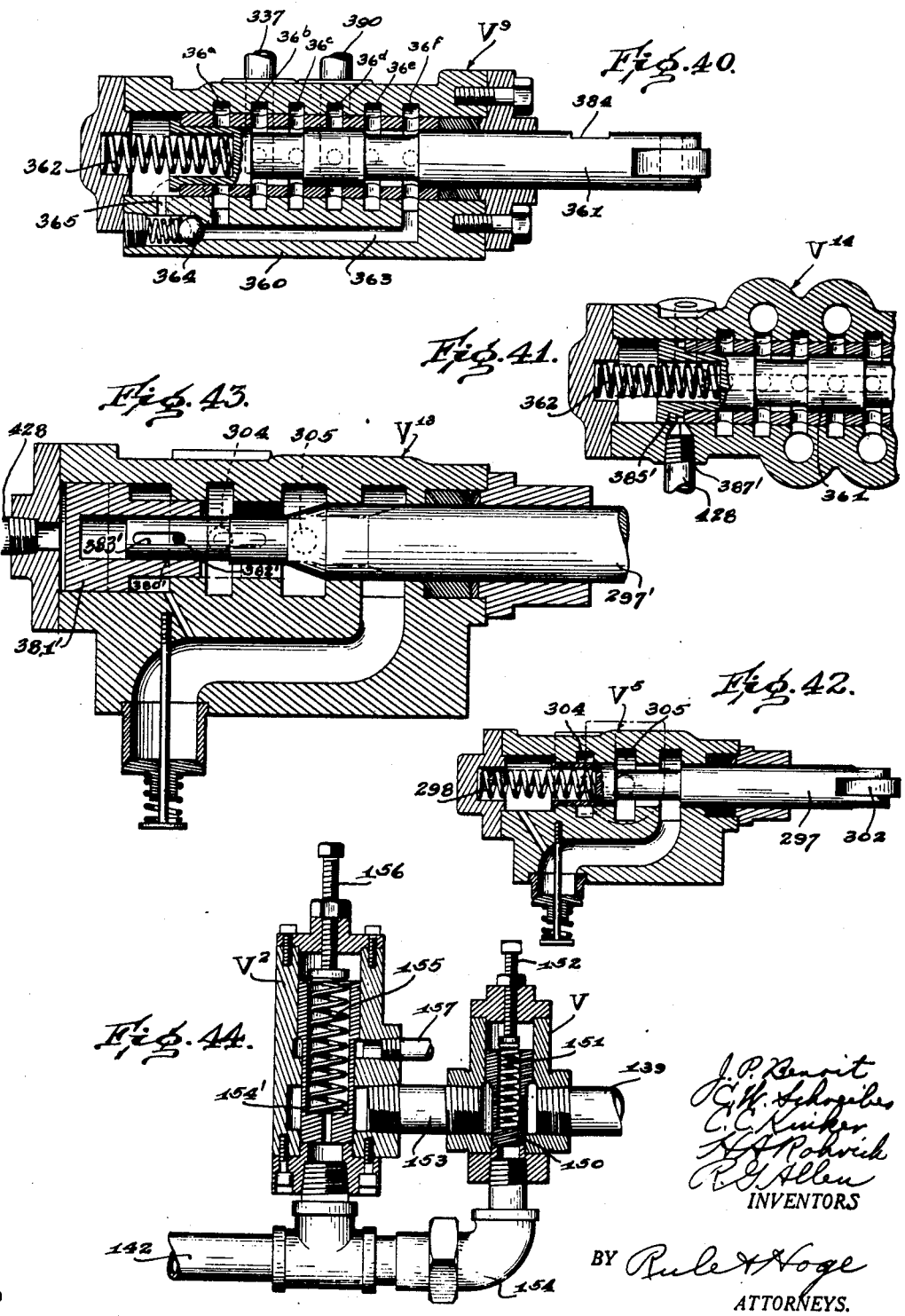

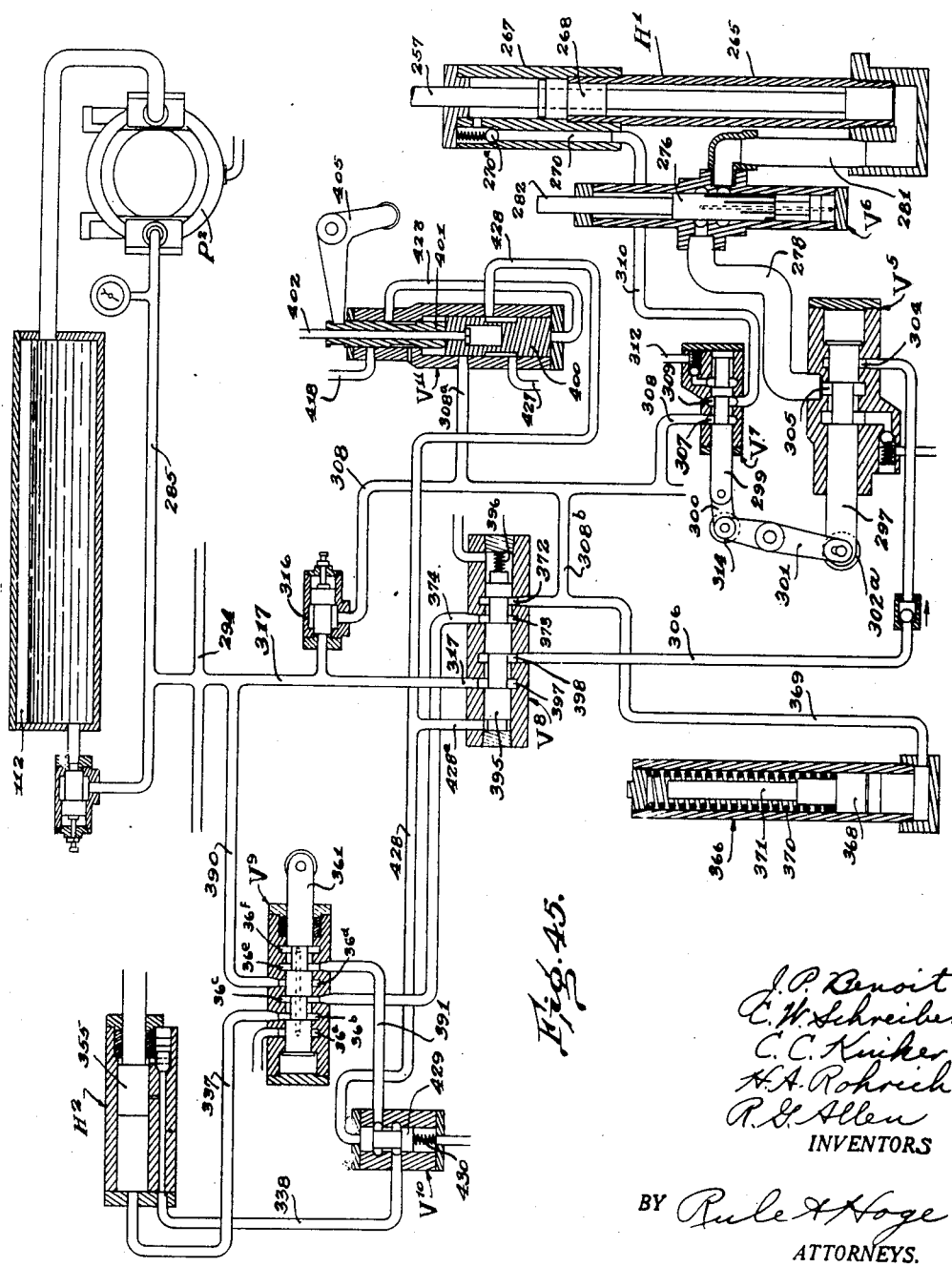

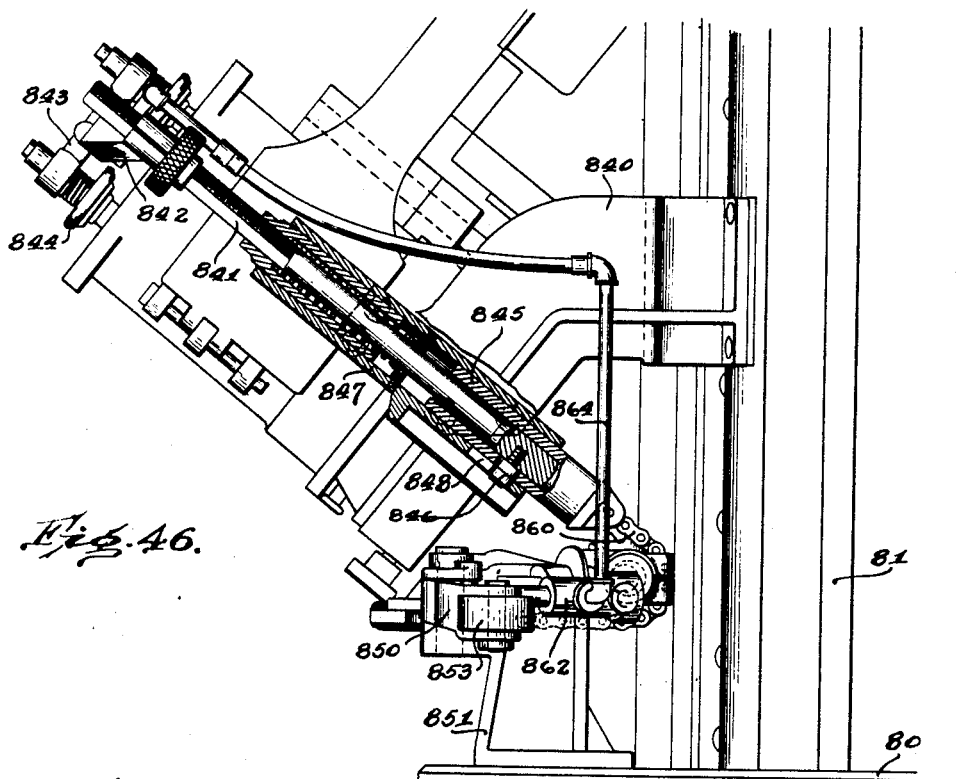
Fig. 46.
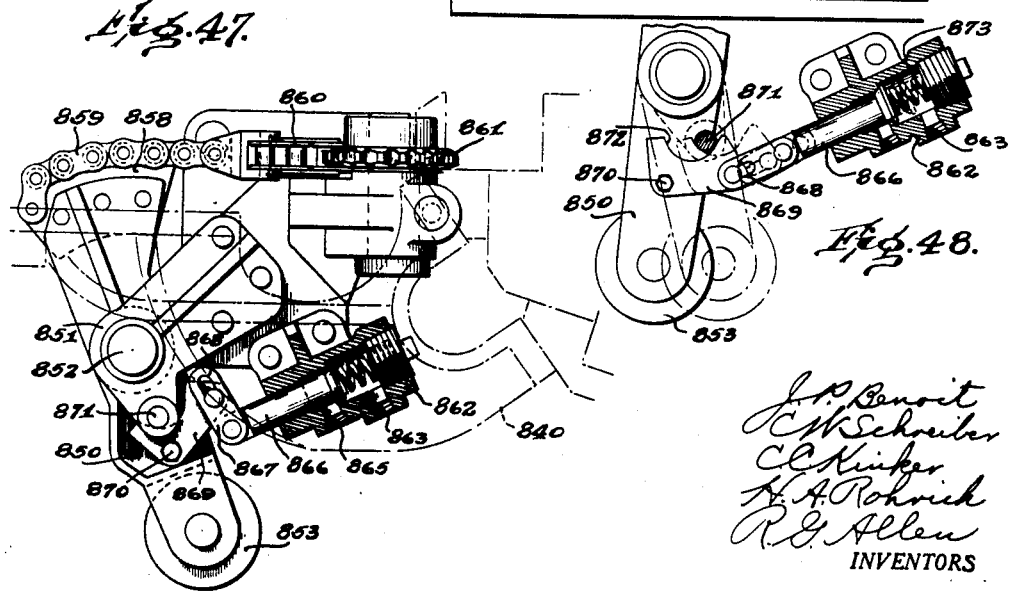
Fig. 47.
Fig. 48.

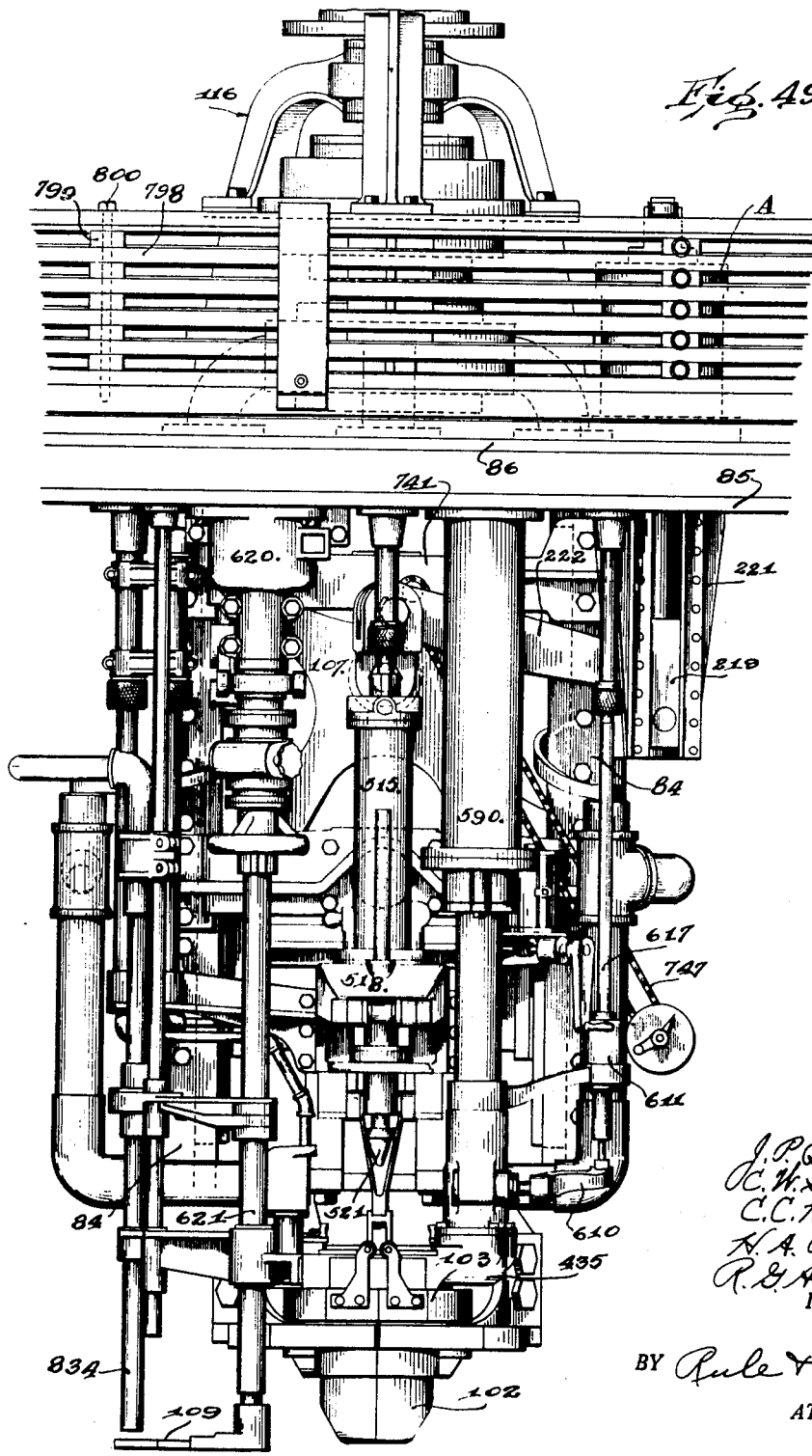

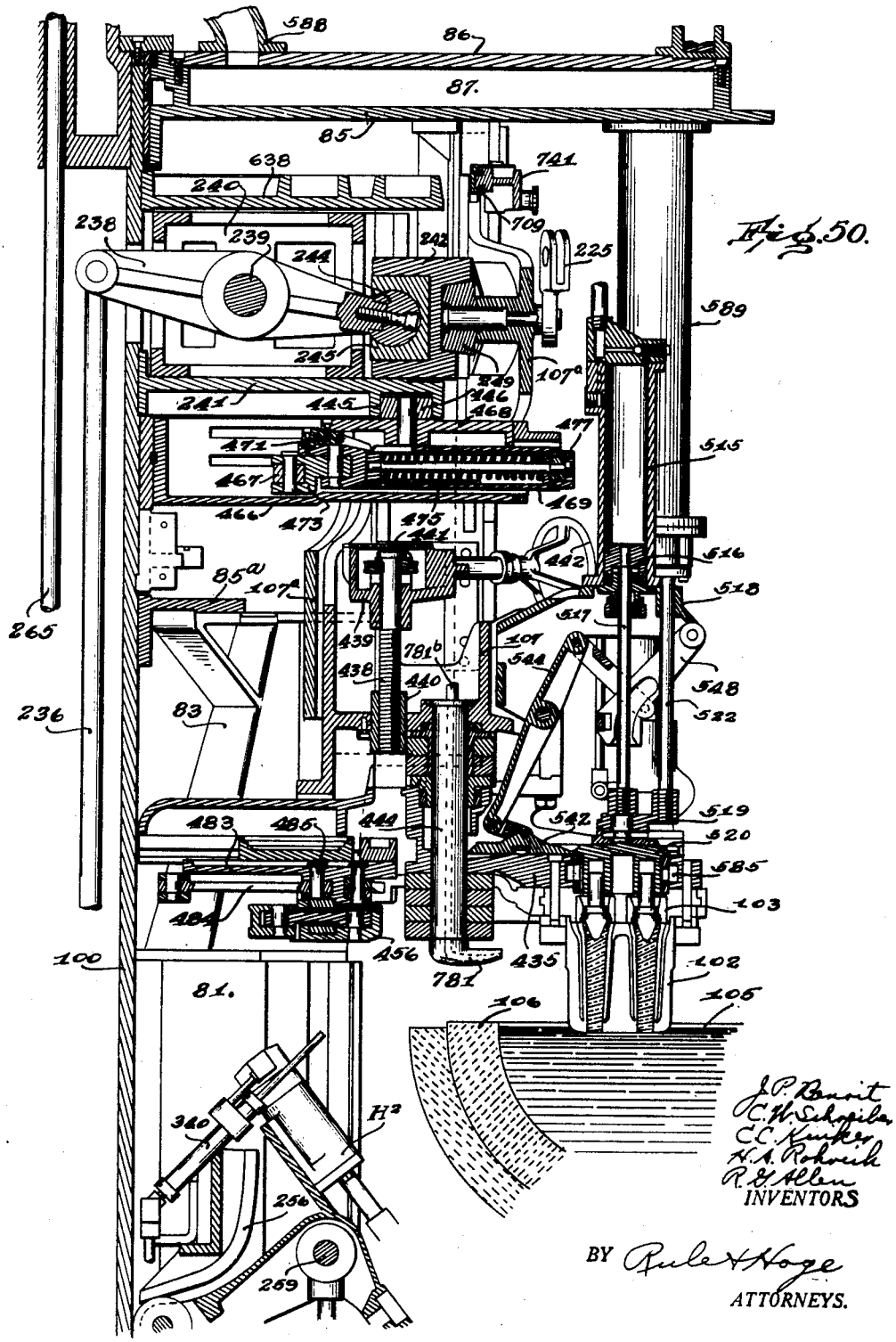

Dec. 24, 1940. J. P. BENOIT ET AL 2,225,899
MACHINE FOR MOLDING GLASS ARTICLES
Filed April 15, 1937 49 Sheets-Sheet 20
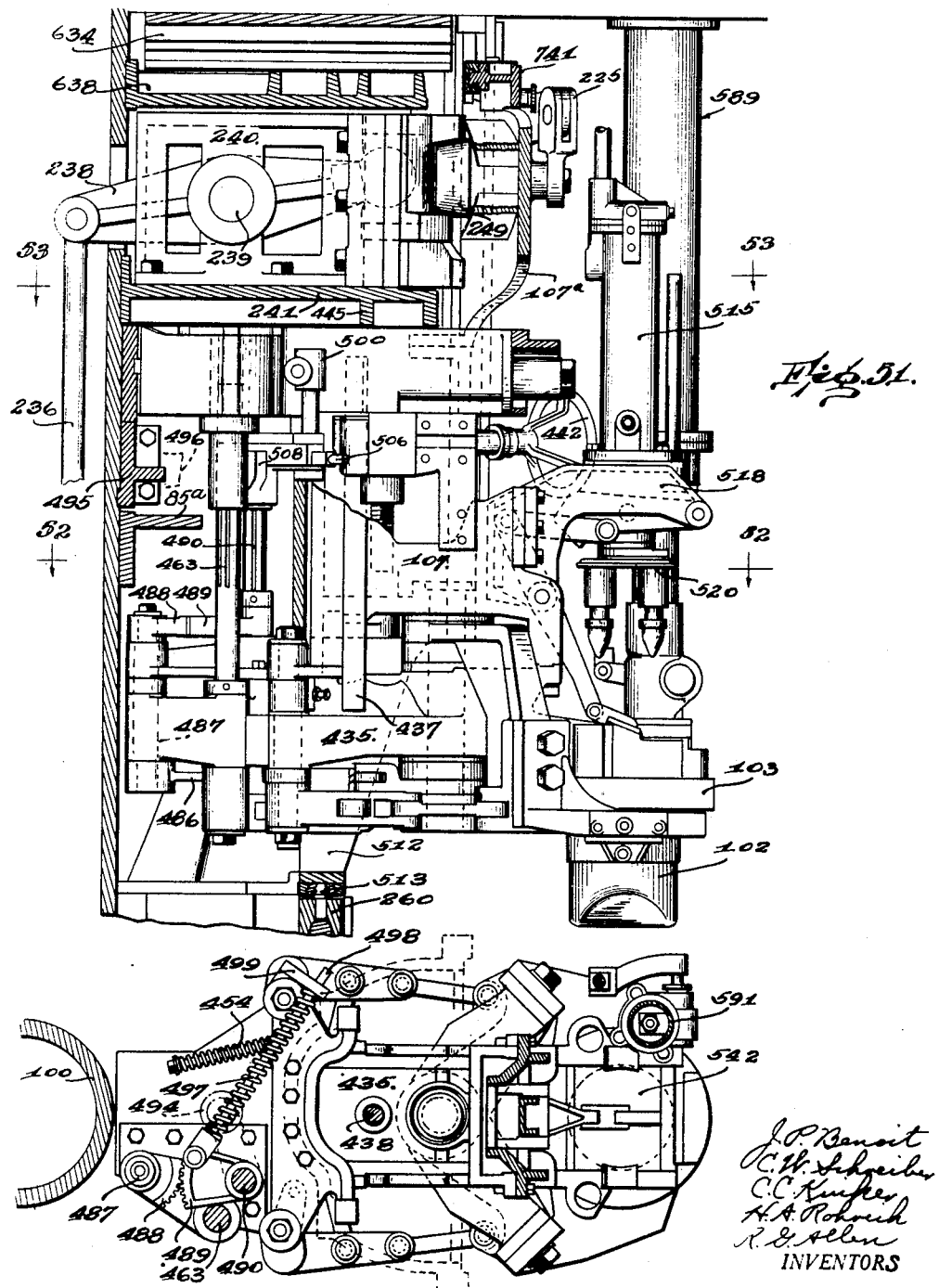

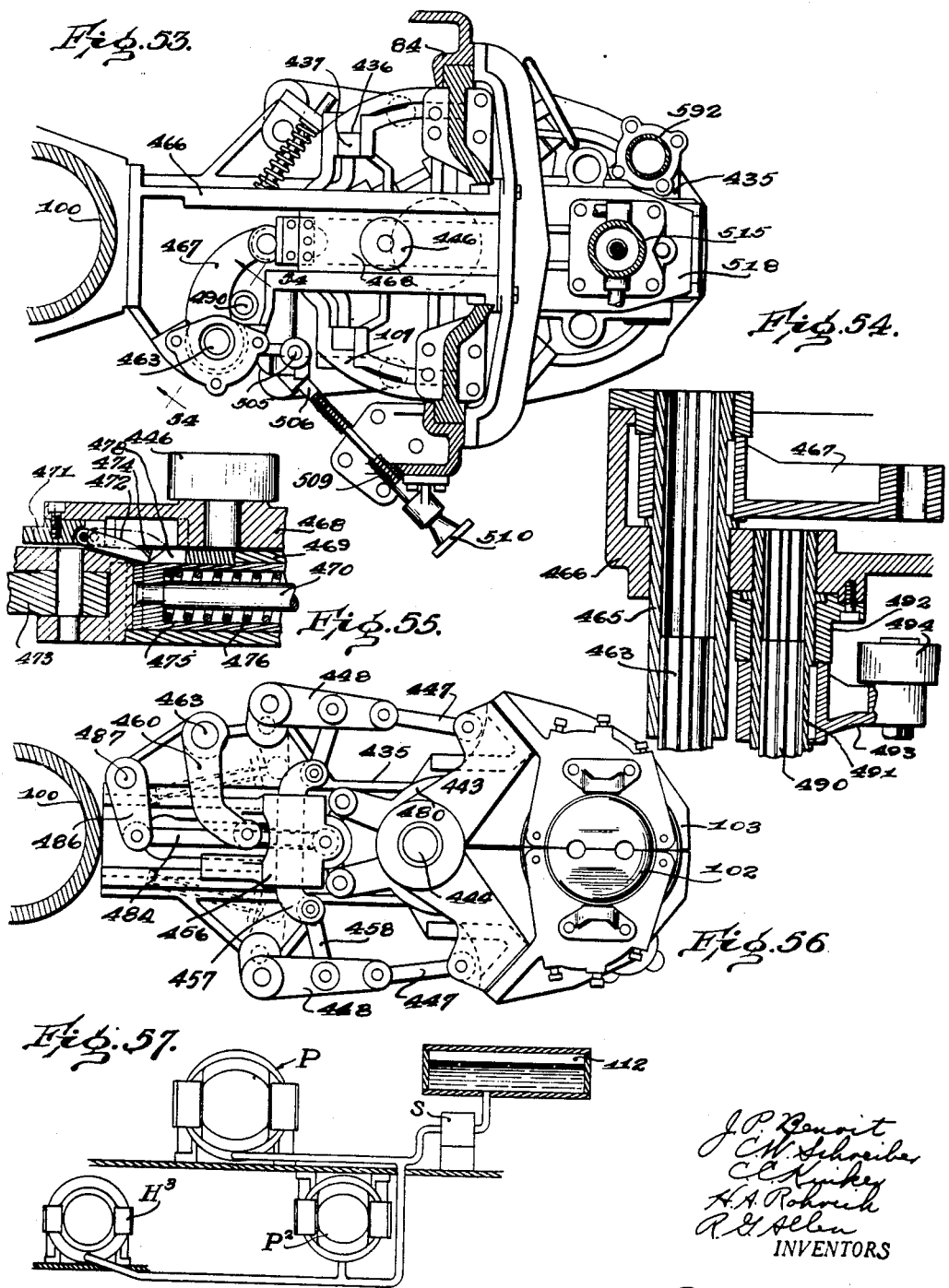

Dec. 24, 1940.  J. P. BENOIT ET AL  2,225,899
MACHINE FOR MOLDING GLASS ARTICLES
Filed April 15, 1937   49 Sheets-Sheet 22
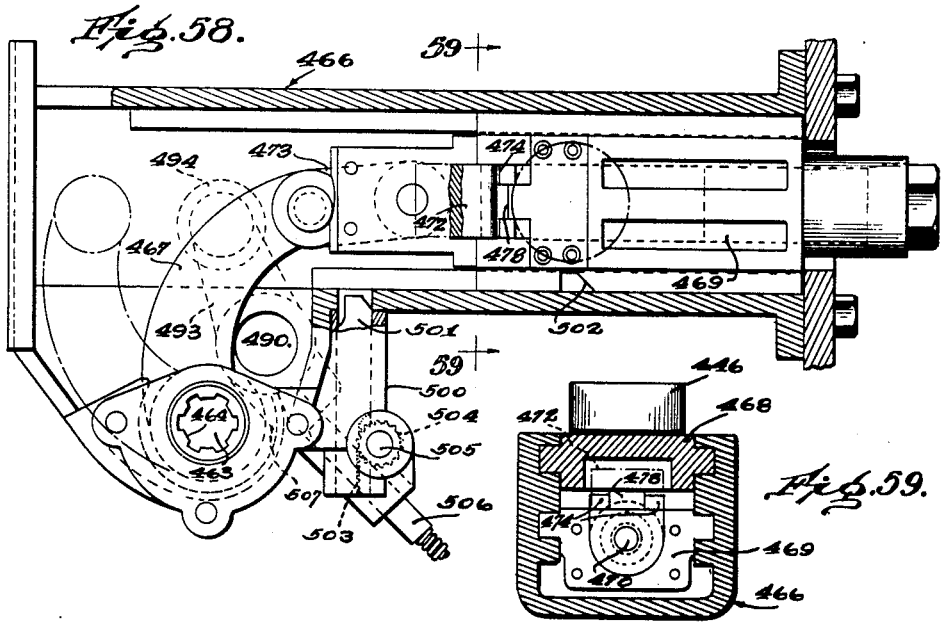
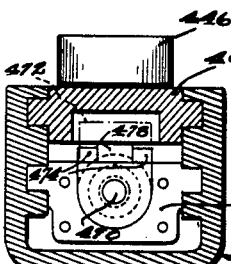
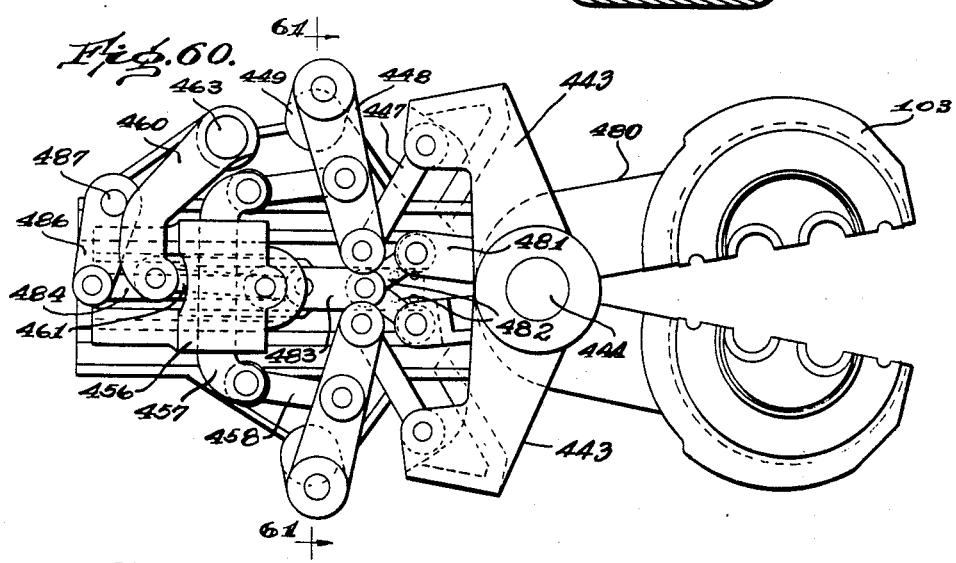
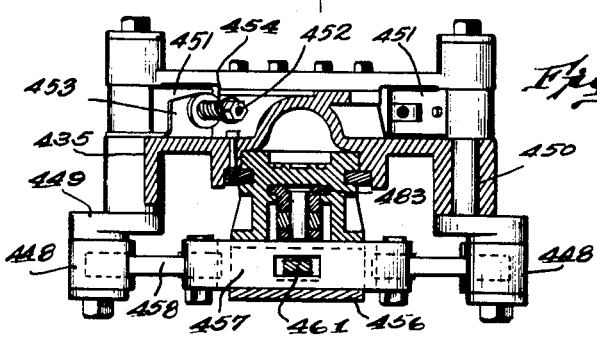
J. P. Benoit
C. W. Schroeder
C. C. Kinker
H. A. Rohrich
R. G. Allen
INVENTORS
BY Rule & Hoge
ATTORNEYS.

Dec. 24, 1940.   J. P. BENOIT ET AL   2,225,899
MACHINE FOR MOLDING GLASS ARTICLES
Filed April 15, 1937   49 Sheets-Sheet 23
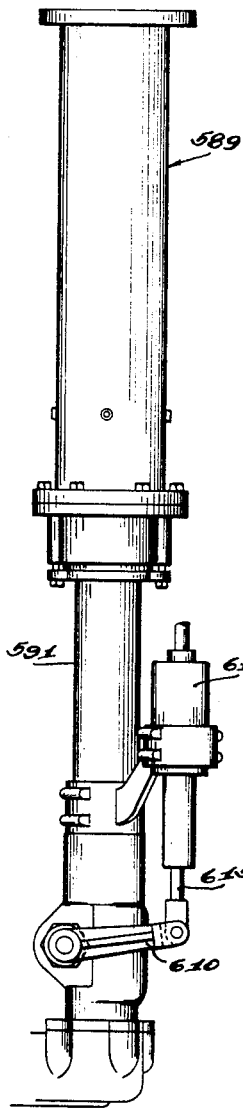
Fig. 62.
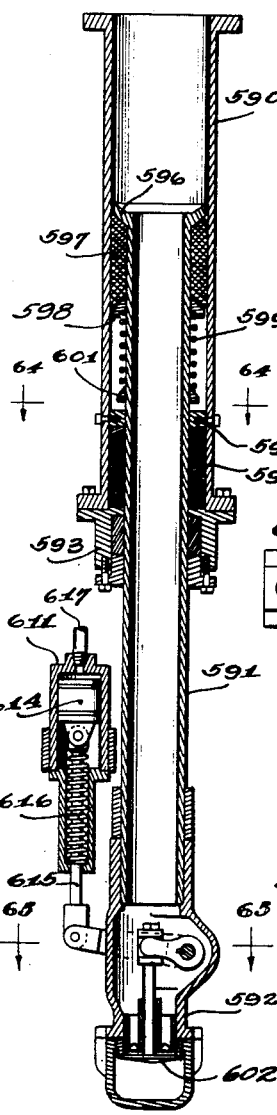
Fig. 63.
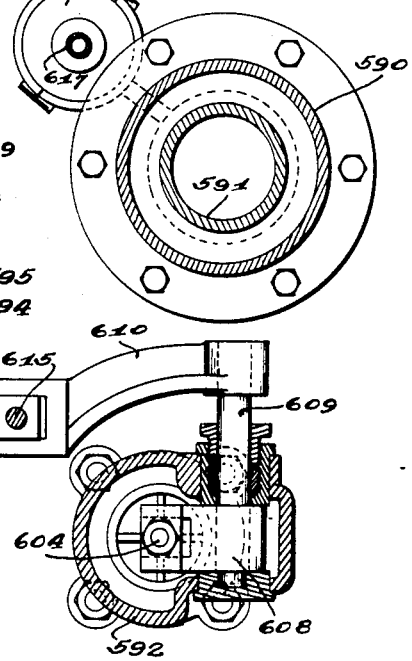
Fig. 64.
Fig. 65.
J. P. Benoit
C. W. Schreiber
C. C. Kinker
H. A. Rohrich
R. G. Allen
INVENTORS
BY Rule & Hoge
ATTORNEYS.

Dec. 24, 1940.　　　J. P. BENOIT ET AL　　　2,225,899
MACHINE FOR MOLDING GLASS ARTICLES
Filed April 15, 1937　　　49 Sheets-Sheet 24
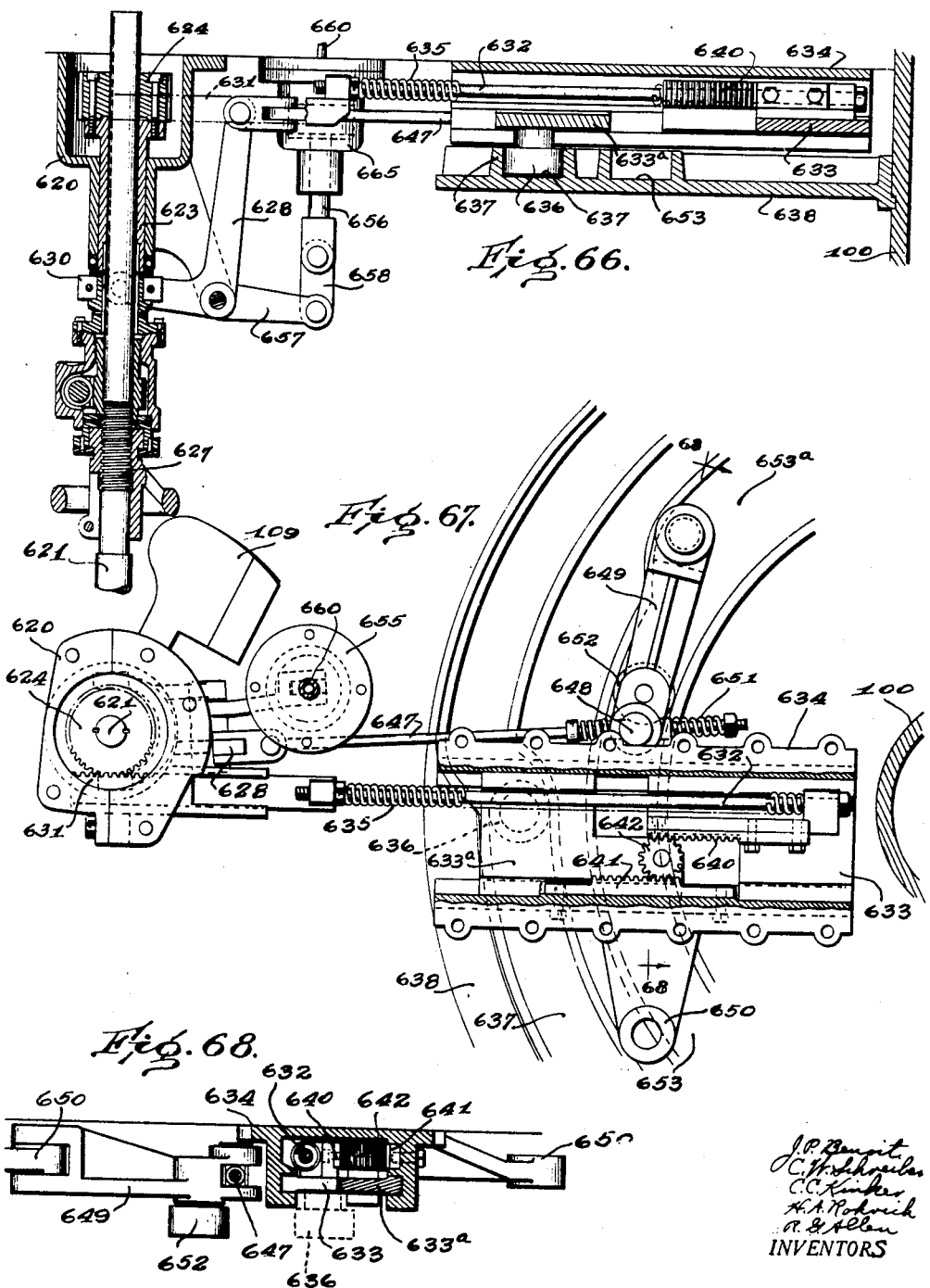

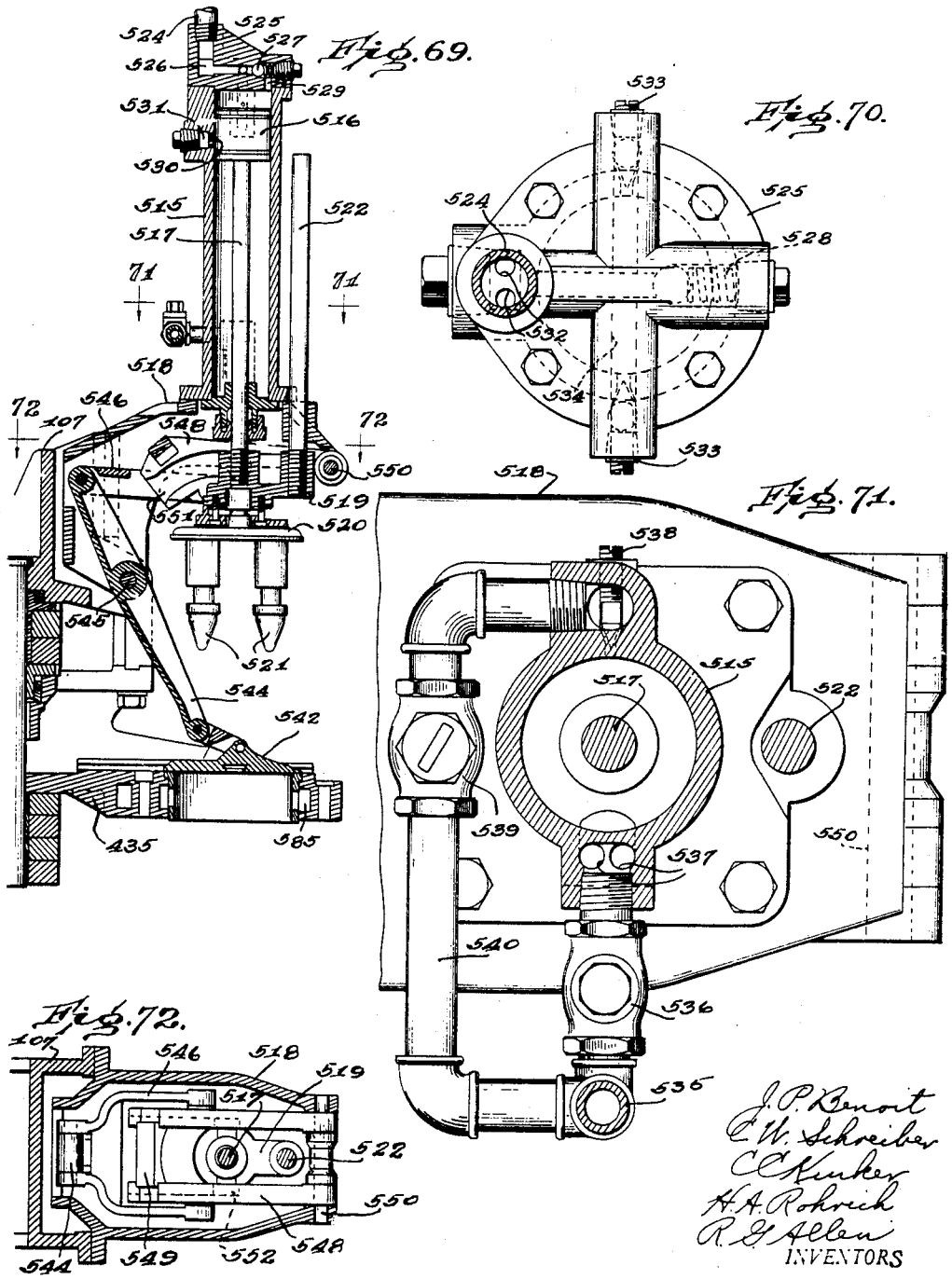

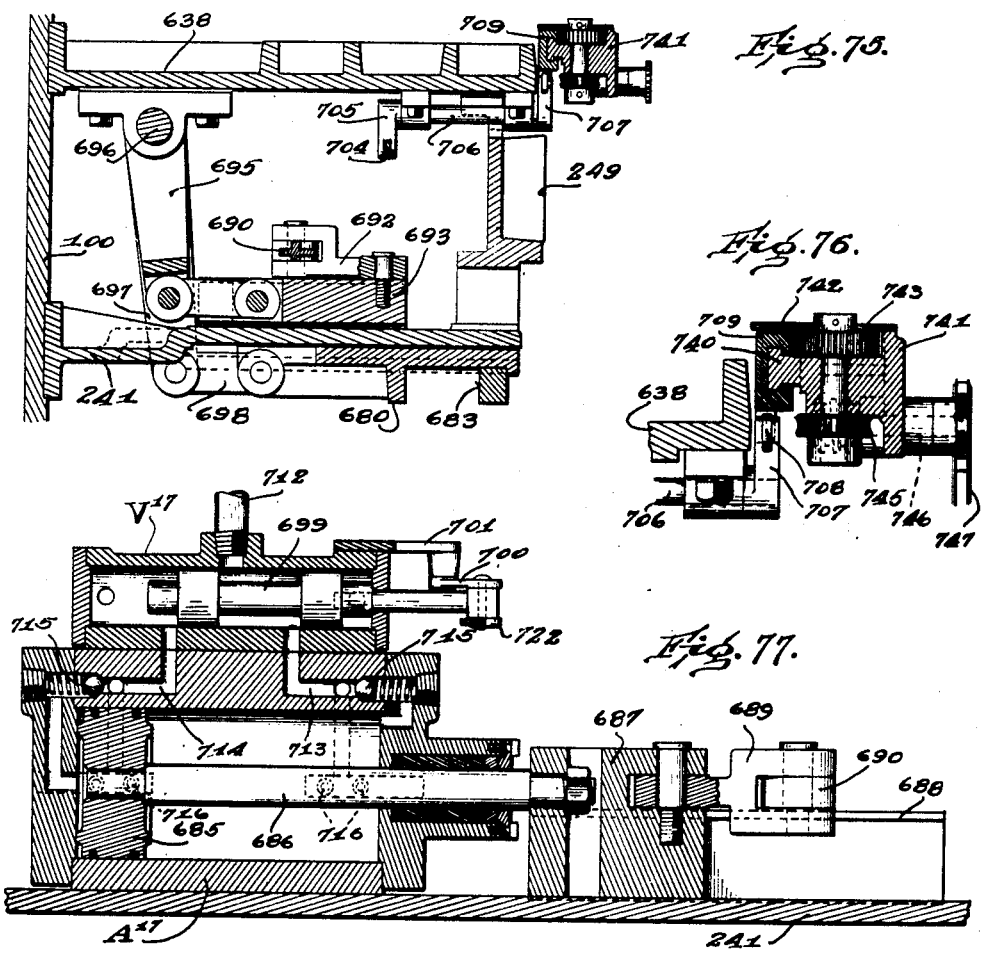

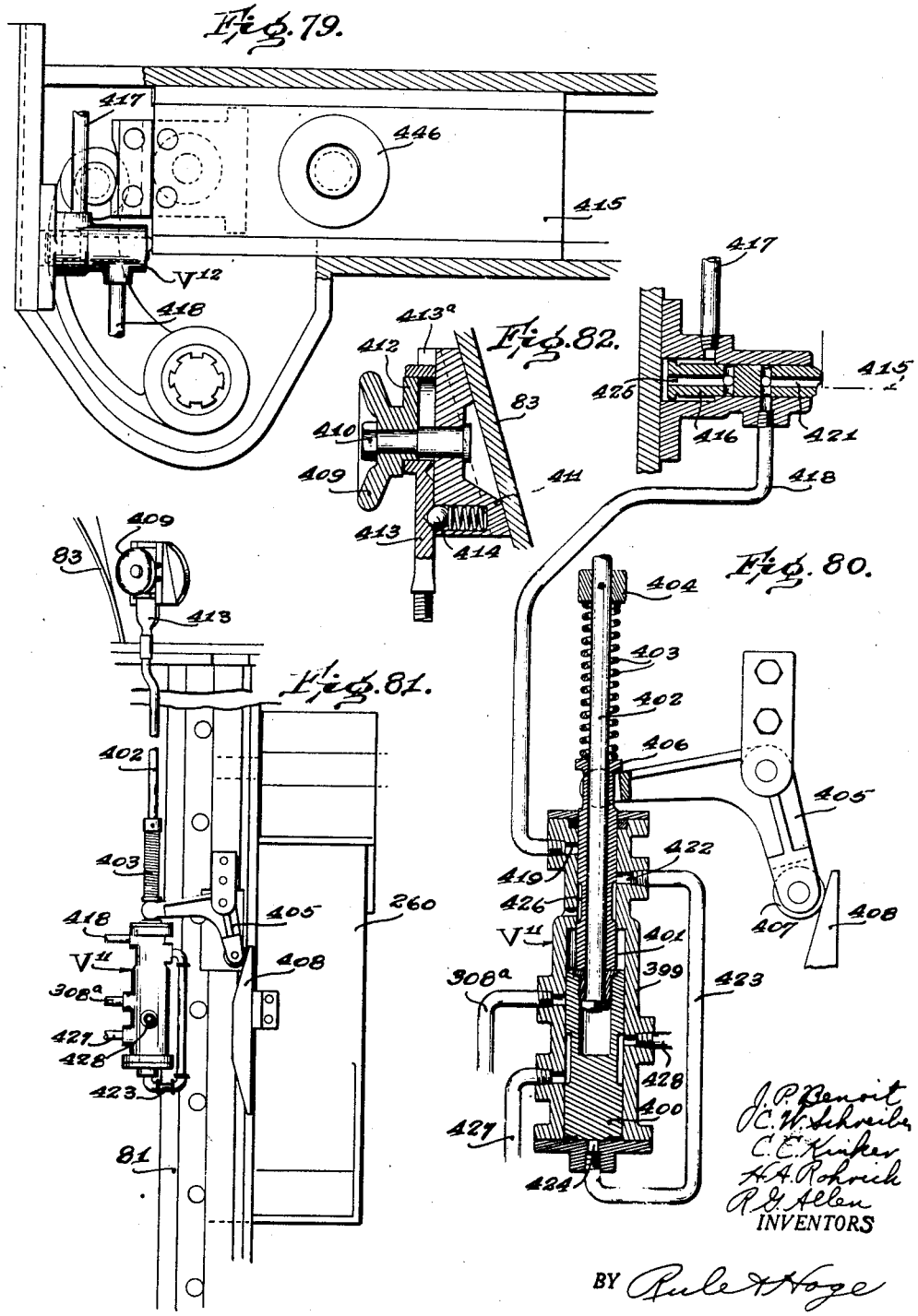

Dec. 24, 1940.  J. P. BENOIT ET AL  2,225,899
MACHINE FOR MOLDING GLASS ARTICLES
Filed April 15, 1937  49 Sheets-Sheet 29
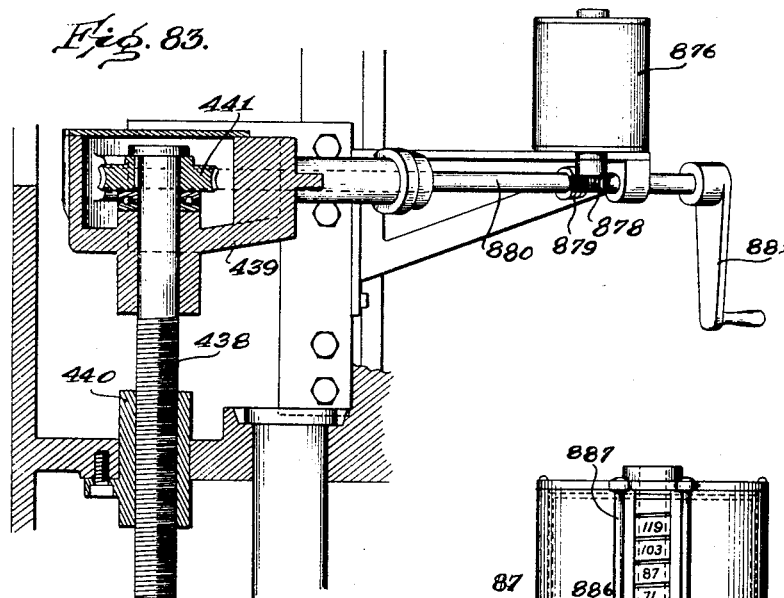
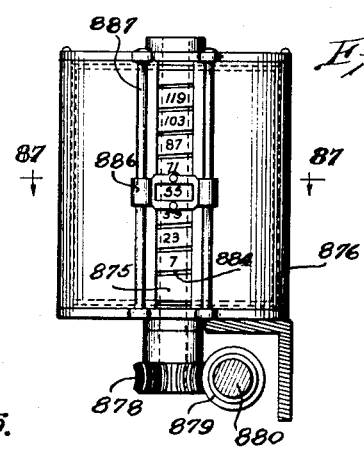
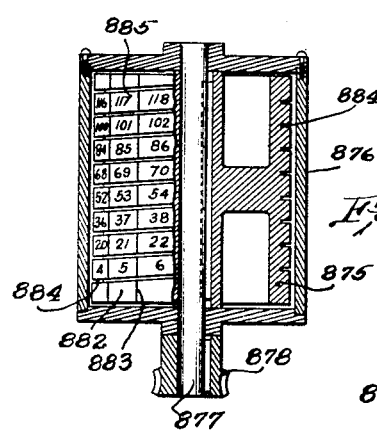
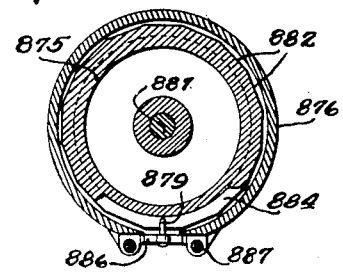

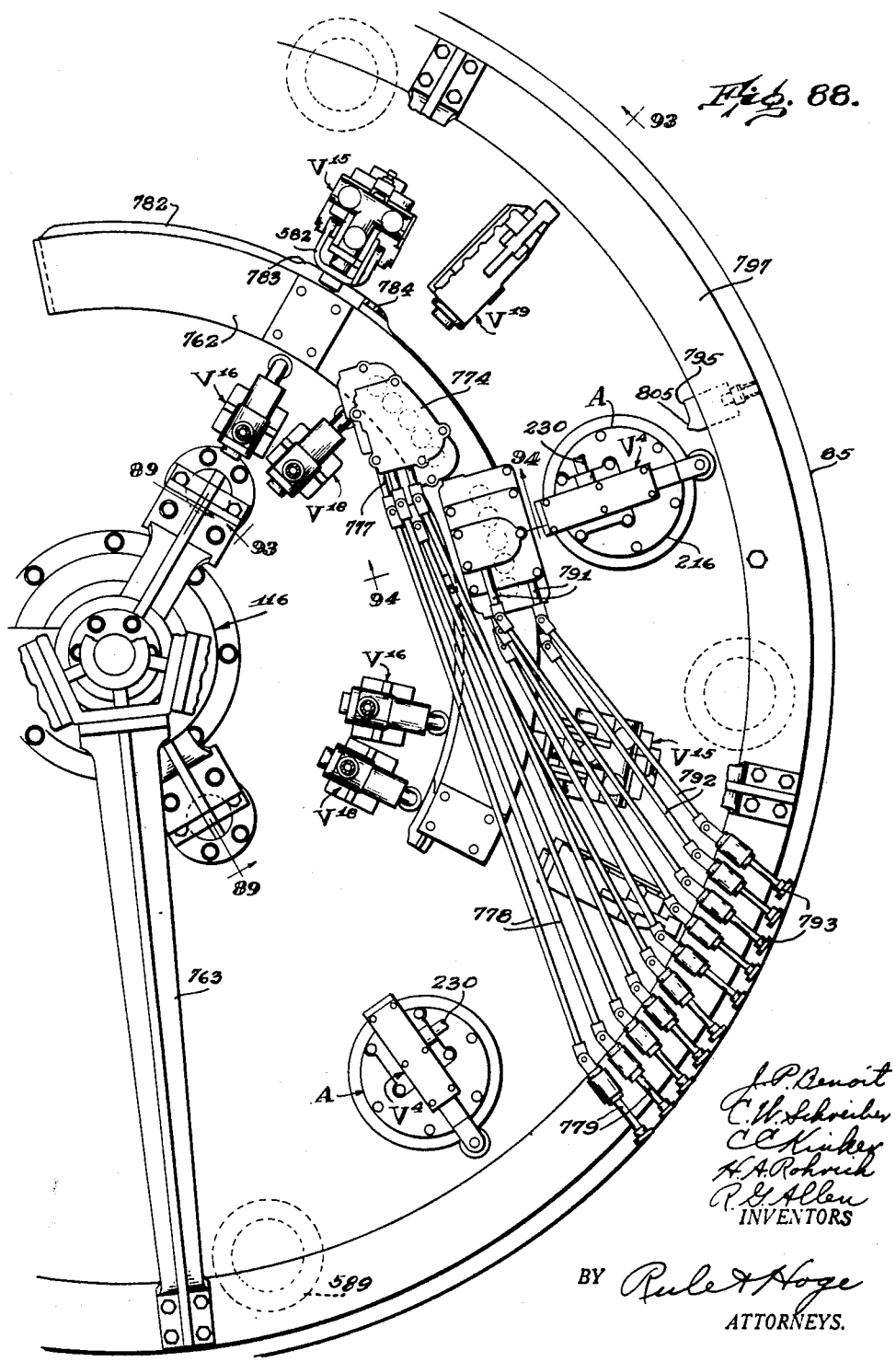

Dec. 24, 1940. J. P. BENOIT ET AL 2,225,899

MACHINE FOR MOLDING GLASS ARTICLES

Filed April 15, 1937

J. P. Benoit
C. W. Schreiber
C. C. Kinker
H. A. Rohrich
R. G. Allen
INVENTORS

BY Rule & Hoge
ATTORNEYS.

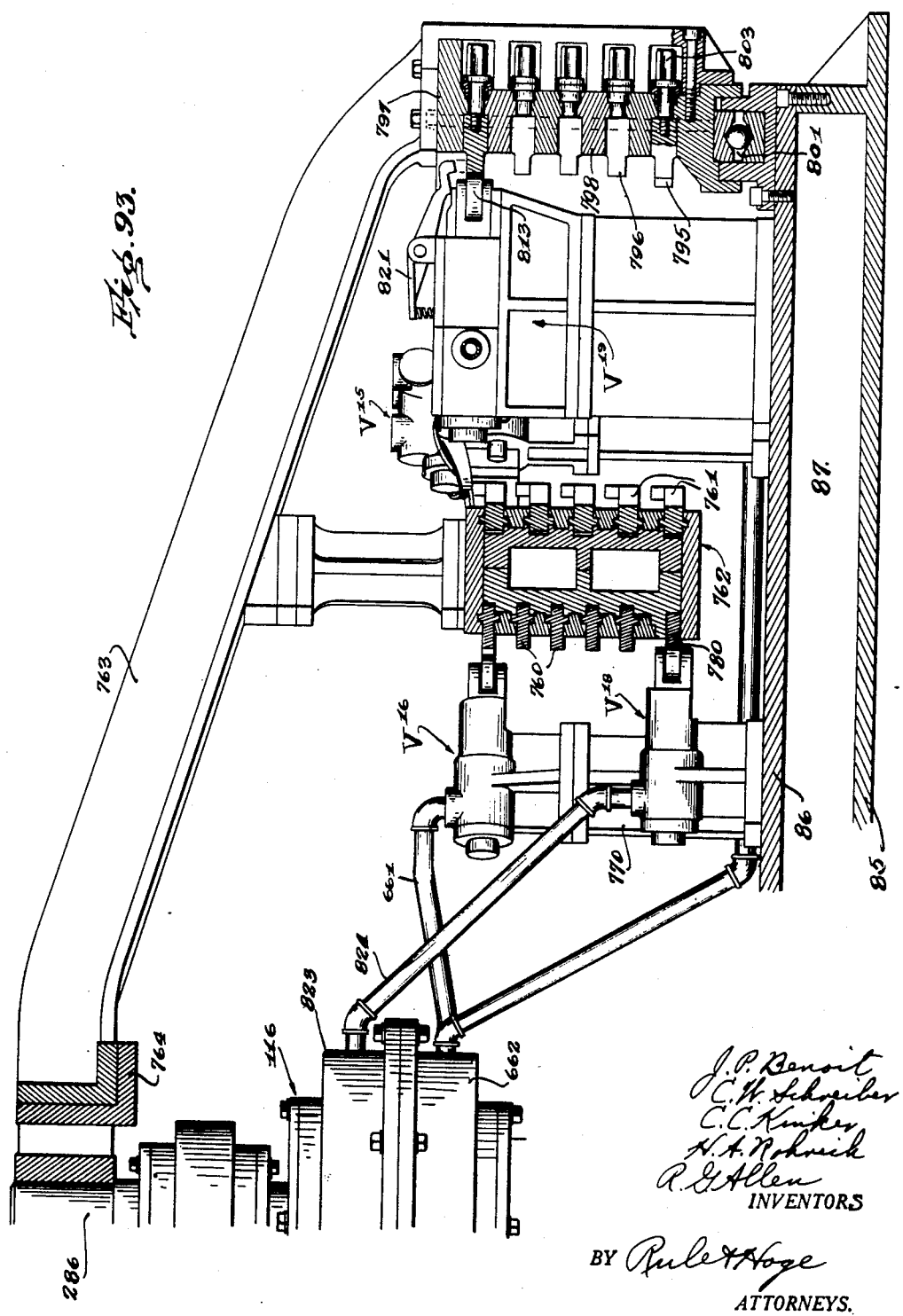

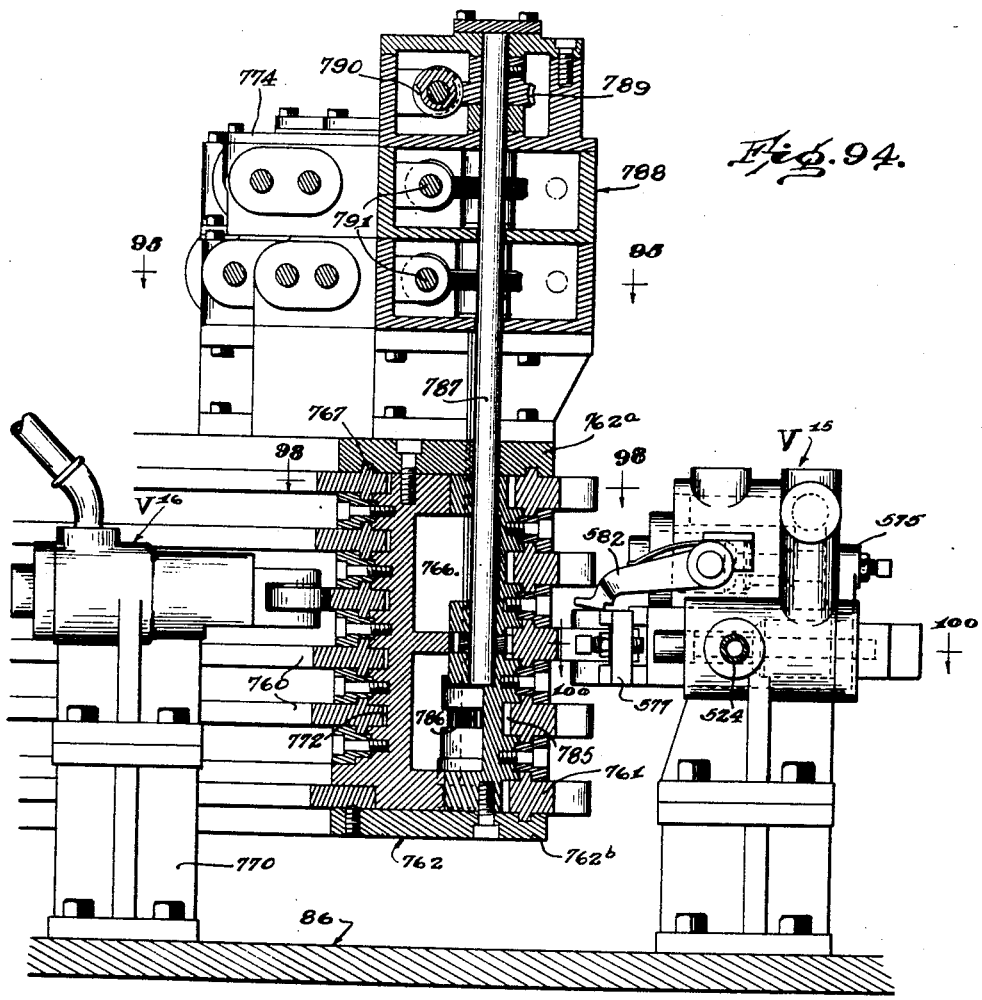

Dec. 24, 1940.  J. P. BENOIT ET AL  2,225,899
MACHINE FOR MOLDING GLASS ARTICLES
Filed April 15, 1937  49 Sheets-Sheet 34
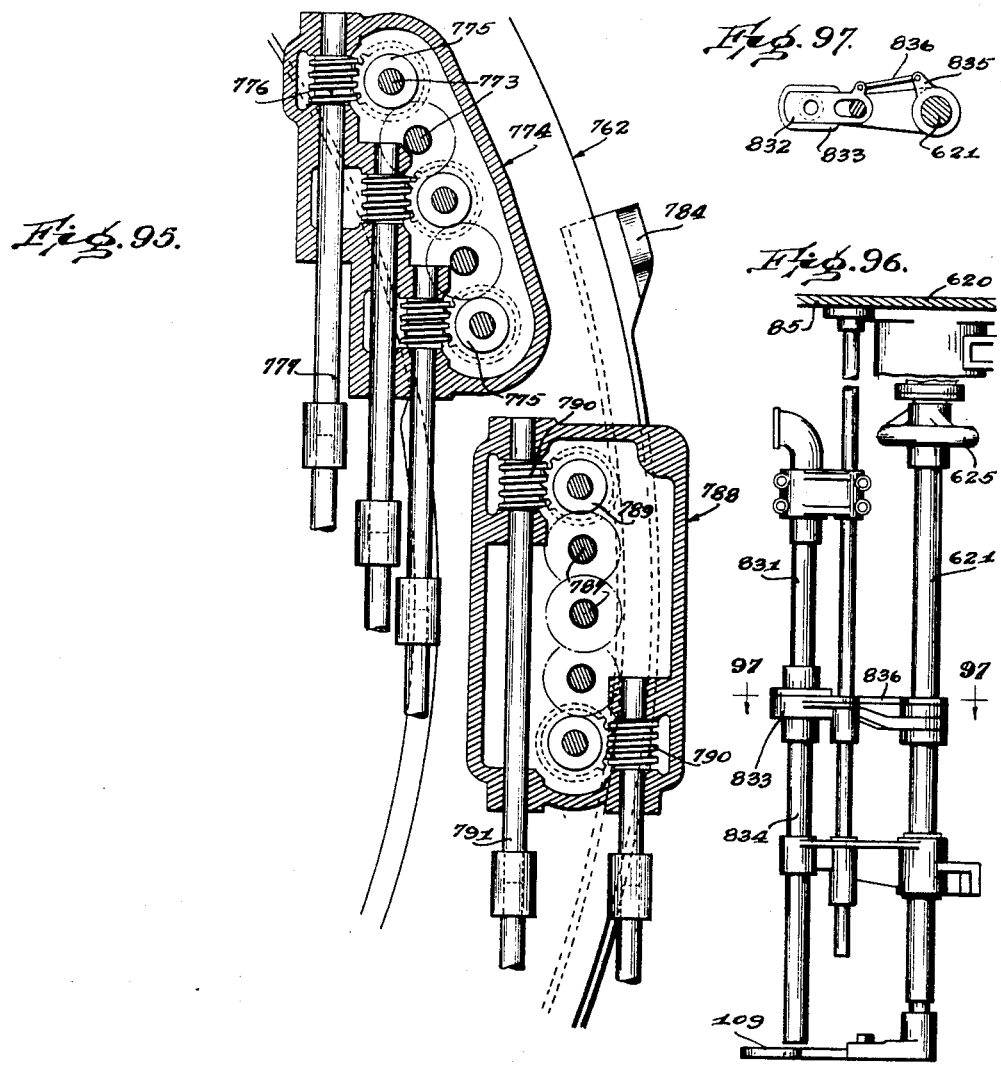
INVENTORS
BY
ATTORNEYS.

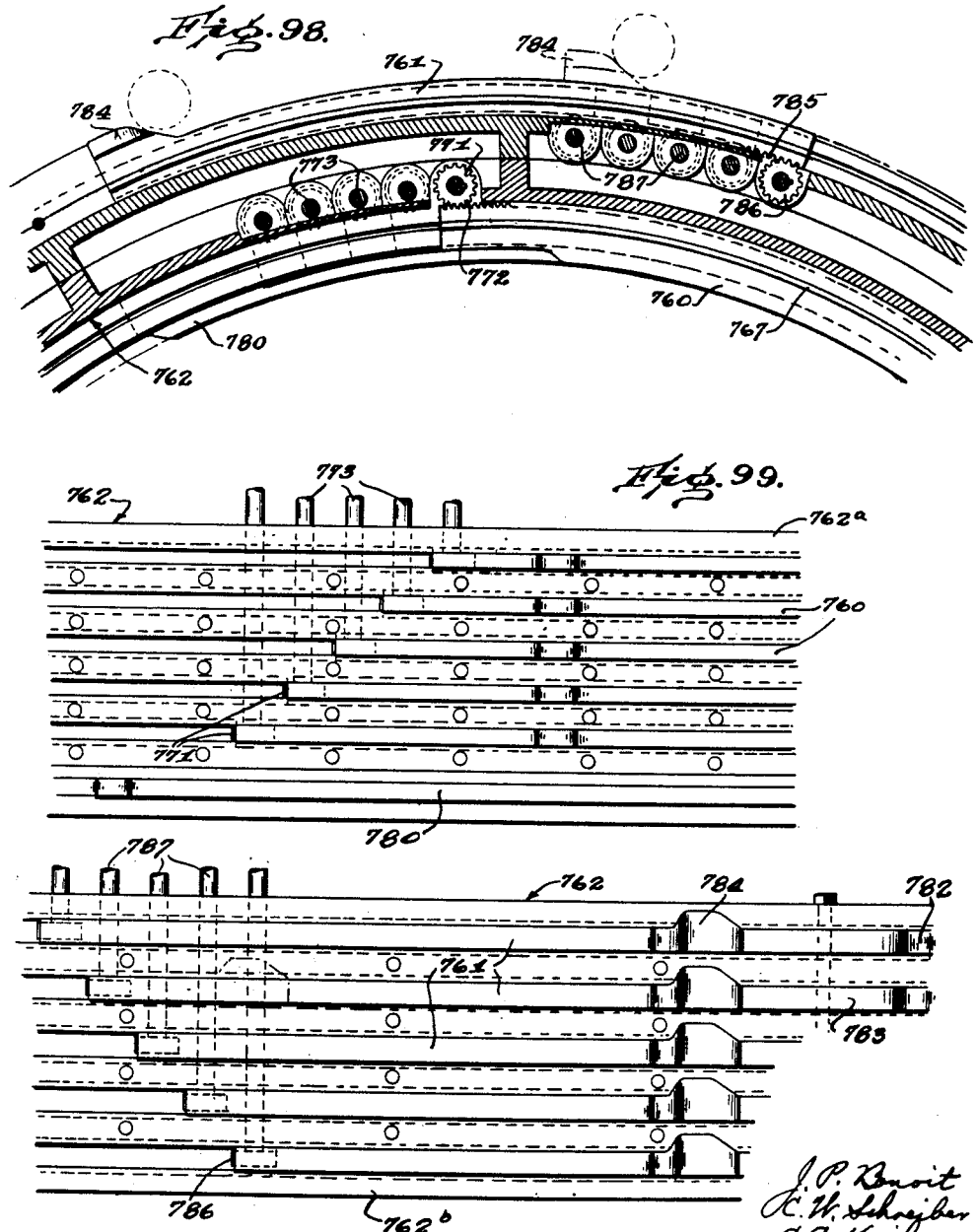

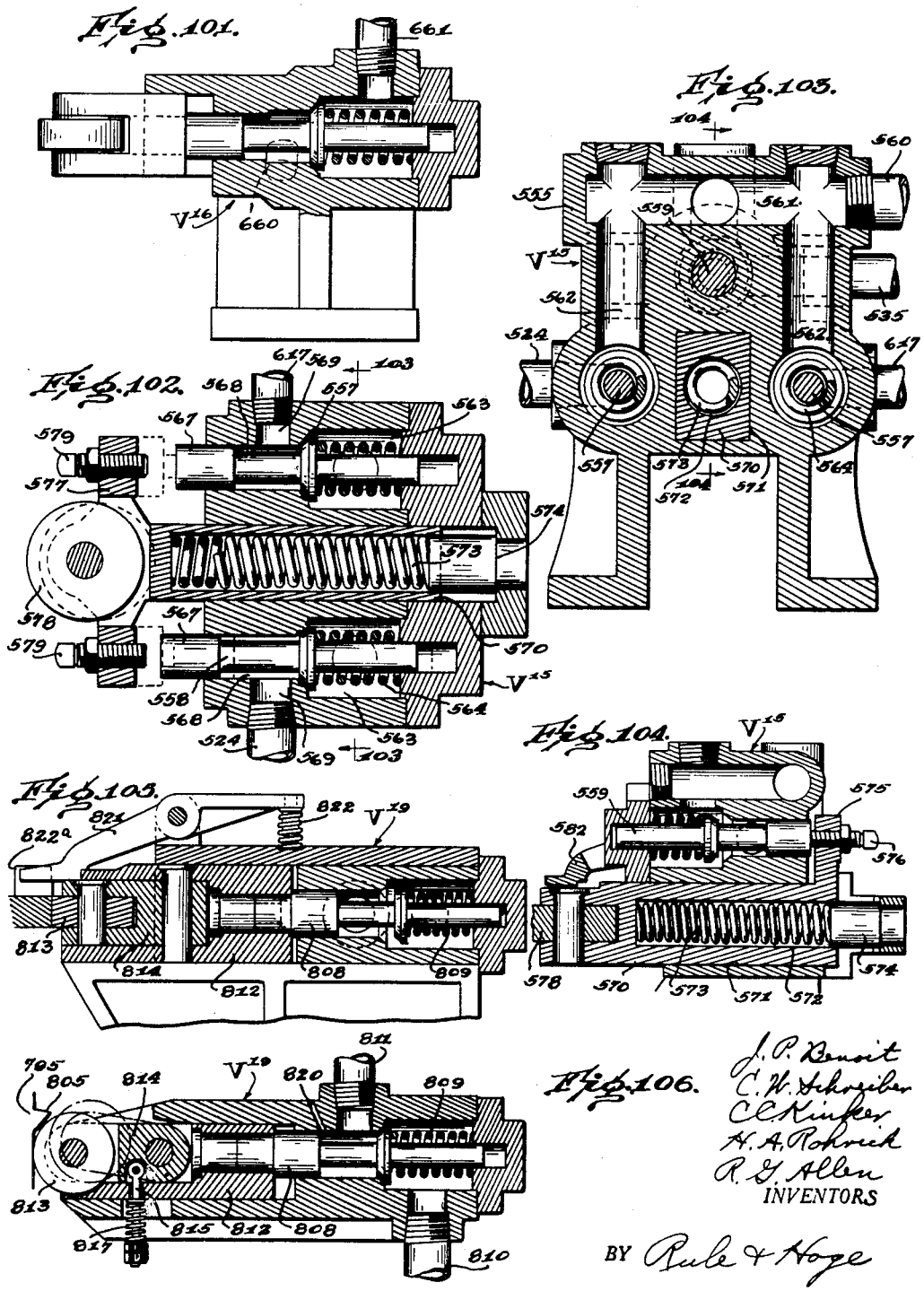

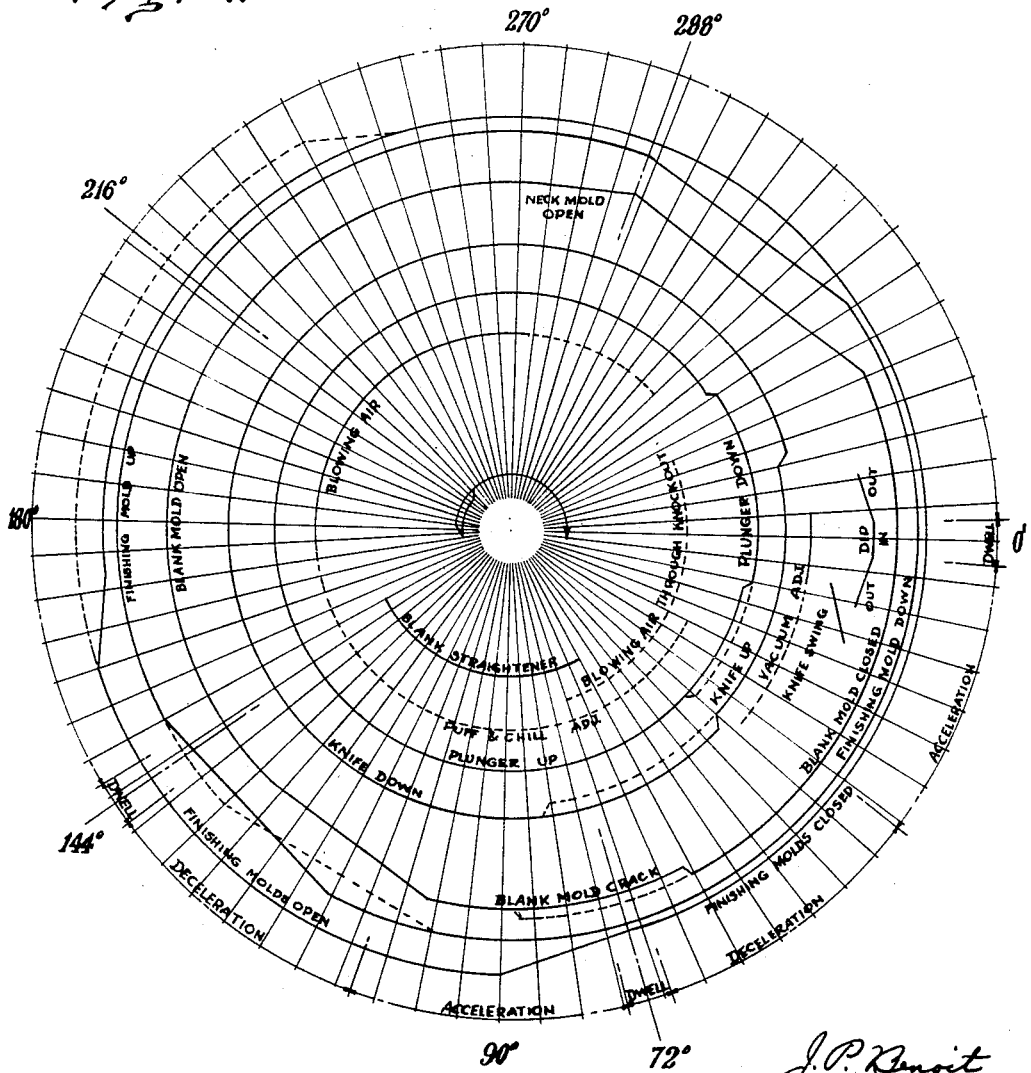

Dec. 24, 1940.  J. P. BENOIT ET AL  2,225,899
MACHINE FOR MOLDING GLASS ARTICLES
Filed April 15, 1937  49 Sheets-Sheet 38

J. P. Benoit
C. W. Schreiber
C. C. Kinker
H. A. Rohrich
R. G. Allen
INVENTORS

BY Rule & Hoge
ATTORNEYS

Dec. 24, 1940. J. P. BENOIT ET AL 2,225,899
MACHINE FOR MOLDING GLASS ARTICLES
Filed April 15, 1937 49 Sheets-Sheet 39
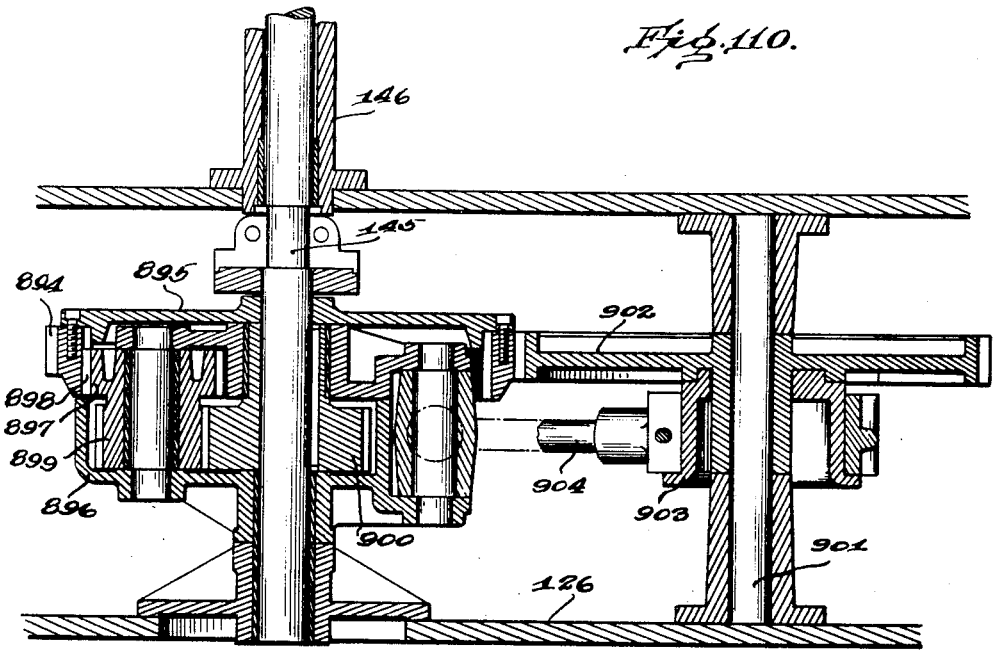
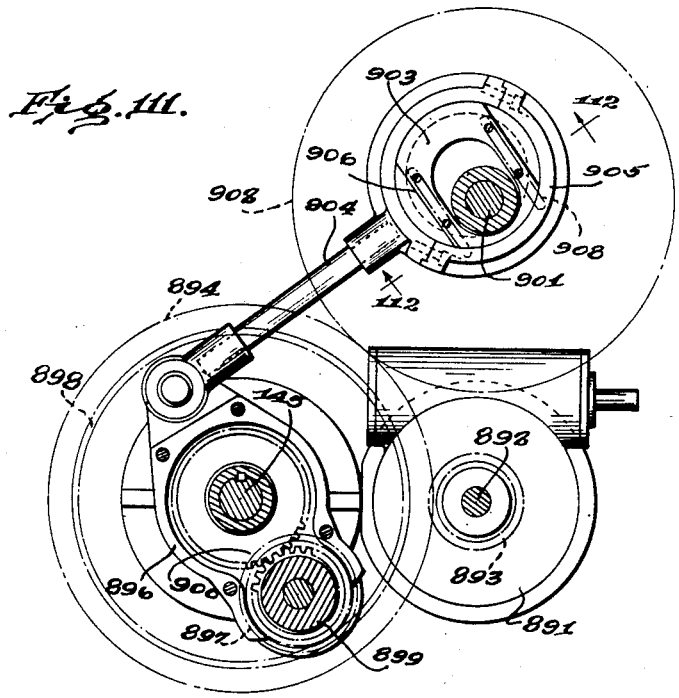
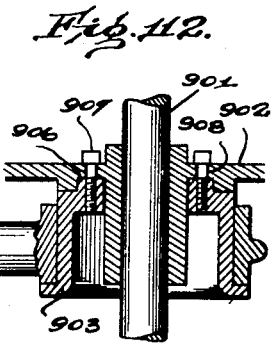
J. P. Benoit
E. W. Schreiber
C. C. Kinker
H. A. Rohrich
R. G. Allen
INVENTORS
BY Rule & Hope
ATTORNEYS

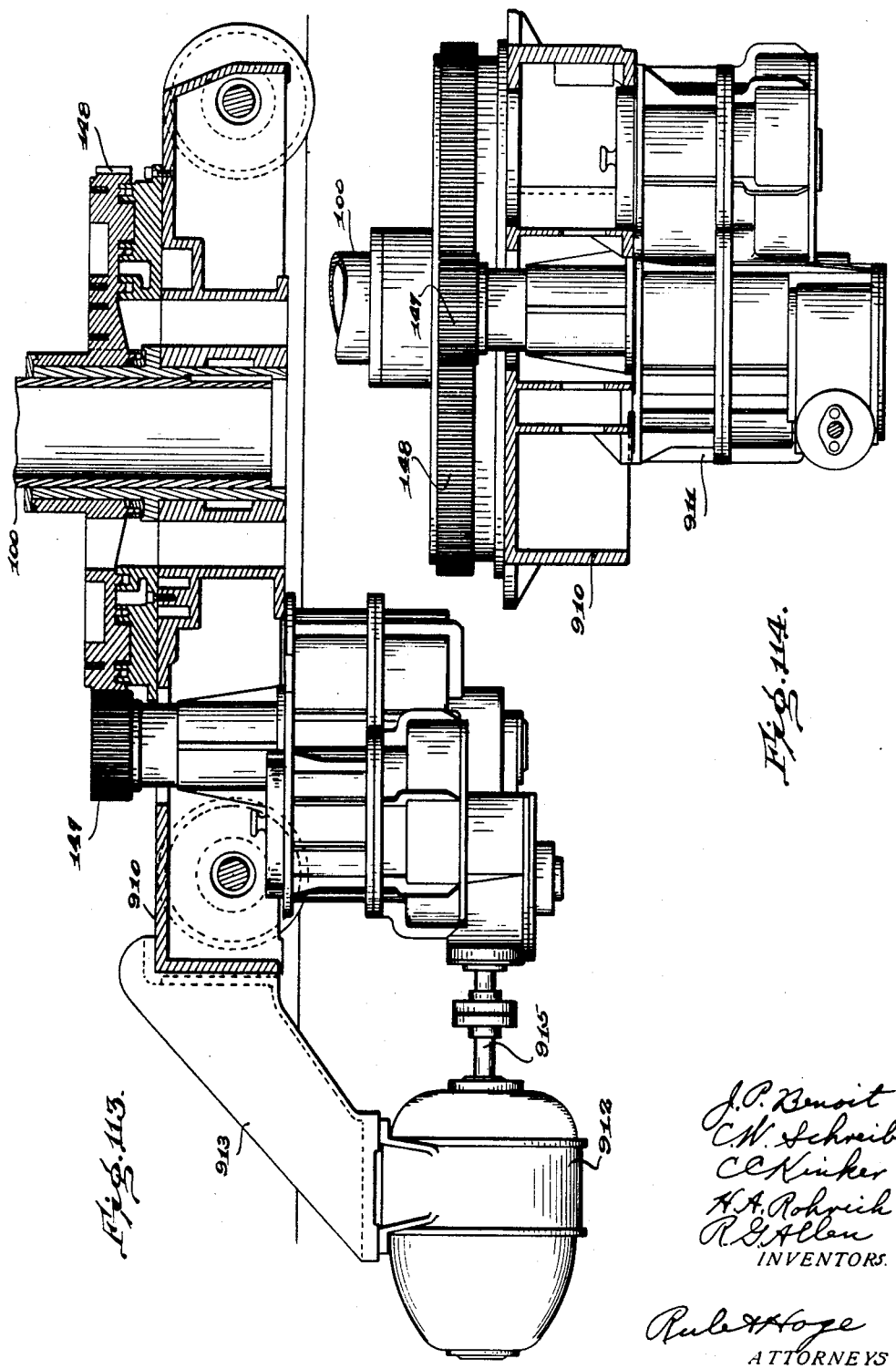

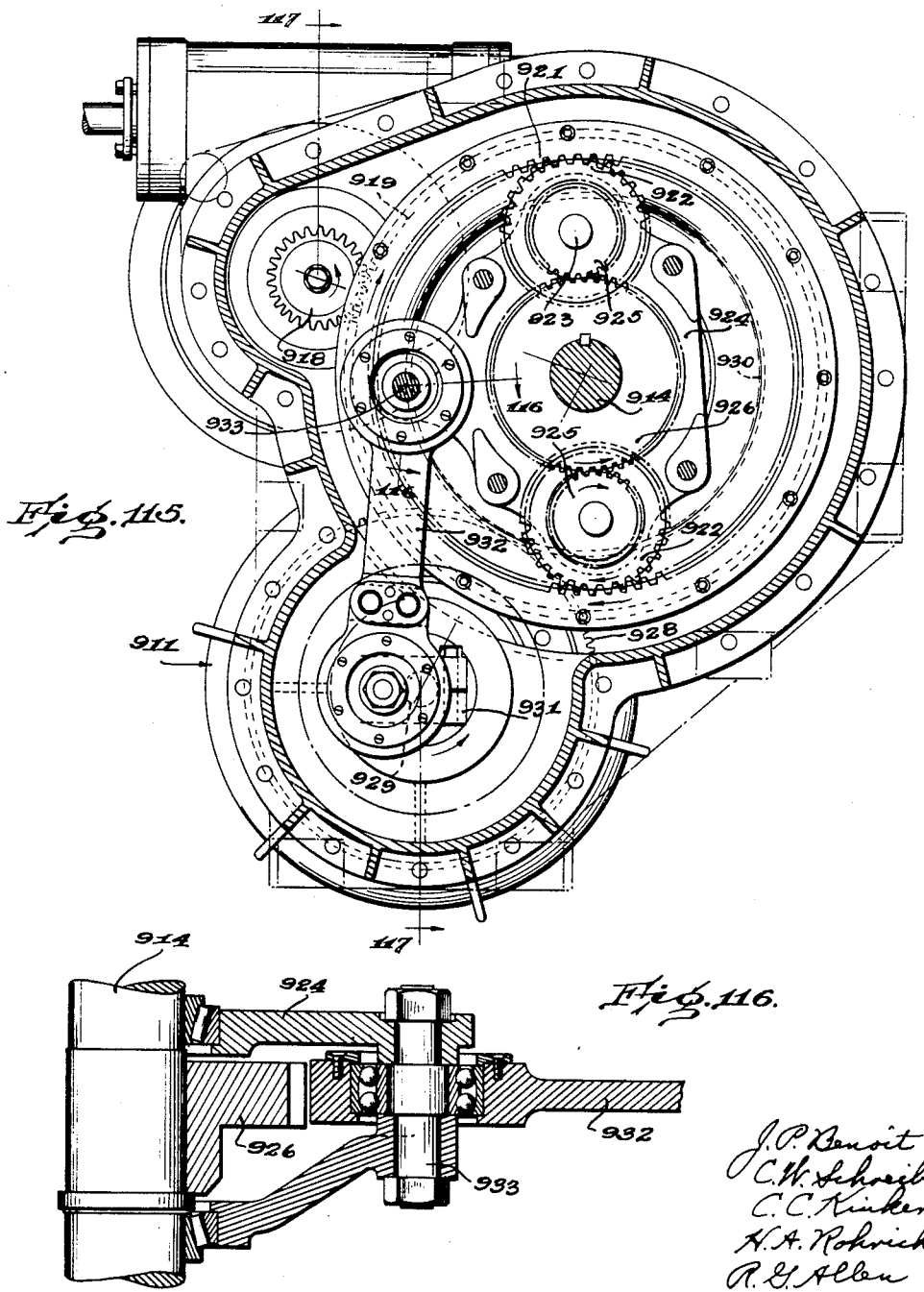

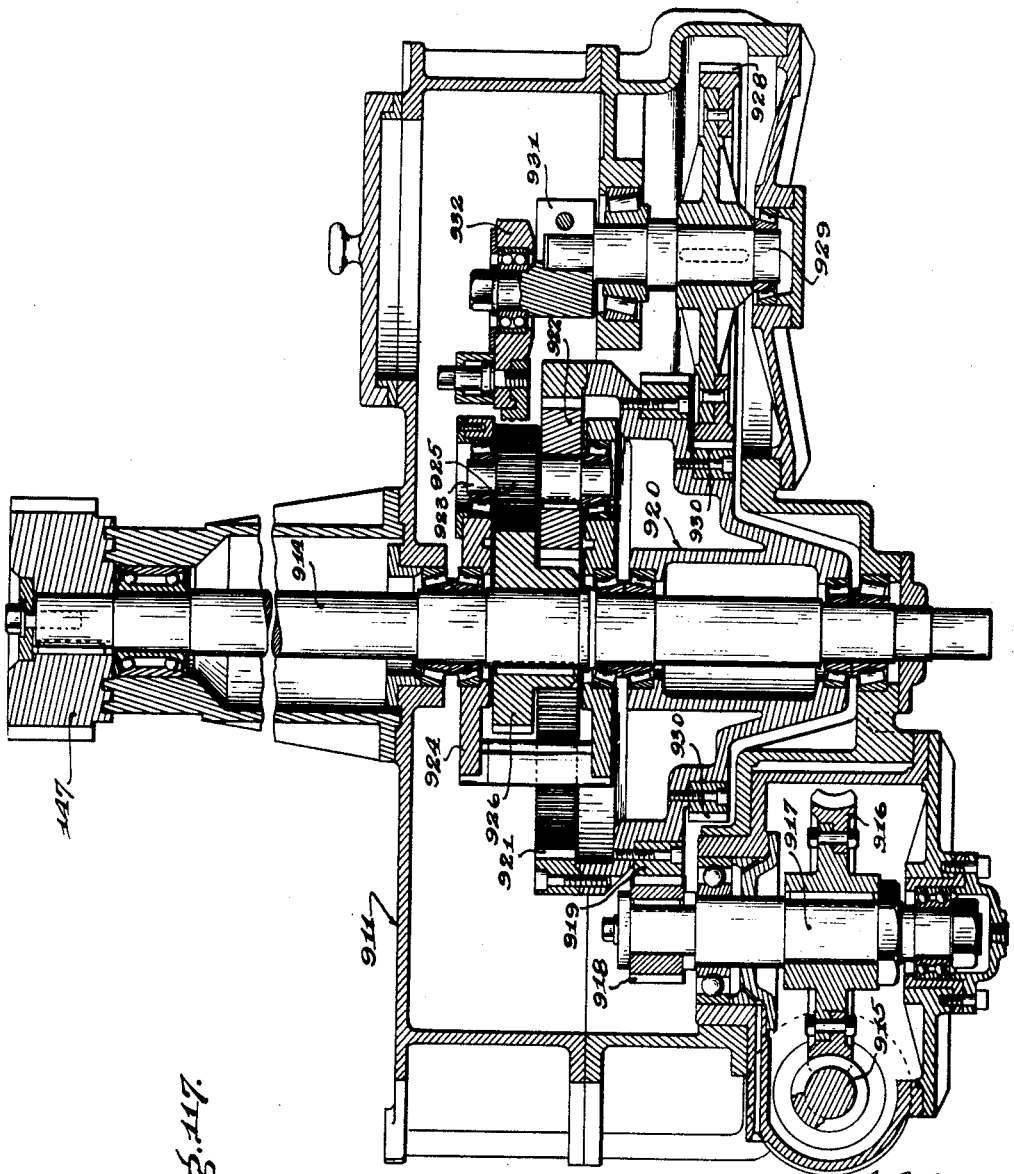

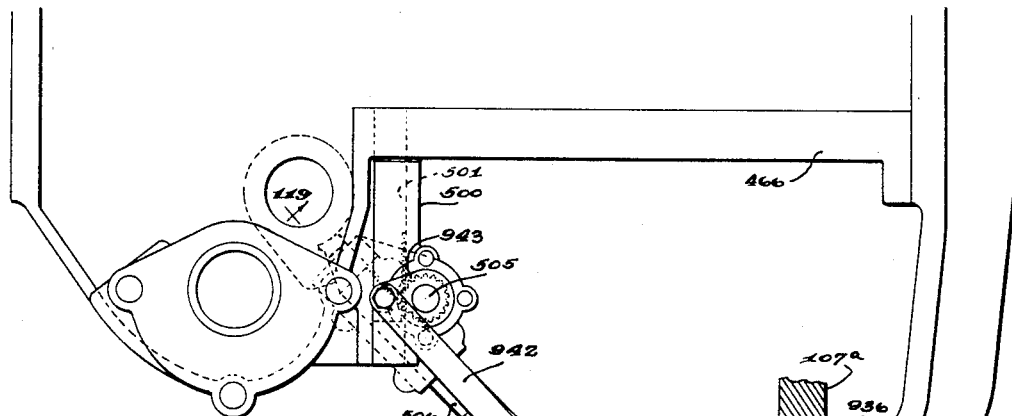
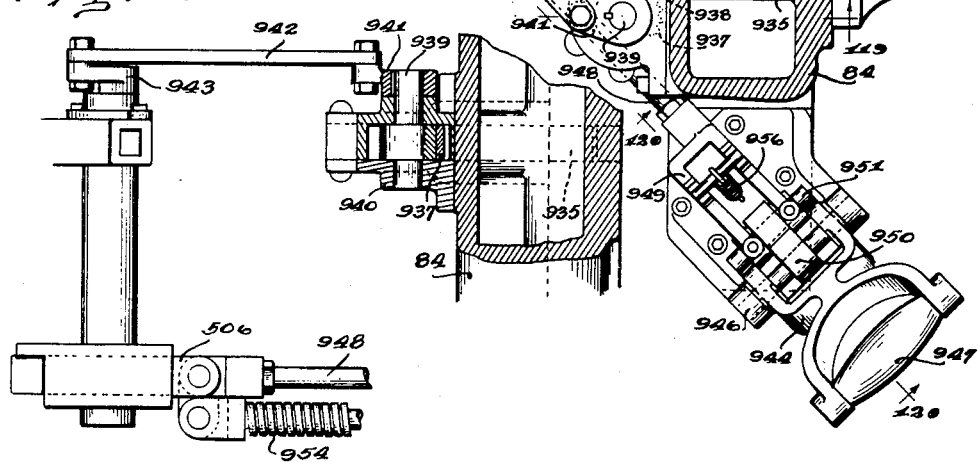
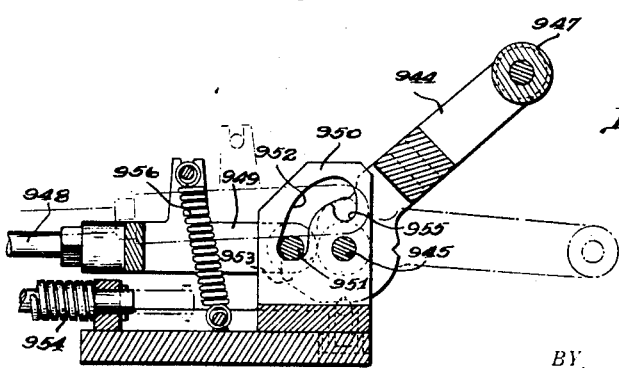

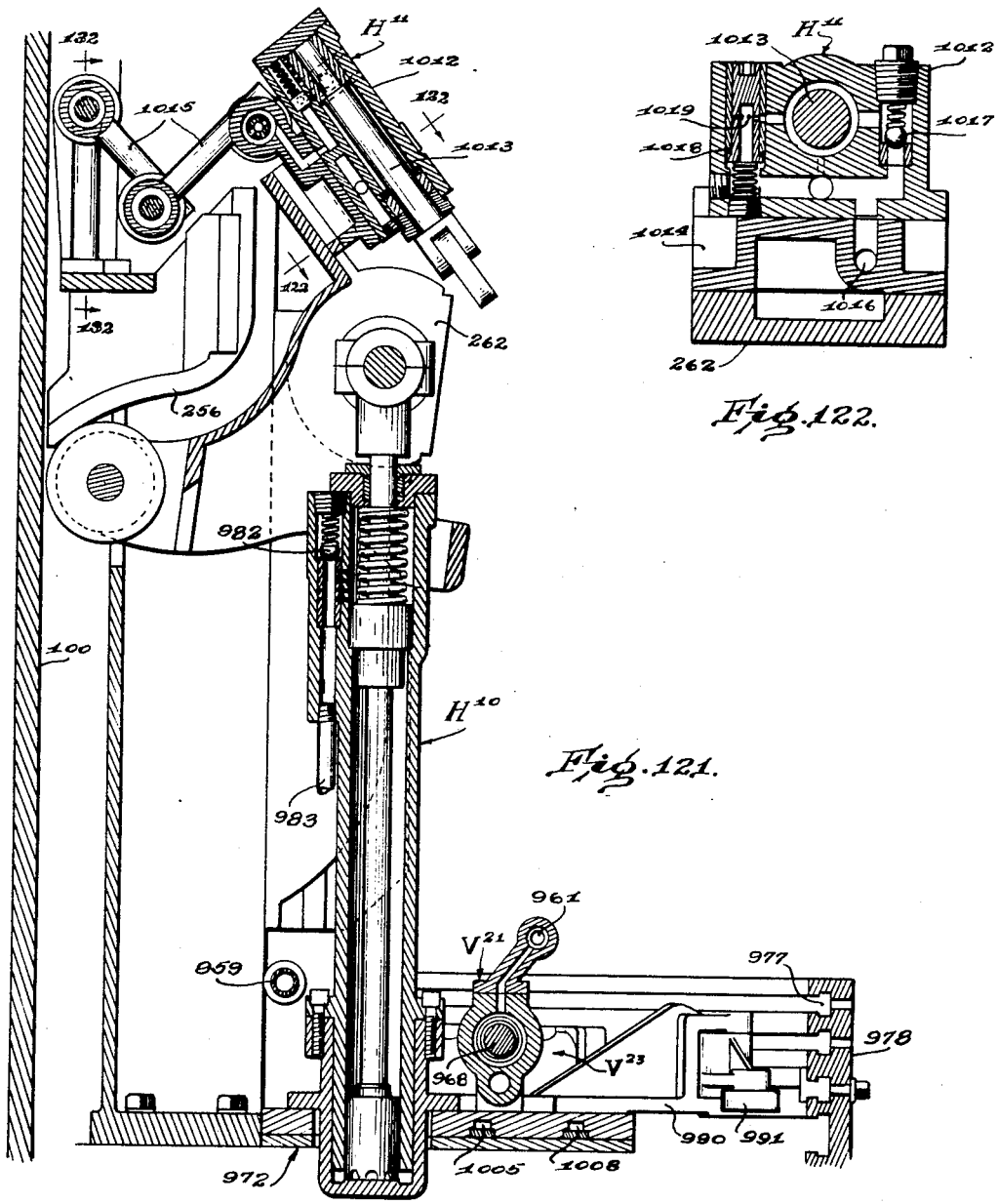

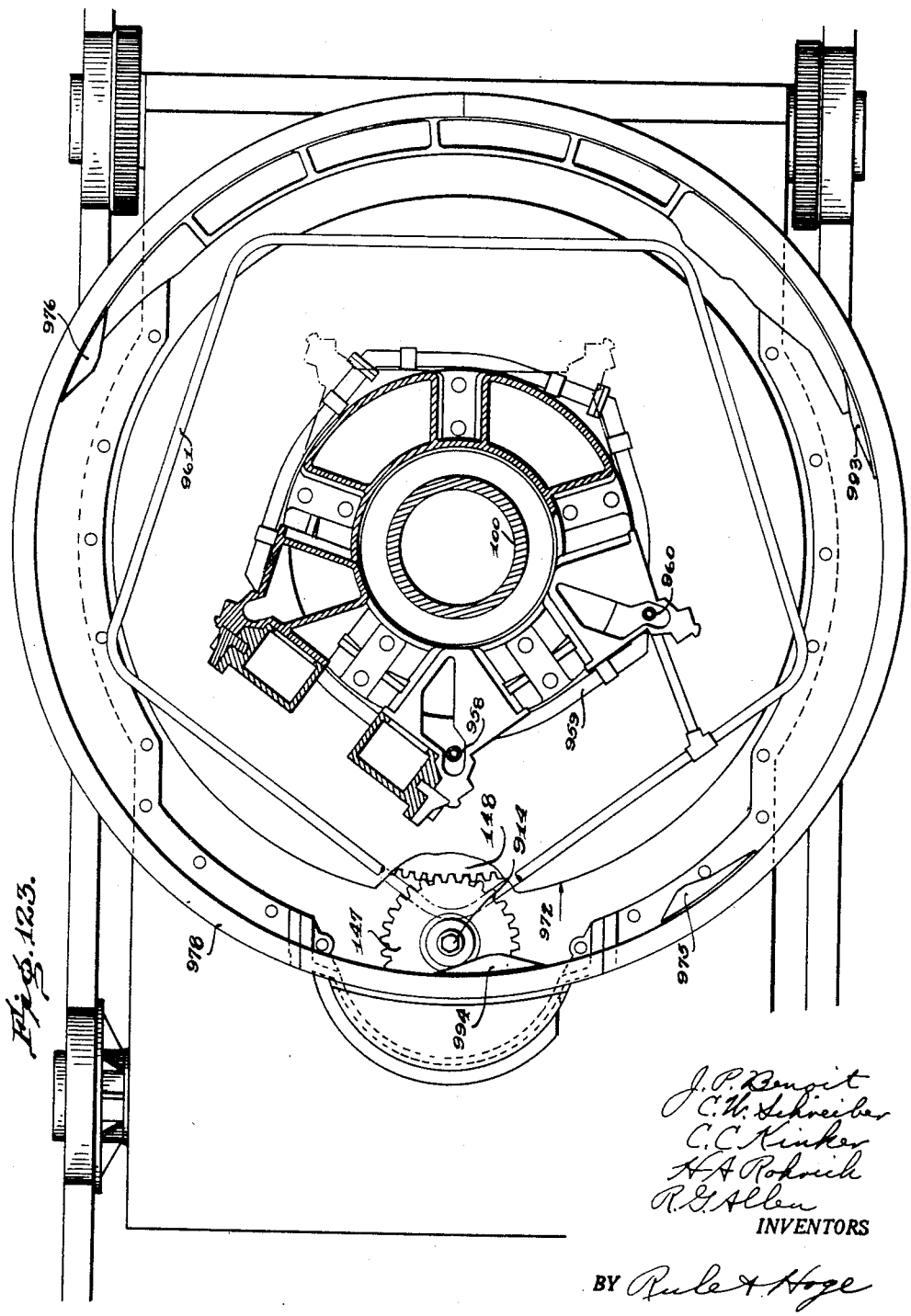

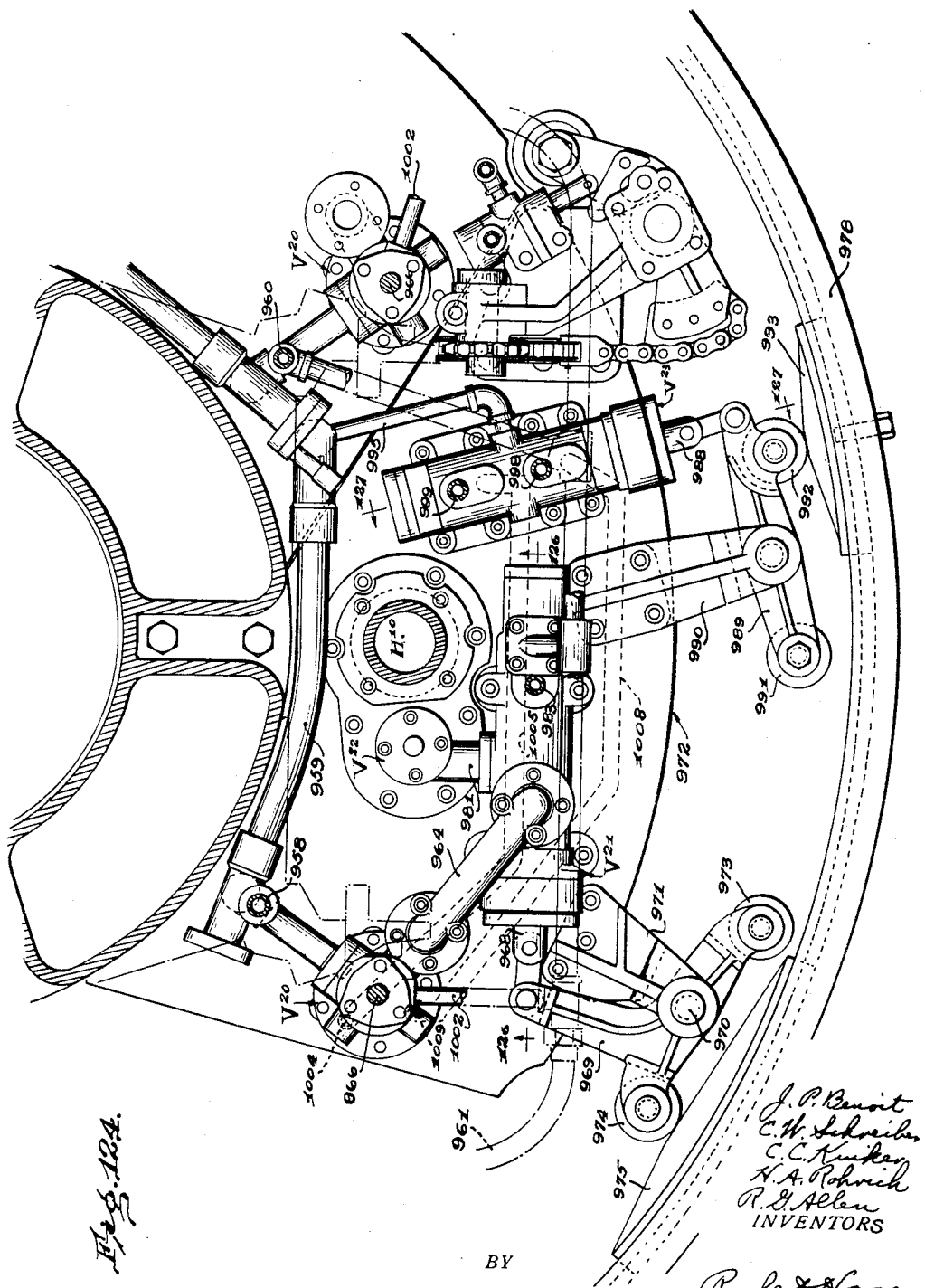

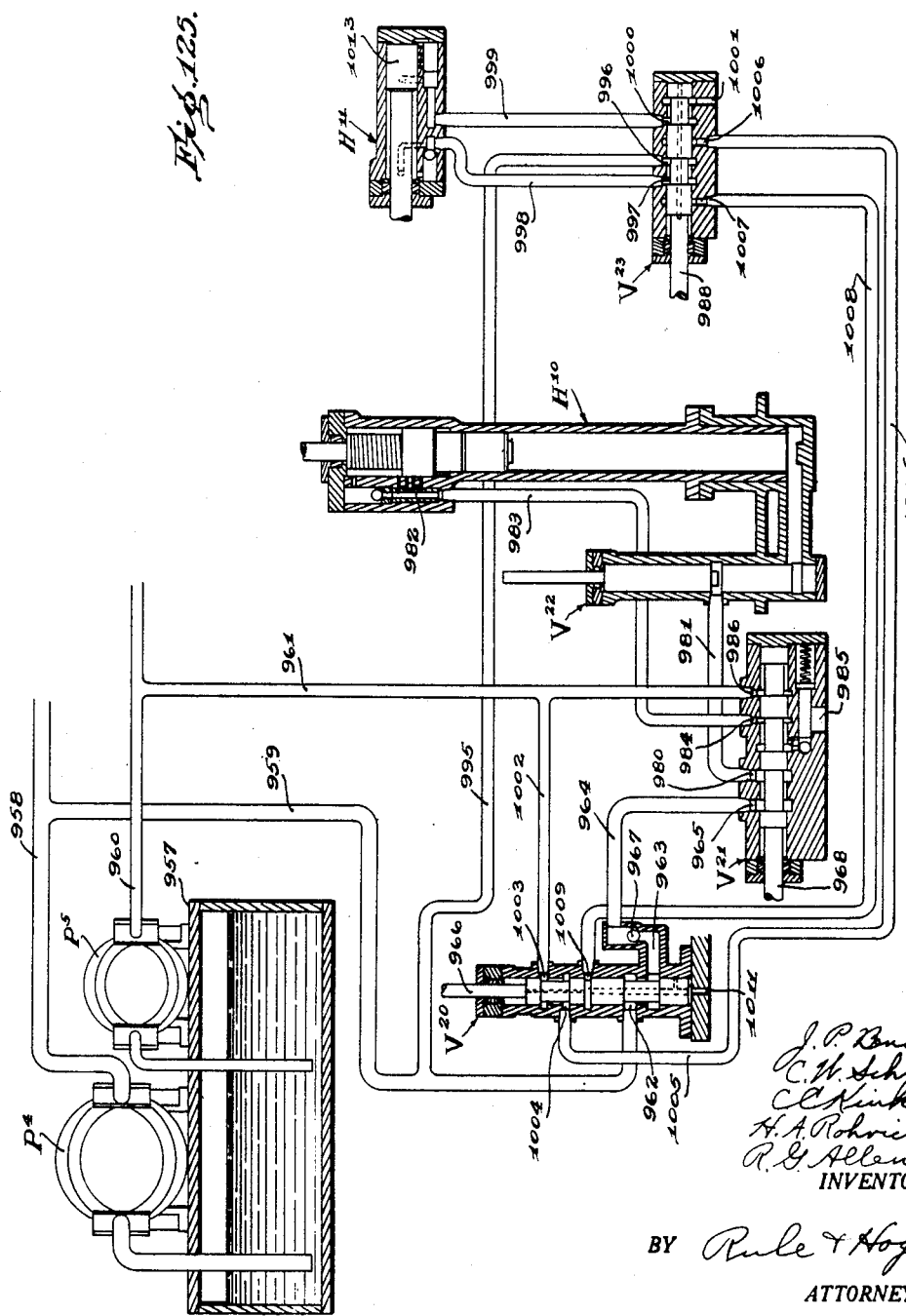

Dec. 24, 1940.    J. P. BENOIT ET AL    2,225,899
MACHINE FOR MOLDING GLASS ARTICLES
Filed April 15, 1937    49 Sheets-Sheet 48
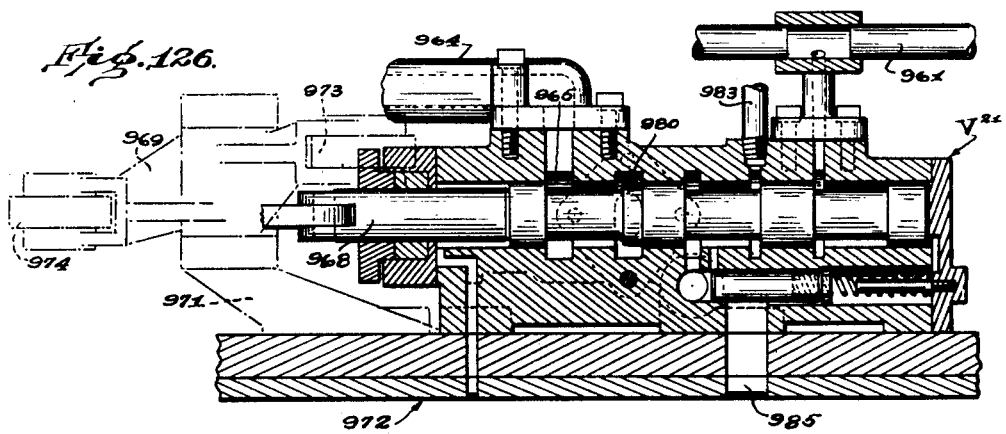
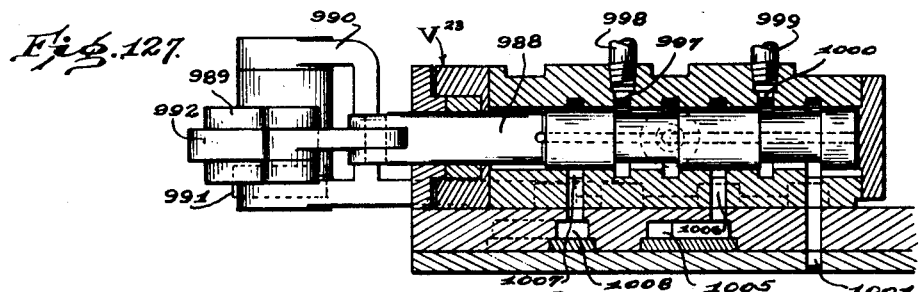
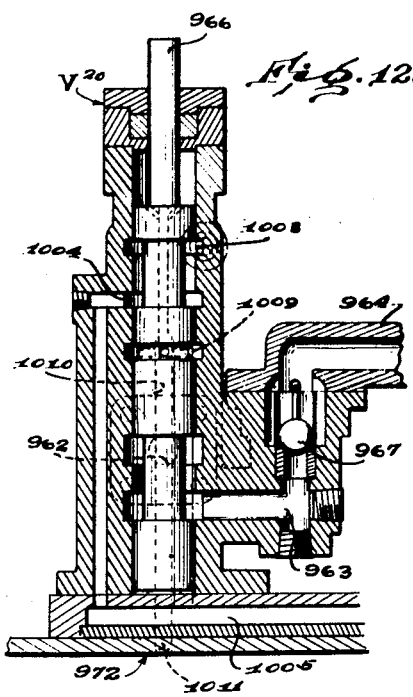

Dec. 24, 1940.   J. P. BENOIT ET AL   2,225,899
MACHINE FOR MOLDING GLASS ARTICLES
Filed April 15, 1937   49 Sheets-Sheet 49
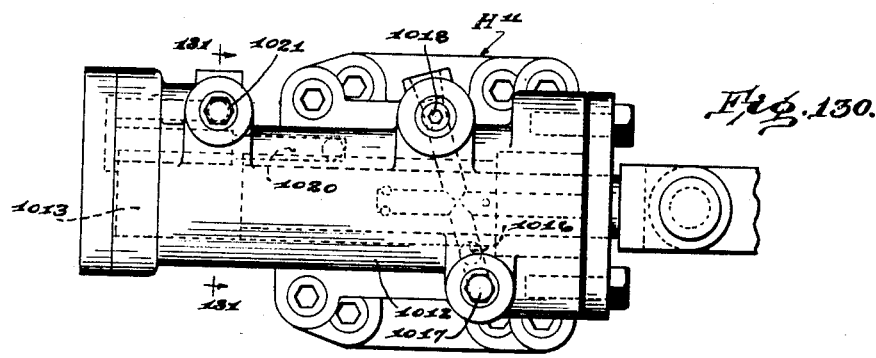
Fig. 130.
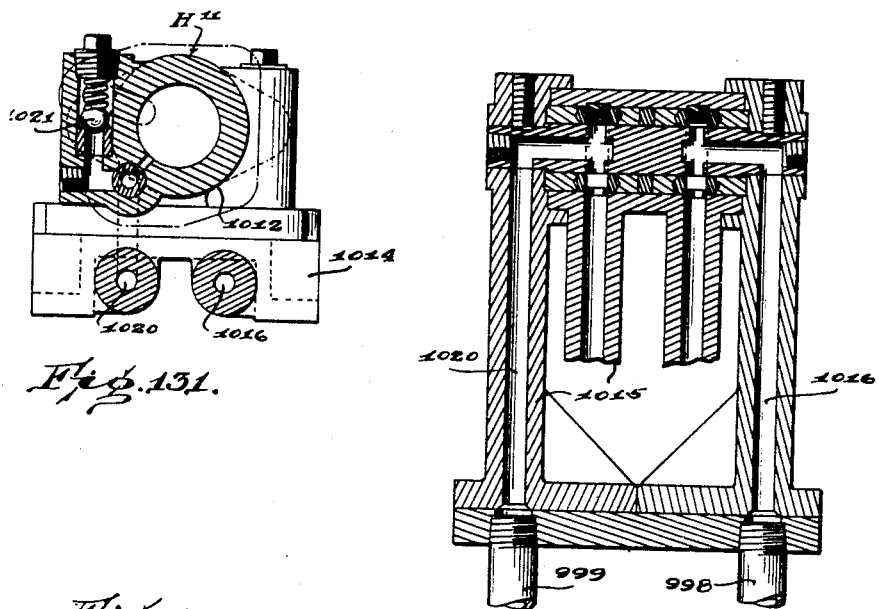
Fig. 131.
Fig. 133.
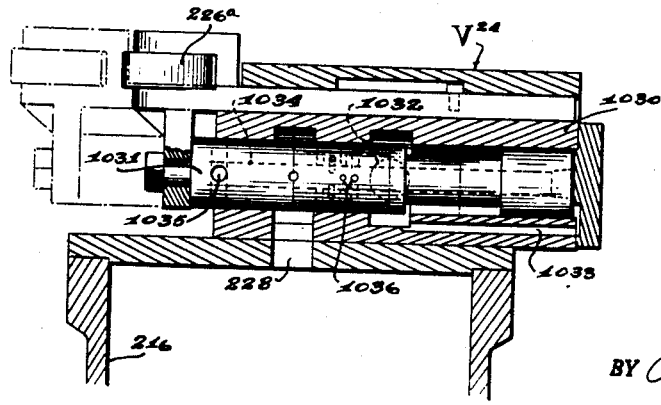
Fig. 132.
J. P. Benoit
C. W. Schreiber
C. C. Kinker
H. A. Rohrich
R. G. Allen
INVENTORS
BY Rule & Hoge
ATTORNEYS.

Patented Dec. 24, 1940

2,225,899

UNITED STATES PATENT OFFICE 2,225,899

MACHINE FOR MOLDING GLASS ARTICLES

Joseph P. Benoit, Clarence C. Kinker, Russell G. Allen, and Harold A. Rohrich, Alton, Ill., and Carl W. Schreiber, Toledo, Ohio, assignors to Owens-Illinois Glass Company, a corporation of Ohio Application April 15, 1937, Serial No. 136,992

49 Claims. (Cl. 49—5)

Our invention relates to machines for molding hollow glass articles including bottles, jars and various other kinds of hollow ware. The invention comprises various features of novelty which may be embodied in machines of the suction gathering type, as, for example, automatic machines of the Owens type. Such a machine includes a horizontally rotating mold carriage on which are mounted dip heads or units, each carrying a suction gathering mold or molds. The dip heads are brought periodically and in succession over a pool or supply body of molten glass. The head is then lowered and the mold thereby brought into dip to receive a charge of glass by suction and form a parison which is thereafter transferred to a finishing mold in which it is blown to the form of the finished article. Our invention in its preferred form is embodied in a machine in which certain of the major operations are effected and controlled by hydraulic mechanism.

In automatic machines now in general use for the manufacture of bottles, jars, etc., many different individual movements or operations are involved in the process of forming a complete article, including the rotation of the mold carriage, the individual movements of the dip heads and gathering molds during the charge gathering operations, the opening and closing movements of the molds, the application of suction and air pressure for gathering and forming the blanks, the transfer movements by which the parisons are transferred to the finishing molds, and various other movements and operations. All of these movements must be coordinated and effected in the proper order of sequence.

In the production of high grade ware it is necessary to provide adjusting means for adjustably regulating the time of initiation and length of duration of different operations as required by changes in temperature and other variable conditions met with in practice. Adjustments must also be made to adapt the various operations to the size, shape, wall thickness and other characteristics of the particular ware which is being produced.

An object of our invention is to provide a practical machine embodying adjustment features to meet the above noted requirements, and which has great flexibility and ease of adjustment, adapting it for use in the manufacture of articles which vary widely in shape, size and other properties.

Another object of the invention is to provide an improved machine of the type comprising a rotary mold carriage on which are mounted a plurality of individual heads or units, which improved machine is compactly built and of smaller size and mold radius than machines of this type now in general use, and, moreover, to provide such a machine which is adapted to make bottles or other articles of various sizes, shapes and capacities, each head operating to make articles of a particular design independently of the size, shape or other characteristics of the articles being made at the same time on the other heads of the machine. In the attainment of this object, we provide a machine driven and controlled by power mechanism which is particularly adapted to provide a wide range and flexibility of adjustment of the timing, extent and duration of various movements or operations, and synchronization of the operations individual to each head or unit with those of the other units of the machine.

A feature of our invention consists in the provision, in a machine of the suction gathering type including a rotating mold carriage and a series of mold carrying heads or units thereon, of novel mechanism for periodically accelerating and decelerating the movement of the mold carriage to permit a slow movement of the carriage during each charge gathering operation and a relatively rapid movement between charge gathering operations. In this manner, the gathering molds while in dip or in contact with the supply body of glass from which they draw their charge by suction, are given a relatively slow movement during the gather. This results in a material reduction in the time required to fill the mold, and insures a good seal between the mouth of the slowly moving mold and the pool or supply body of glass. Our invention, by providing for a slow movement of the molds during the gathering operation, enables such operation to be effected while the mold travels through a comparatively short distance over the supply body and thereby permits a corresponding reduction in the exposed gathering area. This in turn reduces the amount of heat extracted from the molten glass exposed at the gathering area and facilitates the maintenance of proper temperature conditions of the glass entering the molds.

A further object of our invention is to provide improved means for cushioning the finishing mold carriers as they complete their up and down movements, and particularly such cushioning means as coordinated and combined with the hydraulic piston motors for lifting said carriers.

A further feature of the invention relates to novel mechanism for lifting and lowering the dip heads which carry the suction gathering molds.

In conventional suction gathering machines of the Owens type, the lowering and lifting movements of the dip heads are usually controlled by stationary cams. An object of our invention is to provide improved means including air motors individual to the dip heads for lifting them to raise the molds out of dip. The invention further includes cam controlled means supplemental to the air motors to control the lifting and lowering movements of the dip heads. Such cam controlled means being positive in its operation, serves as a safety means to insure the lifting of the dip heads in the event of the air motors failing to effect such lifting movement.

Another object of our invention is to provide improved safety devices to prevent interference between the blank molds and finishing molds, such safety devices comprising means to prevent the normal lifting of the finishing mold in the event of the blank mold failing to open. In the normal operation of the machine, each parison is transferred from a blank mold to a finishing mold by opening the body blank mold, thereby leaving the parison suspended from the neck mold, then moving the open finishing mold upward between the open sections of the blank mold and then closing the finishing mold around the blank. In accordance with the present invention, the finishing molds are lifted by hydraulic piston motors and in order to prevent the finishing mold from being lifted if the blank mold has failed to open fully, our invention provides novel means for controlling the circuits for the hydraulic motor in such manner that the finishing mold cannot be lifted unless the blank mold is fully opened. Our invention further includes manual means by which any selected hydraulic motor may be controlled to prevent lifting of the corresponding finishing mold.

A further feature of our invention consists in the provision of novel indicating devices actuated by and individual to the adjusting devices by which the drip heads are adjusted up and down.

A further object of the invention is to provide novel means for selectively holding or locking any desired dip head or dip heads in their lifted position without interfering with the normal operation of the remaining dip heads and during any desired period of time while the machine is in operation. The invention moreover provides novel means for locking any selected blank mold and neck mold or molds in open position while the corresponding dip head is locked in its up position and thereby held against normal dipping movements. The invention also provides novel mechanism by which the locking device for holding a dip head in its lifted position and the locking devices for holding the molds thereon in open position, are interconnected and operable concomitantly by a single manual device.

Other objects of our invention and features of novelty will appear hereinafter.

Referring to the accompanying drawings:

Fig. 2 is a plan view of the machine base and certain of the parts mounted thereon, including a hydraulic pump which operates through a hydraulic motor to drive the mold carriage, an electric motor for driving the pump, and a slippage pump and its driving motor;

Fig. 3 is a sectional elevation of the machine base and mechanism supported thereby;

Fig. 4 is a section at the line 4—4 on Fig. 3;

Fig. 5 is a diagrammatic view with certain parts shown in section, showing the drive pump, the hydraulic motor driven thereby, and the hydraulic circuits therefor;

Fig. 6 is a sectional plan view showing a portion of the mechanism for lifting and lowering the dip heads;

Fig. 7 is a diagrammatic view showing guiding cams controlling the dip movements of the dip heads and serving to lift said heads in the event the dip mechanism actuated by the piston motors fails to function;

Fig. 8 is a sectional view showing one of the pneumatic piston motors for lifting and lowering the dip heads;

Fig. 9 is a sectional view of a valve controlling the dip head motor;

Fig. 10 is a fragmentary sectional elevation of cam actuated mechanism controlling the lifting and lowering movements of the dip heads;

Fig. 11 is a diagrammatic view of the cam which mechanically controls the movements of the dip heads;

Fig. 12 is a central sectional elevation of a hydraulic pump;

Fig. 13 is a sectional elevation of the same in the vertical plane of its axis;

Fig. 14 is a diagrammatic view of a cam (shown in Fig. 4) for automatically controlling the drive pump and motor by which the mold carriage is driven;

Fig. 15 is a sectional view of mechanism for controlling the dip head pump;

Fig. 16 is a bottom plan view of cam controlling mechanism for controlling the movements of the dip heads;

Fig. 17 is a section at the line 17—17 of Fig. 16;

Fig. 18 is a section at the line 18—18 of Fig. 10;

Fig. 19 is a central vertical section of the finishing mold and its operating mechanism;

Fig. 22 is a sectional plan view of the machine;

Fig. 23 is a sectional view of the safety interlock valve;

Fig. 24 is a fragmentary sectional plan view, the section being taken through the mold carriage, showing valve mechanism controlling lifting and lowering of the finishing mold and the opening and closing of the finishing mold, and a safety interlock;

Fig. 25 is a vertical sectional view of a device to cushion the finishing mold carriage as it completes its downward movement;

Fig. 26 is a horizontal section of the same on a larger scale;

Fig. 27 is a view of the same similar to Fig. 25 but with the parts in a different relative position and the section taken at a different plane, indicated by the line 27—27 on Fig. 26;

Fig. 28 is a sectional detail view of the upper portion of a piston motor for lifting the finishing mold carrier, and shows particularly the cushioning means by which said carrier is cushioned as it completes its upward movement;

Fig. 29 is a sectional view of a valve controlling the lowering of the finishing mold and its carrier;

Fig. 30 is a fragmentary sectional elevation showing a portion of the finishing mold carrier and the piston motor by which it is lifted;

Fig. 31 is a sectional view of a locking device for a trip valve;

Fig. 32 is a section at the line 32—32 on Fig. 31;

Fig. 33 is a section at the line 33—33 on Fig. 32;

Fig. 34 is a sectional view of a "thruster" for maintaining the finishing mold closed after it has been closed by its hydraulic motor;

Fig. 35 is a fragmentary sectional elevation showing a portion of the finishing mold carrier, a cam controlling the tilting movements of said carrier and a hydraulic piston motor for opening and closing the mold;

Fig. 36 is a sectional view of the piston motor shown in Fig. 35;

Fig. 37 is a section through the head of said motor, the section being taken at the line 37—37 of Fig. 36;

Fig. 38 is a rear view of the pipe connections through which operating fluid is supplied to the motor shown in Figs. 35 and 36;

Fig. 39 is a section at the line 39—39 on Fig. 38;

Fig. 40 is a sectional view of a valve controlling a motor for opening and closing a finishing mold;

Fig. 41 is a fragmentary sectional view of a modification of the valve shown in Fig. 40;

Fig. 42 is a sectional view of a valve controlling the piston motor for lifting the finishing mold;

Fig. 43 illustrates a modification of the valve shown in Fig. 42;

Fig. 44 is a sectional view of a high pressure relief valve and a back pressure valve in circuit with the hydraulic motor for driving the mold carriage;

Fig. 45 is a diagram showing a hydraulic pump, hydraulic motors operated thereby for lifting a finishing mold and its carrier and for opening and closing the finishing mold, and valve mechanisms controlling said motors;

Fig. 46 is an elevation view of a finishing mold unit and a "knock-out" mechanism associated therewith, the latter being shown partly in section;

Fig. 47 is a part sectional plan view of the knock-out mechanism;

Fig. 48 is a detail view showing the valve which controls the air supply through the knock-out head to the blown articles within the molds;

Fig. 49 is a front elevation showing a blank mold unit;

Fig. 50 is a sectional side elevation of a blank mold unit, the mold being shown in its lowered position for gathering charges of glass;

Fig. 51 is a side elevation of a blank mold unit with the mold in its lifted position;

Fig. 52 is a section at the line 52—52 on Fig. 51;

Fig. 53 is a section at the line 53—53 on Fig. 51;

Fig. 54 is a section at the line 54—54 on Fig. 53;

Fig. 55 is a detail view of a safety lock forming part of the blank mold opening and closing mechanism;

Fig. 56 is a bottom plan view of the parison mold and its operating mechanism;

Fig. 57 is a diagrammatic view of the slippage pump circuit;

Fig. 58 is a sectional plan view showing a portion of the cam operated mechanism for opening and closing the blank molds;

Fig. 59 is a section at the line 59—59 on Fig. 58;

Fig. 60 is a bottom plan view of the open neck mold and mechanism for operating the blank mold and neck mold;

Fig. 61 is a section at the line 61—61 on Fig. 60;

Fig. 62 is an elevation view of a telescoping vacuum pipe and valve mechanism;

Fig. 63 is a sectional elevation of the same viewed in the opposite direction;

Figure 73:
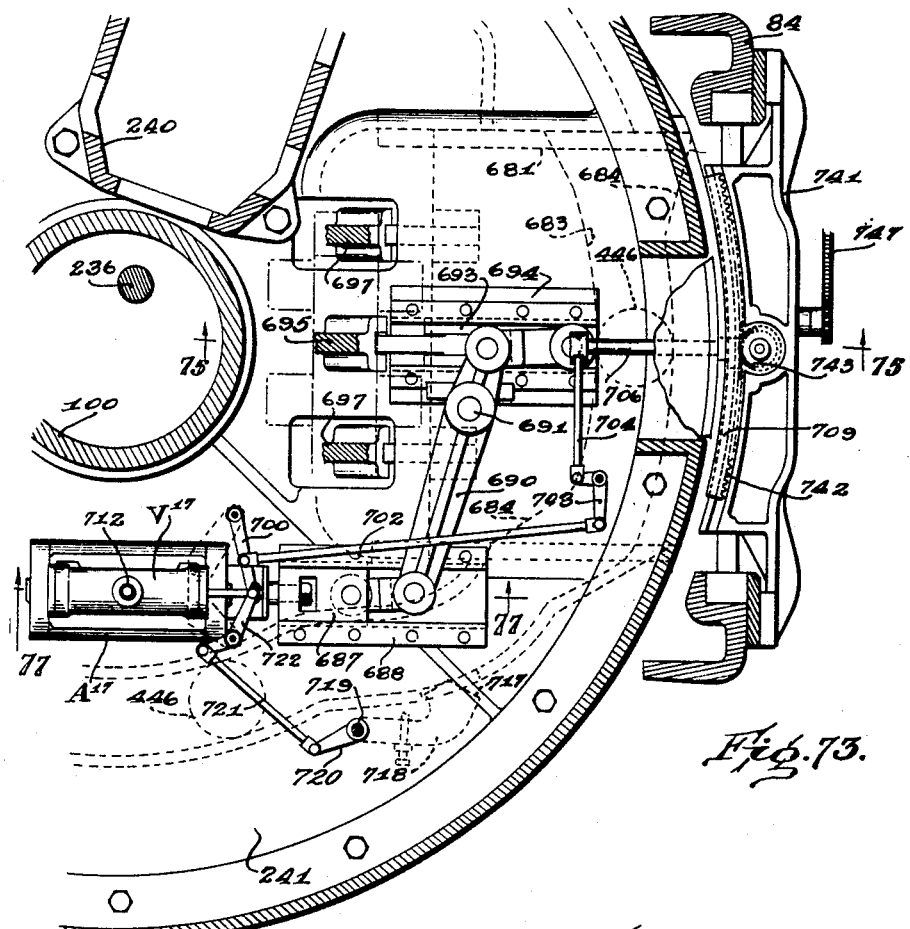
Figure 74:
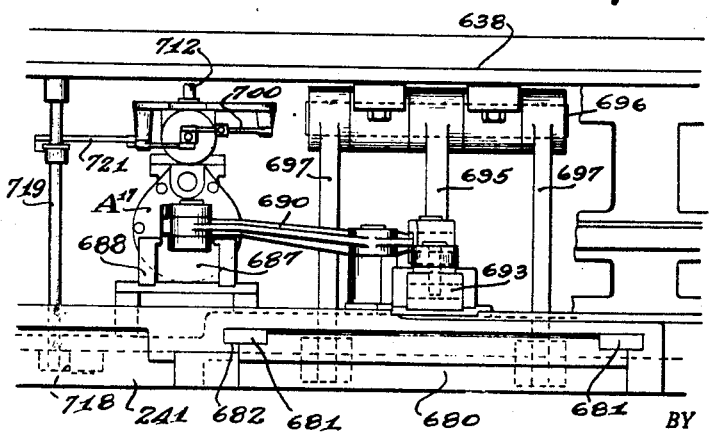
Figure 89:
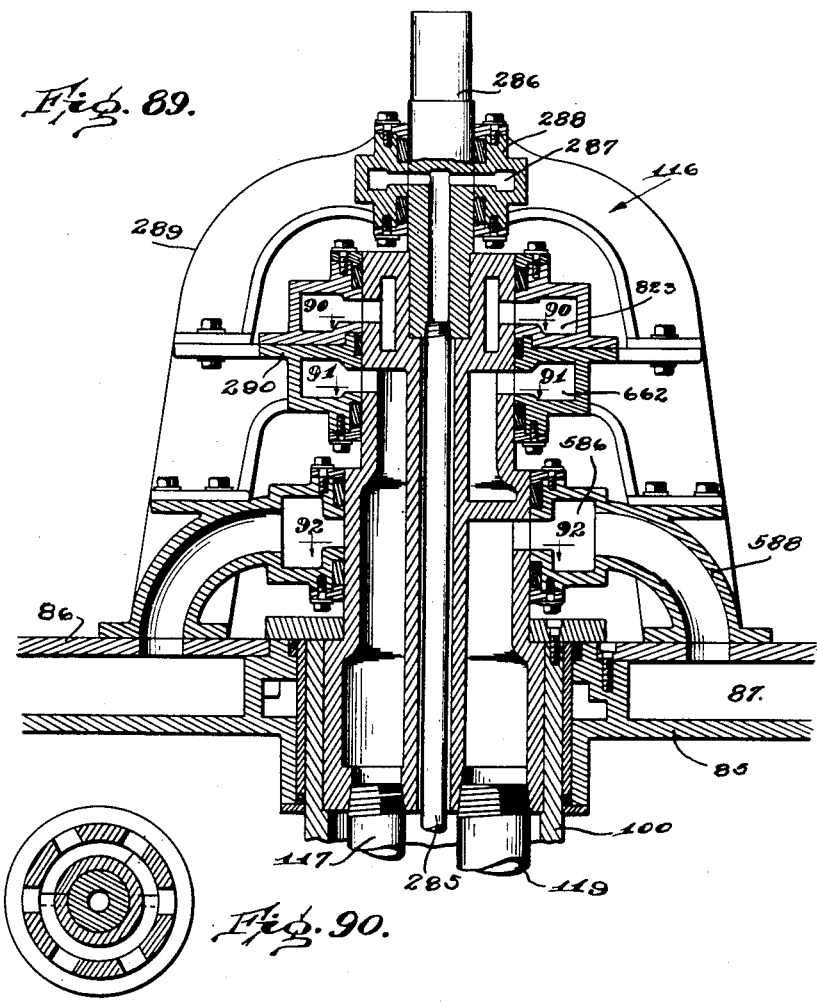
Figure 90:
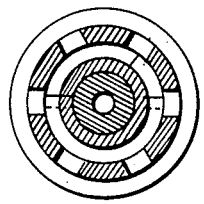
Figure 91:
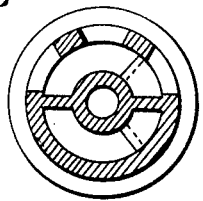
Figure 92:
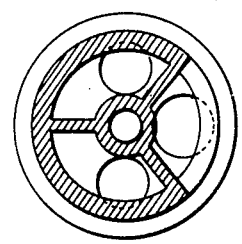
Figure 108:
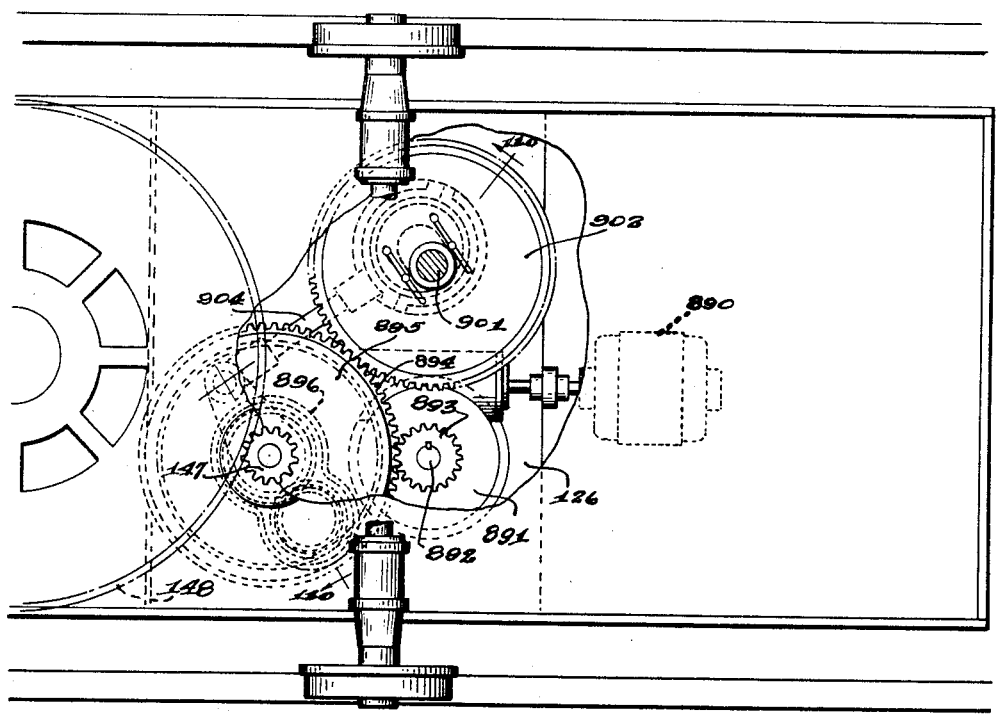
Figure 109:
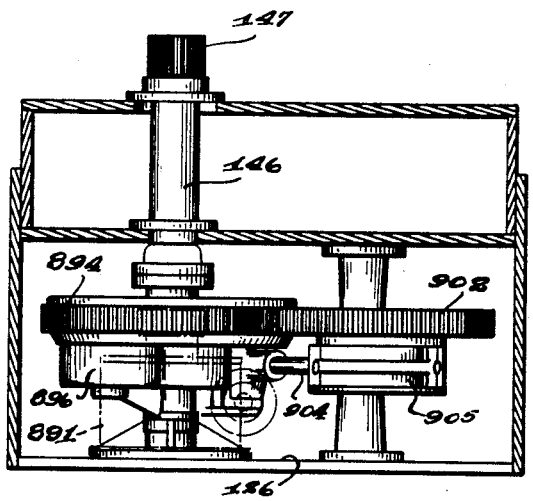

Figs. 64 and 65 are sections at the lines 64—64 and 65—65 respectively, on Fig. 63;

Fig. 66 is a vertical sectional elevation of mechanism for operating the knife shaft;

Fig. 67 is a plan view of the same;

Fig. 68 is a section at the line 68—68 on Fig. 67;

Fig. 69 is a fragmentary sectional elevation showing a pair of plungers, a slide valve, and their operating motor;

Fig. 70 is a top plan view of mechanism shown in Fig. 69;

Fig. 71 is an enlarged section taken at the line 71—71 in Fig. 69;

Fig. 72 is a section at the line 72—72 on Fig. 69;

Fig. 73 is a part sectional plan view of mechanism for effecting and controlling the blank cracking or initial opening movements of the blank molds, said mechanism including the air motors for cracking the blank molds, valve mechanism controlling said motor, one of the cams on the mold carriage for actuating said valve mechanism, and means for adjusting the said cam;

Fig. 74 is a front elevation of a portion of the mechanism shown in Fig. 73;

Fig. 75 is a sectional elevation substantially at the line 75—75 on Fig. 73;

Fig. 76 is an enlarged sectional detail of the adjustable cam shown in Figs. 73 and 75, and the adjusting means therefor;

Fig. 77 is a sectional view showing the air motor for operating the blank crack mechanism, the section being taken at the line 77—77 on Fig. 73;

Fig. 78 is a detail of a cam device controlling the resetting of the blank crack mechanism;

Fig. 79 is a detail view showing a valve and its operating means for automatically controlling a safety valve;

Fig. 80 is a sectional view of the safety valve and operating and controlling means therefor;

Fig. 81 is an elevation view showing the safety valve and actuating devices therefor;

Fig. 82 is a detail view of a manually controlled device for actuating the safety valve;

Fig. 83 is an elevation view partly in section, showing means for adjusting a dip head up and down;

Figs. 84 to 87 illustrate an indicator for showing the adjustment of the dip head;

Fig. 84 is a front view of an indicator;

Fig. 85 is a part sectional view of the same;

Fig. 86 is a detail showing the indicator slide;

Fig. 87 is a section at the line 87—87 on Fig. 84;

Fig. 88 is a plan view showing part of the upper spider of the machine and appurtenant mechanism including the distributing head, a series of hand operated controls for adjusting the knife drop cams, and a series of hand devices for adjusting the cams which control the blank mold plungers or neck pins, said view also showing cams actuated by said adjusting devices and valves operated by the said cams:

Fig. 89 is a sectional elevation of the distributing head by which air pressure and vacuum are distributed, the section being taken at the line 89—89 on Fig. 88;

Figs. 90, 91 and 92 are sections at the lines 90—90, 91—91 and 92—92, respectively, on Fig. 89;

Fig. 93 is a section at the line 93—93 on Fig. 88;

Fig. 94 is a section at the line 94—94 on Fig. 88;

Fig. 95 is a section at the line 95—95 on Fig. 94;

Fig. 96 is an elevation view of a knife mechanism and cooling means for the knife;

Fig. 97 is a section at the line 97—97 on Fig. 96;

Fig. 98 is a section at the line 98—98 on Fig. 94;

Fig. 99 is a fragmentary elevation view showing the knife drop cams and also showing the cam controlling the air supply to the air nozzles for straightening the blanks;

Fig. 100 is a view of the cams for actuating the valves which control the operation of the blank mold plungers and the applications of vacuum or suction to the blank molds;

Fig. 101 is a sectional view of a valve which controls the knife drop mechanism;

Fig. 102 is a horizontal section of a valve for controlling the operation of a mold plunger and its associated valve for applying suction to the mold;

Fig. 103 is a vertical section of the same at the line 103—103 on Fig. 102;

Fig. 104 is a vertical section at the line 104—104 on Fig. 103;

Fig. 105 is a vertical section of the "blowing valve" which controls the application of air pressure for blowing the glass in the molds;

Fig. 106 is a horizontal section of the valve shown in Fig. 105;

Fig. 107 is a diagrammatic view of a timing chart indicating the timing and sequence of the various operations of the machine;

Figs. 108 to 112 inclusive illustrate a modified form of mechanism for driving the mold carriage, in which the hydraulic pump and motor are eliminated;

Fig. 108 shows said mechanism in plan;

Fig. 109 is a sectional elevation through the machine base, showing said driving mechanism;

Fig. 110 is a vertical section at the line 110—110 on Fig. 108;

Fig. 111 is a part-sectional plan view of mechanism shown in Fig. 110, illustrating particularly the means for accelerating and reducing the speed of the mold carriage;

Fig. 112 is a fragmentary sectional view of an eccentric, the section being taken at the line 112—112 on Fig. 111;

Figs. 113 to 117 inclusive illustrate still another form of mechanism for driving the mold carriage mechanically, without the use of hydraulic mechanism;

Fig. 113 is a part-sectional elevation showing such modified driving mechanism and a modified type of machine base;

Fig. 114 is a sectional elevation viewed in a direction transverse to that of Fig. 113;

Fig. 115 is a sectional plan view of the mechanism shown in Figs. 113 and 114;

Fig. 116 is a section at the line 116 on Fig. 115;

Fig. 117 is a vertical sectional view taken at the line 117—117 on Fig. 115;

Fig. 118 is a plan view of manually operated latch mechanism for locking a dip head in its lifted position and locking the blank and neck molds thereon in open position;

Fig. 119 is a vertical section taken at the line 119—119 on Fig. 118;

Fig. 120 is a vertical section at line 120—120 on Fig. 118;

Figs. 121 to 132 inclusive illustrate a modified form of hydraulic circuits and mechanism for operating the finishing mold carrier units and also show a modified construction of a machine base adapting it to the valve mechanism used with and forming a part of said modification;

Fig. 121 is a sectional elevation through the piston motors for lifting and lowering the mold carrier and opening and closing the finishing mold;

Fig. 122 is a transverse sectional view of the motor for opening and closing the finishing mold, the section being taken at the line 122—122 on Fig. 121;

Fig. 123 is a sectional plan view showing a modified form of machine base, mold carrier frame, and cam supporting ring.

Fig. 124 is a plan view showing the modified valve mechanism controlling a finishing mold unit;

Fig. 125 is a diagrammatic view of the modified hydraulic system for a finishing mold unit;

Fig. 126 is a vertical sectional view of a valve controlling a piston motor (Fig. 121) for lifting the finishing mold carrier;

Fig. 127 is a vertical sectional view of a valve controlling the motor for opening and closing of the finishing mold;

Fig. 128 is a vertical sectional view of a modified form of safety interlocking valve;

Fig. 129 is a vertical sectional view of a modified form of cushioning valve for cushioning the mold carrier;

Fig. 130 is a plan view of a piston motor (Fig. 121) for opening and closing the finishing mold;

Fig. 131 is a section at the line 131—131 on Fig. 130;

Fig. 132 is a vertical section at the line 132—132 on Fig. 121, showing a swivel connection in the pipe lines leading to the mold opening and closing motor; and Fig. 133 is a sectional elevation of a valve controlling an air motor for lifting a dip head, being a modification of the valve shown in Figs. 8 and 9.

*General construction*

A general statement of the construction and arrangement of parts will now be given, followed by a more detailed description of the machine and mode of operation. The machine comprises a mold carriage mounted to rotate about a tubular column 100 fixed to and rising from a horizontal plate 101 which forms part of the base of the machine. The mold carriage in the specific form of machine herein illustrated, includes five heads or units symmetrically arranged about the axis of the carriage. Each unit includes a mold group and operating mechanisms.

Each mold group includes a blank mold 102 (see Figs. 1 and 50), and a neck mold 103 above and in register with the blank mold, and a finishing mold 104 (Fig. 19). The blank and neck molds together form a parison mold which, during each rotation of the mold carriage, is brought over a pool 105 of molten glass within a pot or container 106, and lowered into contact with the glass. Suction is then applied for filling the mold cavities.

To permit the lowering of the parison molds into contact with the pool, they are carried by dip heads 107 mounted on dip frames 107a which are lowered by gravity and lifted by air operated piston motors A (Fig. 8) individual to the dip heads. The lifting and lowering movements of the dip heads are also under the direct control of a continuously rotating cam 108 (Figs. 1 and 3) as hereinafter set forth. When the parison mold is lifted out of dip, the glass is severed by a knife 109 (Fig. 67). The blank mold is then opened and the finishing mold 104 (Fig. 19) is lifted by a hydraulic piston motor H¹, and closed around the suspended parisons by a hydraulic piston motor H², the parisons being then blown to final form in the mold.

Figure 1:
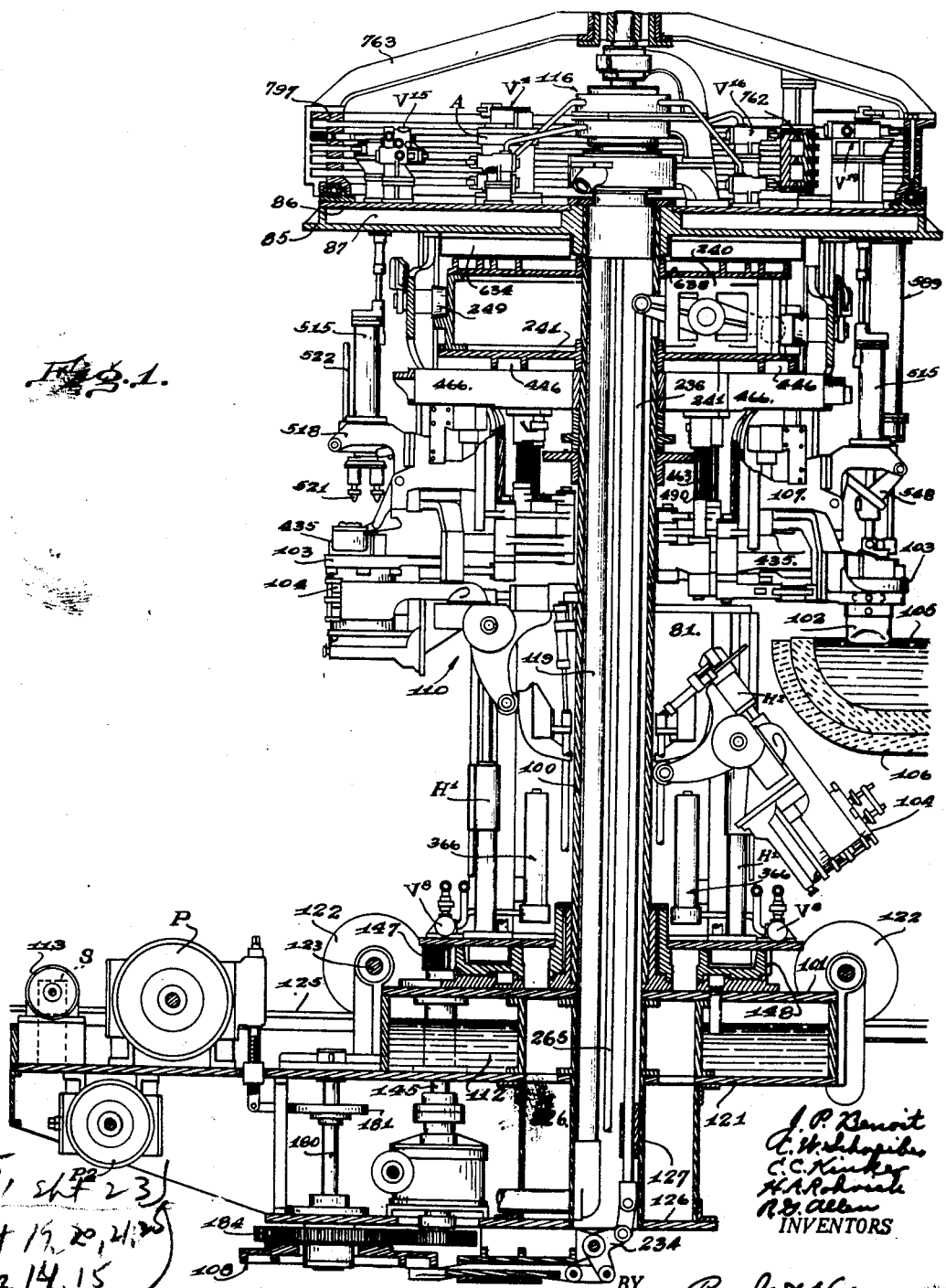
Fig. 1 is a part sectional elevation view of a machine constructed in accordance with our invention.

The mold carriage comprises a circular platform 80 (see Figs. 1, 19, 22) on which are mounted hollow frame members or columns 81 symmetrically arranged around the center column 100, the said frame members being secured to the platform by bolts 82. The frame members 81 are shaped to support and guide the finishing mold carriers which are mounted to move up and down thereon as more fully described hereinafter. As shown in Figs. 1 and 50, for example, this frame work comprising the columns 81, terminates below the dip head mechanism. The frame members 81 provide a support for brackets 83 (see Fig. 50) to which are bolted vertical slide rails 84, the upper ends of which are secured to a spider or table 85 comprising a lower circular plate and an upper plate 86 spaced thereabove to provide a vacuum chamber 87. The brackets 83 are braced against centrifugal strain by means of a flanged ring 85ᵃ surrounding the center column 100 and forming a part of the rotating mold carriage. The guide rails 84 provide guiding supports for the dip frames which are moved up and down during the charge gathering operations.

The mold carriage 110 is continuously rotated horizontally about the axis of the center column 100, but at a periodically varying speed, the movement of the carriage being slowed down during each charge gathering operation. In one form of the invention herein illustrated, the mold carriage is driven by a hydraulic pump P (hereinafter referred to as the drive pump) which is itself continuously driven at a constant speed by an electric motor 111. The drive pump P drives a hydraulic motor H³ which has driving connections, as hereinafter described, with the mold carriage. A slippage pump S (Figs. 2 and 5) driven by an electric motor 113, drains the slippage and excess oil from the pump P and the motor H³ and returns it to the reservoir 112 which supplies oil to the hydraulic pumps and motors.

A hydraulic pump P² (see Figs. 4 and 45), hereinafter referred to as the mold carrier pump, is driven continuously by an electric motor 114, and drives the piston motors H¹ for lifting the finishing mold carriers. The pump P² also actuates the piston motors H² for opening and closing the finishing molds.

Air under pressure for blowing the glass in the molds and for cooling purposes is supplied to the several units through an air pressure and vacuum distributing head 116 (Fig. 89) at the top of the machine, said head being supported on the column 100. The air under pressure is conducted to the distributing head through pipes 117 and 118 (Figs. 18 and 89) which extend upward to the distributing head through the column 100. The application of suction to the molds for gathering and shaping the glass therein is applied through vacuum lines leading from the molds to the vacuum chamber 87 which is in communication with the distributing head from which the main vacuum pipe 119 extends downward through the column 100 and through the base of the machine to a suction pump or other source of vacuum.

Machine base

The machine base (Figs. 1, 2, 3, 4) includes a main base plate or platform 121 which provides a support for the entire machine. Above this base plate is the oil reservoir or tank 112. Wheels 122 which carry the machine are mounted on axles 123 having bearings in brackets 124 attached to the side walls of the tank 112. The wheels run on tracks 125, permitting the machine to be moved to and from the gathering tank 106. A sub-base plate 126 is spaced below the main base plate 121. Beneath the column 100 and in vertical alignment therewith (see Figs. 3 and 19) is a tubular section 127 extending from the cover plate of the oil reservoir downward to the sub-base plate 126. Surrounding the section 127 and concentric therewith are cylindrical walls 128 and 129 which, with the member 127, provide an annular passageway through which cooling air is conducted for application to various parts of the machine, as hereinafter set forth.

Carriage drive

Referring to Figs. 2 to 5, inclusive, the mechanism for rotating the mold carriage is as follows: The rotary hydraulic pump P, when driven by the electric motor 111, draws the oil or other operating fluid from the reservoir 112 through a pipe line 137. The oil is driven by the pumps through a pipe line 138 to the rotary hydraulic motor H³, thereby driving the latter. The oil after circulating through the motor is returned to the tank through a pipe line 139 (Fig. 5), a high pressure relief valve V, a back pressure valve V² and pipe line 142.

The oil in the reservoir is maintained at a working temperature by circulating a temperature regulating fluid through a pipe line 143 (Fig. 2) within the oil reservoir. During the normal operation, this fluid may consist of cold water for extracting heat from the oil. However, in starting the apparatus when cold, it is sometimes necessary to heat the oil to a working temperature and this is done by circulating steam through the pipe 143. The pipe line 137 includes a section 137ᵃ within the oil tank and extending lengthwise thereof, through which section the pipe 143 extends. With this arrangement, the oil supplied to the driving pump P is brought into close contact with the pipe 143 so that its temperature is effectively controlled.

The shaft of the motor H³ has a worm driving connection 144 with a vertical drive shaft 145 which extends upward through a bearing sleeve 146 in the oil reservoir. Secured to the upper end of the drive shaft is a pinion 147 which meshes with an annular drive gear 148 (Figs. 1, 2, and 19) on the lower end of the mold carriage.

A detailed description of the hydraulic circuits and controlling devices for the drive pump P and motor H³ shown diagrammatically in Fig. 5 will be preceded by a description of the construction of the high pressure relief valve V and back pressure valve V² shown in detail in Fig. 44. The high pressure relief valve V includes a valve piston 150 normally held seated by a coil spring 151 which determines the hydraulic pressure required to lift the piston. The tension of the spring is adjustable by means of an adjusting screw 152 to adjustably vary said pressure. Normally the oil flowing through the pipe 139 passes through the valve V and a pipe section 153 into and through the back pressure valve V². An abnormal pressure in the pipe line 139 will lift the valve piston 150 permitting the oil to flow through a by-pass 154 around the valve V² to the pipe line 142.

The back pressure relief valve V² comprises a hollow valve piston 154' which is held in valve closing position by a coil spring 155, the compression of which may be adjustably varied by means of an adjusting screw 156. During normal operation of the machine, the valve piston is held in its lifted or open position by hydraulic pressure supplied through a pipe 157 in the manner presently to be described. When the valve piston 154' is lifted, oil can flow from the valve V through the valve V² to the pipe line 142.

Referring now to Fig. 5, when the drive pump P is started, the oil or driving fluid is drawn from the reservoir 112 through pipe line 137 and is temporarily returned to the tank through a by-pass 158 in which is a hand valve 159. The valve 159 is open when the pump is started but is closed when a certain speed of the pump has been attained, thereby forcing the circulation through the pipe line 138 and motor H³. The motor discharges into the pipe line 139. This line, however, is closed by the valves, V and V², until sufficient pressure is built up in the line 138 and by-pass 157 to lift the valve piston 155, thereby opening the circuit through the return pipe line 142 to the tank 112. If the back pressure valve V² should fail to open, the pressure built up in the line 139 will open the relief valve V permitting the oil to flow through the by-pass 154.

A series of pressure gages, such as 159ª, 160 and 161 (Fig. 5), which may be mounted on a control board, are tapped into the pipe lines of the drive pump and motor system to indicate the operating pressures. Thus the gage 159ª indicates the running pressure applied to the motor H³. The gage 160 indicates the pressure at the suction side of the drive pump, and the gage 161 indicates the pressure at the discharge side of the motor H³.

A second relief valve V³ is provided in a by-pass line 162 which short circuits the motor H³ and its control valves. If the motor H³ should fail to operate or should be subjected to an excess load, a pressure will be built up in the line 138 sufficient to open the relief valve V³ so that the driving fluid is short circuited through the by-pass 162 to the return line 142. A sight glass 163 in the line 162 indicates when oil is passing through the by-pass and thereby enables the operator to tell whether or not the motor is operating properly.

The slippage pump S operates to drain excess oil from the drive pump P and motor H³ through pipes 164 and 165 respectively and return said excess oil through pipe 166 to the tank 112.

An electric contact switch 167 is hydraulically operated by fluid pressure from the pipe line 142 for completing an electrical circuit for the motor 114 which drives the mold carrier pump P². As this switch can only be closed when a certain pressure is built up in the line 142, the mold carrier pump and its motor can only be brought into operation after the drive pump and motor have started. This serves as a safety means to prevent operation of the finishing mold carriers independently of the rotation of the mold carriage 110.

The rotary hydraulic drive pump P, as shown in Figs. 12 and 13, may be of standard construction and need not be described in detail. Briefly, it comprises a casing 170 in which is journaled a driving shaft 171. A rotor 172 is mounted for rotation in an adjusting frame 173, the latter slidably mounted in the casing 170 for reciprocating the rotor within the casing. The shaft 171 has keyed thereto a driving element 174 formed with radially disposed cylinders 175 in which reciprocate pistons 176 carried by said rotor. The frame 173 is provided with a stem 177 extending outward through an opening in the casing and having connections as hereinafter described for shifting the rotor.

When the drive shaft is rotated, the rotor being mechanically connected is rotated therewith. If the rotor is eccentric to the drive shaft, such rotation causes a reciprocation of the pistons and thereby forces a driving fluid to circulate through the pump, the fluid entering by way of one of the ports 178 and leaving through the other of said ports.

The speed of the drive pump P is controlled by cam mechanism which automatically effects the periodic reductions in the speed of the pump required to slow down the mold carriage while the gathering molds are in dip. This cam mechanism will now be described. A vertical cam shaft 180 (Fig. 3) carrying a cam 181, has a driving connection from the shaft 146 by which the cam shaft is continuously rotated. This driving connection between the shafts 145 and 180 includes a bearing sleeve 182 keyed to and forming an extension of the shaft 180, said sleeve rotating in a stationary bearing sleeve 183. The sleeve 182 is formed at its lower end with a flange bolted to the hub of a gear wheel 184 which meshes with a pinion 185 keyed to the shaft 145. The gears are so proportioned that during each complete rotation of the mold carriage, the cam shaft 180 is given a number of rotations equal to the number of heads or units on the mold carriage—in this instance five. The cam 181, which controls the speed of the drive pump P, through mechanism presently to be described, operates therefore, during a complete rotation of the mold carriage, to effect five complete cycles of speed changes of the drive pump, namely, one cycle for each said head or unit.

The cam 181 operates through the following mechanism to control the speed of the drive pump P. A cam roll 201 (see Figs. 3 and 15) runs on the cam 181 and has a link connection 202 with the lower end of a vertically disposed lever 203. This lever has a pivotal mounting in a bearing block 204 (Figs. 3, 4 and 15) which is made in sections secured together by bolts 205.

The connection between the lever 203 and the block 204 includes a rectangular sleeve 206 through which the lever extends and which has a sliding connection with the lever. The sleeve 206 is formed with trunnions 207 journaled in the block 204 and providing a fulcrum for the lever. A vertical adjusting rod 208 (Figs. 4 and 15) extends through the block 204 and has a screw threaded connection therewith. The rod 208 is rotatable manually by means of a handle 209 for adjusting the block 204, and with it the sleeve 206, up and down, and thereby shifting the fulcrum of the lever 203. The block 204 has a sliding connection with a fixed guide rod 210 extending therethrough.

The upper end of the lever 203 (see Fig. 12) is connected to the stem 177 which, as before described, is connected for adjusting the rotor of the pump and thereby adjustably varying the output of the pump, with a consequent variation in the speed of the motor H³ and the mold carriage driven thereby. A coil spring 211 reacts through the lever 203 to maintain the cam roll 201 in contact with its cam.

As diagrammatically illustrated in Fig. 14, the cam 181 is designed to effect a slowing down or deceleration of the mold carriage during the rotation of the cam through an angle of 166° indicated by the arc 213. This corresponds to 33.2° of the mold carriage travel. A dwell portion of the cam then permits the mold carriage to travel at a constant, reduced speed while the mold is in dip and gathering its charge. This dwell portion 214 represents 28° rotation of the cam, corresponding to 5.6° of the mold carriage travel. The mold carriage is then gradually accelerated to its highest speed during the rotation of the cam through 166° or 33.2° of travel of the mold carriage, represented by the arc 215. It will be understood that the proportions just given are by way of example and may be varied as desired to suit varying conditions met with in practice. The extent to which the speed of the machine is varied may be adjusted manually by means of the adjusting mechanism actuated by handle 209 (Fig. 4) as above described.

Dip head mechanism

A description will now be given of the mechanism by which the dip heads 107 which carry the gathering molds, are lowered to bring the molds into dip and then lifted, and by which such movements are positively controlled. As hereinbefore noted, air motors A (Fig. 8) individual to the dip heads are employed for lifting the dip heads, the latter being lowered by gravity. The lifting and lowering movements, however, are positively controlled by cam mechanism, as will presently be described.

The air motors A are mounted on the plate 86, each motor comprising a cylinder 216, a piston 217 and a piston rod 218, the latter extending downward through a bearing sleeve in the vacuum chamber 87. The lower end of the piston rod is connected to a slide block 219 mounted to reciprocate vertically in a slide frame 221 bolted to the underside of the plate 85. A lever 222 pivoted to a bracket 223, is connected at one end by a link 224 to the slide block 219. The opposite end of the lever is connected by a link 225 (Figs. 6, 8 and 50) to the dip head frame 107. When the piston 217 is moved downward, it operates through the connections just described to lift the dip head.

Operation of the motor A is controlled by a slide valve V¹ (Figs. 8 and 9) mounted on the motor cylinder. When a dip head is brought to the dipping station by the rotation of the mold carriage, a cam 226 having a stationary mounting, engages a cam roll 226ᵃ and shifts the valve piston 227 to the Fig. 9 position and releases the air from the motor cylinder through a port 228 in the cylinder head and an exhaust port 229 in the valve. This permits the dip head to move downward by gravity so that the gathering mold 102 is lowered into dip, as shown in Fig. 50. When the valve piston 227 runs off its cam 226, it is reversed by air under pressure supplied through a pipe 230. This reversal of the valve admits pressure through the valve and the port 228 to the motor cylinder. The motor piston is thereby lowered and lifts the dip head.

The air pressure is retained in the cylinder until the dip head again reaches the dipping station. In conventional machines of this type, the dip heads are ordinarily held out of dip by means of a cam roll thereon traveling on a stationary cam track. There is a tendency for the cam roll to chatter on the track and for more or less vibration to be set up when the dip head is supported in this manner. This chattering and vibration of parts is eliminated by the present construction in which the dip head is held in its lifted position by means of the air motor. The stationary track is preferably retained and utilized as a safety means in conjunction with the air motor to hold the dip head from dropping if the motor should fail to do so.

The up and down movements of the dip frames are positively controlled by the cam 108 (Fig. 3) operating through mechanism now to be described. The cam 108 is fixed to the gear 184 to rotate therewith. A cam roll 231 running on the cam is carried by a slide bar 232 connected through a link 233 to one arm of a bell crank lever 234 (Figs. 3 and 10) fulcrumed on the machine base. The other arm of the bell crank lever has a link connection 235 with a rod 236 which extends upwardly through the tubular section 127 in the machine base and within the center column 100, said rod being guided in a stationary bearing 236ᵃ. The upper end of the rod is pivoted to a dip lever 238 (Figs. 6 and 50). Said lever is fulcrumed on a pivot pin 239 mounted in a frame 240 which in turn has a fixed mounting on a cam plate 241, being secured thereto by bolts 240ᵃ (Fig. 6). The cam plate is fixed to the center column 100. The outer end of the dip lever 238 has a pivotal connection with a block 242 which serves as a connector through which the dip heads are connected in succession to the dip lever 238. This connector 242 is mounted to reciprocate vertically and is guided in its movements by guide bars 243 bolted to the frame 240. The pivotal connection between the lever 238 and the connector 242 includes a cylindrical bearing head 244 bolted to the lever, and a bearing block 245 in which the head 244 is journaled. The block 245 is mounted in the connector 242, being free for limited movement radially of the machine to accommodate the arcuate movement of the bearing head 244.

The connector 242 is formed with a track comprising a horizontal lower surface 246 extending the full length of the connector, and an upper surface 247 (Fig. 7) which is comparatively short. When the connector is in its lifted position, the track 246 is in alignment with the stationary cam track 248 on which run cam rolls 249 on the dip frames 107. Extending along the front face of the connector 242 are cam plates 250 and 250' bolted to the cam track 248 and forming extensions thereof. The plate 250 is provided with an inclined surface 251 to permit downward movement of the cam roll 249 as the dip head is lowered. The section 250' has an inclined cam surface 252 along which the cam roll travels as the dip head rises. As shown in Fig. 6, the cam roll 249 is of sufficient breadth to run on both the track 246 and the cam sections 250 and 250'.

As each dip head during its travel with the mold carriage approaches a position over the gathering tank, its cam roll 249 is carried beyond the stationary track 248 onto the cam section 250 and track 246, the latter at the time being in alignment with the stationary track. When the cam roll reaches the inclined cam surface 251, the dip head is permitted to move downward by its own weight, this downward movement, however, being positively held under control by the cam 108 (Fig. 3) which controls the movement of the dip lever 238.

After the dip head has been lowered and the mold has gathered its charge of glass, the air motor A (Fig. 9) is actuated as heretofore described to lift the dip head or assist in lifting it. The cam 108 operates through the dip lever 238 to control and determine the speed at which the dip head is lifted and assists the air motor if the lifting power applied by the air motor is insufficient to lift the dip head. The cam 108 also serves as a positive means to insure the lifting of the dip head.

The cam 250 with its inclined track 251 aids in supporting the dip head during its downward movement. The cam 250' with its inclined track 252 serves as a permanent guide for the cam roll during the lifting of the dip head and operates positively to lift the dip head in the event of failure of the air motor to effect its normal lifting operations.

The upper track section 247 (Fig. 7) overlies the cam roll 249 during the downward movement of the dip head and serves as a positive means to lower the dip head if for any reason it should not be normally lowered by gravity. The track section 247 is made comparatively short and is so positioned that it will not interfere with the lifting of the dip head and the cam roll, if the connector block 242 fails to rise. After the dip head has been raised, the cam roll 249 carried therewith runs off the cam 250' onto or over the stationary track 248.

It will be seen that with the construction just described, the power required for lifting the dip heads is supplied mainly by the air motors A while at the same time the up and down movements of the dip head are definitely under cam control which positively insures the up and down movements of the dip head and positively regulates and determines the rate of said movements. The cam control devices provide a safety feature acting positively to synchronize the lifting and lowering movements of the dip heads with their rotary travel with the mold carriage. In this manner, failure of a dip head to lift its mold at the proper time, which failure might cause interference between the mold and the gathering tank, is positively prevented. When an air motor A has operated to lift its dip head, the air pressure in the motor is continued and the dip head held thereby until the dip head is again brought around to the dipping station. The cam roll 249 is thus held off the stationary cam track 248, for purposes above pointed out. At the same time, the cam 248 positively prevents any untimely dropping or lowering of the dip head.

*Finishing mold carriers and mechanism for lifting and lowering them*

The pump $P^2$, as heretofore noted, operates the hydraulic piston motors $H^1$ (Figs. 4, 19 and 45) individual to the finishing mold units for controlling the up and down movements of the finishing molds and their carriers.

Figure 20:
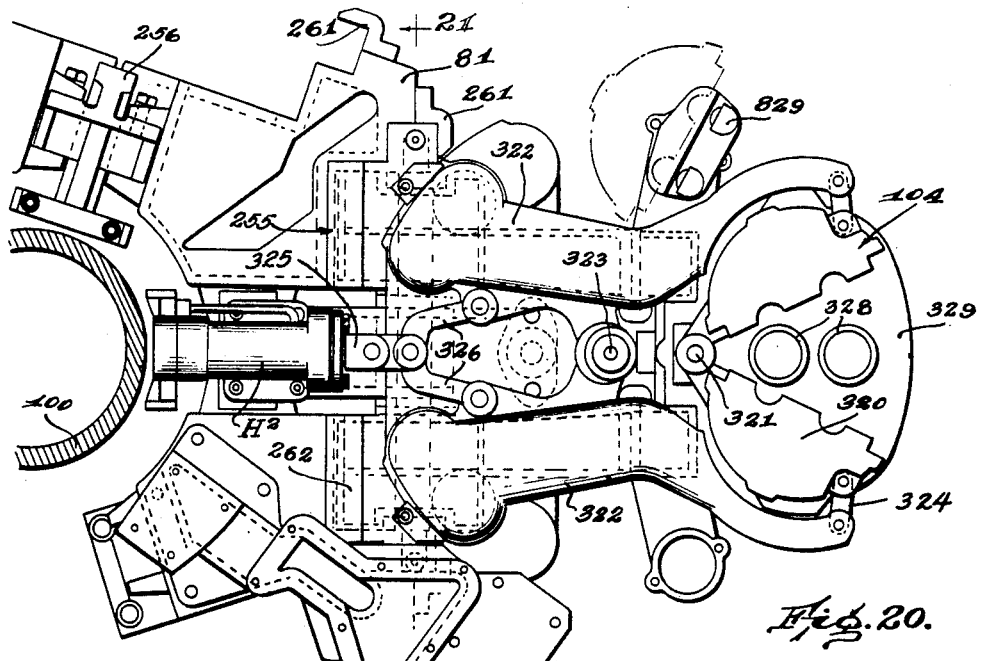
Fig. 20 is a plan view of a finishing mold and its operating mechanism.
Figure 21:
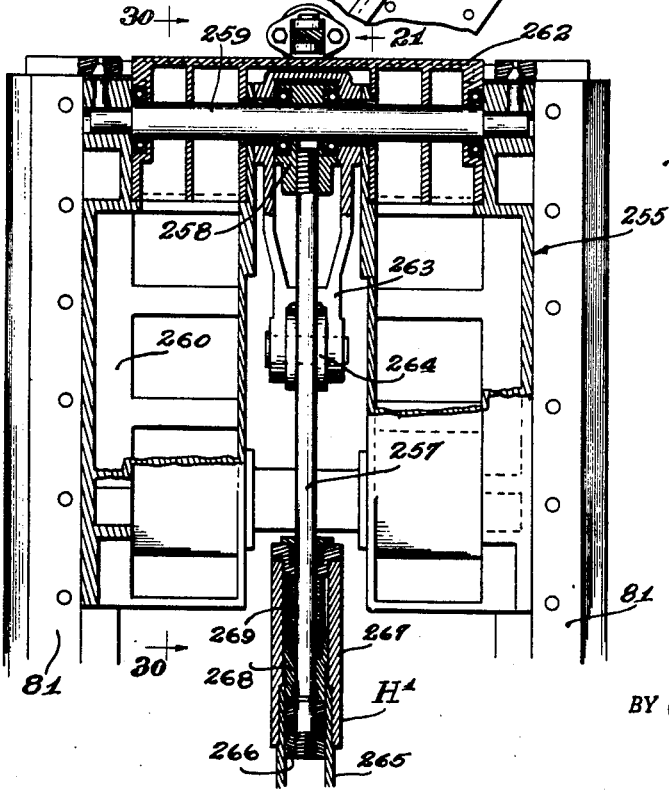
Fig. 21 is a section at the line 21—21 of Fig. 20.

Referring to Figs. 19 to 21, each finishing mold 104 is supported on a carrier unit 255 (herein referred to as a mold carrier) which is reciprocated vertically, the mold also being given a swinging movement under the control of a cam 256. The piston rod 257 of the motor $H^1$ has connected to its upper end a head 258 through which a pivot rod 259 extends transversely, the ends of the pivot rod having bearings in a frame 260 (see Fig. 21) which forms part of the mold carrier unit. Each frame 260 is mounted for vertical sliding movement in the supporting and guiding frame members 81, as heretofore described. Guide strips 261 (Fig. 20) overhang the front faces of the vertically sliding frames 260 and hold them in position within the guiding frame members 81.

Each carrier unit 255 includes a swinging frame 262 journaled on the pivot rod 259 and carrying the mold 104. The swinging section 262 includes a depending arm 263 carrying a cam roll 264 which runs on the cam 256 which controls the swinging movements. Fig. 19 shows the finishing mold in its lifted or parison transfer position. As the mold carrier is lowered, it has an initial vertical movement and then the frame 262 swings inward to the dotted line position (Fig. 19).

This combined vertical and swinging movement permits a very compact arrangement of the parts so that the mold radius of the machine, or the radial distance of the mold from the axis of the carriage, can be made much shorter than with the usual arrangement found in Owens type machines wherein the lifting and lowering of the finishing mold is entirely a swinging movement about a horizontal axis. The present construction also permits the mold to be lowered sufficiently to clear the gathering pot 106 while maintaining a relatively short radius of swing.

Cushioning means are provided in connection with the piston motors $H^1$ for cushioning the finishing mold carriers and bringing them to a smooth easy stop as they complete their up and down movements. The mechanism for cushioning a mold carrier as it completes its upward movement is as follows, having reference to Figs. 28 and 45: The piston motor $H^1$ comprises a vertical cylinder 265 in which the piston 266 reciprocates, said piston having a fixed mounting on the lower end of the piston rod 257. Secured to the upper end of the cylinder 265 and forming an extension thereof is a tubular member or casing 267 within which are a cushioning valve or piston 268 and a coil spring 269 surrounding the piston rod 257. The latter is free for up and down movement through the piston 268. Fluid pressure is admitted to the upper end of the motor cylinder by way of a conduit 270 extending upward through the casing 267 and provided at its upper end with a check valve $270^a$. The downward movement of the piston 268 is limited by a stop shoulder 271 which seats on the upper end of the cylinder 265.

Fig. 28 illustrates the relative position of the parts when the mold carriage has been arrested at the upper limit of its movement. As the motor piston 266 moves upward it strikes the cusioning piston 268 and moves the latter upward while the mold carrier is completing its upward movement. This movement of the piston 268 compresses the coil spring 269 and at the same time gradually closes a series of metering ports 272 provided in the casing 267. As the discharge of oil or fluid above the motor piston is by way of these ports, the flow is gradually throttled, thereby building up resistance to the final upward movement of the piston. This in cooperation with the cushioning spring 269 brings the mold carriage quickly and smoothly to a stop. At the commencement of the downward movement of the mold carrier, fluid under pressure is admitted through the conduit 270 to the upper end of the cylinder. This insures the downward movement of the piston 268 and thereby opening the metering ports 272.

The mold carrier is cushioned as it completes its downward movement by means of a cushioning valve $V^6$ (Figs. 25 to 27 and 45), mounted at one side of the piston motor $H^1$. It comprises a valve casing 275 and a piston 276 within the casing. The piston is provided with a graduated series of grooves 277 extending lengthwise thereof. The valve V⁶ is connected in a fluid pressure line including pipes 278 and 281, opening into ports 279 and 280 respectively, in the valve cylinder. The pipe 281 leads to the lower end of the motor cylinder 265.

As the mold carrier approaches the limit of its downward movement, it strikes a stem 282 which extends upward from the valve piston 276 and moves said piston downward. The port 279 is thus closed by the piston except for the restricted passages provided by the grooves 277, thereby throttling the flow from the motor cylinder. This builds up a back pressure beneath the motor piston, which pressure is gradually increased as the grooves 277 pass below the port 279, thereby bringing the mold carrier to a smooth stop. When the carrier and piston reach the limit of their downward movement, only one of the grooves 277 remains open to the port 279 and acts as a bleed for the final cushioning of the down stroke.

The lifting of the mold carrier is effected by connecting the pipe 278 to the pressure supply as hereinafter described, thus admitting pressure to the port 279. This pressure is transmitted through a drilled opening 282ª (Figs. 26 and 27) to a pipe 283 extending downward and opening into the lower end of the valve cylinder. At the same time pressure is supplied through a channel 284' and a metering port 284 to the port 280 and thence through pipe 281 to the lower end of the motor cylinder 265. A pressure is thereby gradually built up beneath the motor piston until sufficient to start the upward movement of the mold carrier. As the mold carrier rises, the valve piston 276 moves upward therewith until it reaches the Fig. 25 position so that the ports 279 and 280 are placed in direct communication, allowing a full pressure to be transmitted through the valve to the lifting motor H¹, which pressure is maintained until the mold carriage has completed its upward movement.

Hydraulic pressure is transmitted from the pump P² by way of a pipe line (Fig. 45) including a pipe 285 (see Figs. 3 and 89) which extends from the bottom of the machine upward through the center of the column 100. A tubular center post 286 at the upper end of the pipe 285 forms a continuation thereof. This pipe line opens into an oil chamber 287 formed in a casting 288 mounted for rotation with the mold carriage. The casting 288 is carried by arms 289 bolted to a casting 290 which forms part of the rotating distributor head. The center post 286 provides a bearing for the rotating member 288. The pressure line is extended from the chamber 287 at the top of the machine, downward through a conduit 292 (see Figs. 22 and 24) formed in one of the frame members 81, said conduit at its lower end communicating through a pipe section 293 with a distributing pipe line 294, herein referred to as the main header line, which extends entirely around the mold carriage.

Referring to Figs. 22, 24, and 45, each of the mold carrier lifting motors H¹ has associated therewith a valve V⁵, herein referred to as a lifting valve, which controls the lifting of the mold carrier, and a valve V⁷, referred to as a lowering valve, which controls the lowering of the mold carrier. The lifting valve V⁵ (Figs. 42 and 45) includes a valve piston 297 which is moved outward to the valve closing position by a coil spring 298. The lowering valve V⁷ (Figs. 29 and 45) includes a piston 299 connected by a link 300 to one arm of a lever 301 fulcrumed at 302 (Fig. 24) on a bracket 303ª mounted on the platform 80. The other arm of said lever is connected to the piston 297.

In Fig. 45 the lifting motor H¹ and its valves are shown with the parts in the position assumed while the mold carrier remains in its lowered position. When a finishing mold unit approaches the mold lifting position during the rotation of the mold carriage, a cam roll 302ª on the valve piston 297 is actuated by a cam 303 (Fig. 22) herein referred to as the finishing mold raising cam, which moves the valve piston inward. This movement of the valve piston establishes communication between the valve ports 304 and 305, thereby opening a pressure pipe 306 to the pipe 278. Oil under pressure is thus admitted through the valve V⁶ to the lower end of the motor cylinder so that the finishing mold carrier is lifted in the manner heretofore described.

The inward movement of the valve plunger 297 operates through the lever 301 to draw the piston 299 outward to the Fig. 29 position. This closes communication between ports 307 and 309 which communicate respectively with a pressure pipe 308 and a pipe 310, the latter leading to the conduit 270 which opens into the upper end of the motor cylinder. The outer movement of the valve piston 299 connects the pipe 310 with a drain port 311 and thereby permits the oil above the motor piston to be discharged through the valve V⁷ and returned to the tank 112 through a pipe 312.

For lowering the finishing mold carrier, the valves V⁵ and V⁷ are reversed by means of the finishing mold lowering cam 313 (Fig. 22) in the path of a cam roll 314 at the outer end of the link 300. The cam 313 is adjustable circumferentially of the machine for adjustably varying the point at which, during the rotation of the mold carriage, the valves are set for lowering the finishing mold. The lever 301 is held in each of its shifted positions by means of detents 315 (Fig. 24). When the lowering cam 313 has actuated the valves as above described, the pressure pipe 308 is open through the valve V⁷ and pipe 310 to admit pressure to the upper end of the motor cylinder to insure the downward movement of the mold carrier in the manner heretofore described. Each pressure pipe 308 is connected through a pressure valve 316 and pipe 317 to the main header or distributor line 294. The pressure pipe 306 is also connected to the distributor line 294 through pipe 317 and a safety interlock valve V⁸, the function and operation of which will appear hereinafter. The valve 316, which may be structurally similar to the valve V (Fig. 44), serves as a combined pressure relief valve and check valve, and is used to maintain the pressure in the line 317 when supplying oil to the header line 308.

Each finishing mold 104 (see Figs. 19 and 20) includes partible mold sections 320, mounted to swing about a vertical hinge pin 321 for opening and closing the mold. Mold arms 322 which swing about a fulcrum 323, are connected by links 324 at their outer ends to the mold sections. The hydraulic motor H² for opening and closing the mold, comprises a piston rod 325 connected through links 326 to the arms 322. When the motor piston is moved outward, it operates through the links 326 and lever arms 322 to close the mold, the mold being opened by an inward movement of the motor piston.

The mold bottom 328 is removably mounted on a supporting plate 329 which also carries the hinge pin 321. Said supporting plate and the mold thereon are adjustable up and down by means of a rack 330 connected to the plate and a pinion 331, the latter connected to a shaft 332 mounted in the frame 255. By rotating the shaft 332, as by means of a wrench, the mold is adjustable up and down.

The construction of the motor $H^2$ for opening and closing the finishing mold and the means for conducting oil or operating fluid to and from the motor while permitting it to swing with the mold carrier, will now be described, reference being had to Figs. 35 to 39 inclusive. The motor includes a piston 335 which is reciprocated in the valve cylinder or casing 336 by fluid under pressure applied alternately to the opposite sides of the piston. Pressure lines 337 and 338 communicate with the rear and front ends respectively of the valve cylinder.

In order to permit the swinging movements of the mold carrier, the pressure lines include extensible sections, each comprising a pipe 339 closed at its upper end, and a tube 340 mounted thereon for movement lengthwise thereof. The internal diameter of each tube 340 is somewhat greater than the external diameter of the pipe 339 extending therethrough, thus providing a chamber which is open to the pipe 339 through a port 341 in the latter. The pipe sections 339 are pivoted to a header 342 having a fixed mounting on the mold carriage, said pipe sections being in communication through said header with the pipe lines 337 and 338 respectively. The tubes 340 are formed with lateral extensions 343 to which are connected pipe sections 344 connected at their upper ends to elbow joints 345, said joints having a pivotal connection with the head 346 of the motor cylinder. One of said elbows is formed with a passageway 347 opening into the motor cylinder; the other is provided with a passageway 348 communicating with a channel 349 extending through the motor casing to the front end thereof.

A check valve 350 in the form of a sliding plunger is mounted in the motor casing in the forward end of the channel 349 and is held on its seat by a coil spring 351. The spring is held in place by a screw-threaded cap 352 which carries a cleaning wire 353 extending through a longitudinal port 354 in the valve plunger and into the channel 349. Movement of the valve plunger 350 along the said wire tends to prevent the port 354 from becoming clogged by any small particles of foreign substance in the oil. The valve plunger 350 is formed with a transverse opening 355 which communicates with a port 356 leading into the interior of the main valve.

When oil under pressure is supplied through the channel 349 to effect an opening of the finishing mold, the check valve is opened, compressing the coil spring 351. When the motor $H^2$ is reversed by applying pressure behind the piston 335 and moving the latter forward, such forward movement forces the oil in front of the piston through the ports 356 and 355 into the passageway 349. A port 357 opening from the conduit 349 to the interior of motor cylinder, is closed by the piston 335 when the latter is in its forward position but is opened as the piston moves rearward.

The motor $H^2$ is under the control of the valve $V^9$ (Figs. 40 and 45). This valve comprises a casing 360 in which reciprocates a valve piston 361. A coil spring 362 moves the piston to its outward position. The valve casing is provided with a series of ports or chambers $36^a$, $36^b$, $36^c$, $36^d$, $36^e$, $36^f$. The end chambers $36^a$ and $36^f$ are in communication through a channel 363 extending through the valve casing. A ball check valve 364 is interposed between the channel 363 and a port 365 which opens into the main chamber of the valve at the inner end thereof.

The finishing mold unit includes an accumulator 366 (Figs. 34 and 45) which supplies hydraulic pressure to the motor $H^2$ for closing the molds, the accumulator being under the control of the valve $V^9$. The accumulator includes a vertical cylinder 367 within which is a piston 368. The piston is adapted to be moved upward within the cylinder by hydraulic pressure supplied through pipes 308, $308^b$ and 369, thereby compressing a coil spring 370 mounted within the cylinder. The upward movement of the piston is limited by a stem 371 engaging the head of the cylinder. Oil for charging the cylinder is supplied from the main header line 294 through the pressure pipes 308 and 369.

Fig. 45 shows the piston of the motor $H^2$ in its forward position, with the finishing mold closed. The motor controlling valve $V^9$ is also in a position to maintain the mold closed by means of pressure supplied from the accumulator 366. This pressure is transmitted through the line 369 to a port 372 in the safety interlock valve $V^8$, said port being in communication with a port 373 which is open to a pressure pipe 374 leading to the valve port $36^c$ which is open to the port $36^b$. The pressure line 337 extends therefrom to the outer end of the motor cylinder. Pressure is transmitted from the accumulator through the circuit just described for holding the motor piston in the mold closing position.

The valve plunger 361 of the valve $V^9$ is moved inward against the tension of the spring 362 by means of a stationary cam 375 (Fig. 22) for effecting the opening of the finishing mold. The cam is adjustable lengthwise to adjustably vary the time of opening the mold. The valve piston is held in its inward position by a latch mechanism 377 (Figs. 24 and 31 to 33). This mechanism comprises a vertical slideway 378 having mounted therein a hollow slide 379 provided at its lower end with a cam roll 380 for engagement with a stationary inclined cam 381 (Fig. 22). A latch member 382 slidably mounted within the hollow slide, is provided with a finger 383 for engagement with a notch 384 in the valve stem 361. A stop member 386 secured to the slideway 378 projects into the slide 379 to limit the downward movement of the latch 382. A coil spring 385 disposed between the stop 386 and the bottom of the slide, exerts a continuous downward pressure on the slide.

An adjusting screw 387 having threaded connection with the latch, is provided with a neck 388 to engage the slide 379 for raising and lowering it. Rotation of the adjusting screw will cause a vertical adjustment of the slide 379 and cam roll 380, thereby changing the elevation of the point of contact between the cam roll 380 and the cam 381. In this manner the point at which, during the rotation of the mold carriage, the latch is lifted to release the valve stem 361, may be adjustably varied.

The cam 375 (Fig. 22) is arranged to shift the valve piston 361 inward, as above described, to cause opening of the mold at the delivery station.

When this inward movement of the valve piston occurs, the latch finger 383 drops into the notch 384 to hold the valve piston until the latch is released by the cam 381.

The inward movement of the valve piston 361 in the manner just described establishes a pressure line extending to the front end of the motor H² for operating the latter to open the finishing mold. This pressure line extends from the main distributor line 294 through pipe line 390, valve ports 36ᵈ and 36ᵉ, line 391, through a safety shut off valve V¹⁰, and pressure line 338 which as heretofore described, extends to the forward end of the motor cylinder. The motor piston is thereby moved inwardly or to the left and operates to open the mold. During this operation of the motor, the oil behind the piston is exhausted through the pipe 337 and through the communicating valve ports 36ᵇ and 36ᵃ, the latter being open to a drain pipe.

*Automatic safety valve mechanism*

In order to prevent possible interference between the blank molds and finishing molds, particularly upon failure of the blank molds to fully open, safety valve mechanism is employed which operates automatically and which also may be actuated manually to control the fluid circuits for the valves which control the lifting of the finishing mold carriers and the opening and closing of the finishing molds. This control mechanism is such that upon failure of a blank mold to fully open, the corresponding finishing mold carrier is automatically arrested in its upward movement, and the motor H² which controls the opening and closing of the finishing mold is locked against mold closing movement.

This automatic mechanism includes the safety interlock valve V⁸ (Fig. 45) which controls the hydraulic circuits for the mold carrier lifting valve V⁵ and the mold opening and closing valve V⁹. The operation of the interlock valve V⁸ is controlled by an automatic safety valve V¹¹, the latter also controlling the safety shut-off valve V¹⁰ heretofore mentioned. The safety interlock valve includes a piston 395 which is normally held in the Fig. 45 position by a spring 396. This piston controls the ports 372 and 373 heretofore described and also controls ports 397 and 398 which establish communication through the valve between the pressure lines 317 and 306.

The construction of the automatic safety valve V¹¹ and its actuating and controlling mechanism will be understood by reference to Figs. 79 to 82 inclusive. Said valve includes a casing 399 in which valve plungers 400 and 401 are movable up and down. An actuating rod 402 has a lost motion connection with the lower plunger 400 permitting movement of the latter up and down relative to said rod. The upper plunger 401 is also loosely mounted on the rod and is movable thereon independently of the lower plunger. The plungers are held in their lowered position by a coil spring 403 mounted on the rod and held under compression between the upper plunger 401 and a collar 404 keyed to said rod. The upper valve plunger 401 is adapted to be automatically lifted by means of a bell crank lever 405, one arm of which engages a shoulder 406 on the upper end of the plunger. The other arm of the bell crank carries a cam roll 407 in the path of a cam 408 on the finishing mold carrier frame 260.

Manual means for lifting the rod 402 and thereby actuating the valve, is illustrated in Figs. 81 and 82. Such means includes a hand wheel 409 mounted on a stub shaft 410 secured to an attaching plate 411 which may be located at any convenient point on the mold carriage, and as shown is mounted on one of the brackets 83 which as heretofore described are a part of the frame frame work of the mold carriage. The handle 409 has formed thereon an eccentric 412 which engages a slide plate 413 attached to the upper end of the rod 402 and movable up and down in guides 413ᵃ on the attaching plate 411. Rotation of the hand wheel operates through said eccentric to lift or lower the rod. The latter is held in its lifted and lowered positions by means of a spring actuated detent 414 which seats in recesses formed in the plate 413.

The valve V¹² (see Figs. 79 and 80) is mounted on the mold carriage in the path of a slide block 415 which, as hereinafter described, is operatively connected with the blank mold for opening the latter as the slide block is moved to the position shown in Fig. 79. The valve V¹² includes a plunger 416 which is normally held projected by air pressure applied continuously through a pipe 417. When the plunger is in its projected position it opens the pressure pipe 417 through a channel 425 in the valve piston to a pressure pipe 418 which extends to a port 419 in the valve V¹¹. When the slide block 415 is moved to the position shown (Fig. 79), so that the blank mold is fully opened, the plunger 416 is retracted and held thereby as shown in Fig. 80 so that the pressure line is closed and the pipe 418 is open to the atmosphere through a channel 421.

The operation of the safety valve mechanism is as follows: If the machine is operating normally the slide block 415 actuates the valve V¹² as above described, moving the valve plunger inward as the blank mold is brought to open position. As the blank mold opens, the finishing mold carrier moves upward to bring the finishing mold to the blank transfer position for closing around a suspended blank. During this upward movement of the mold carrier the cam 408 operates through the bell crank 405 to lift the upper plunger 401. This movement of the valve plunger opens communication between the port 419 and a port 422 by way of a channel 426. A pipe 423 extends from the port 422 to a port 424 in the bottom of the valve casing.

During normal operation of the machine, this lifting of the valve plunger 401 is merely an idle movement with no effect on the other valve mechanism. If, however, the blank mold has not been fully opened or if for any other reason the blank mold slide 415 has not retracted the valve plunger 421, then the pressure pipe 417 remains in communication with the pipe 418, so that when the plunger 401 of the valve V¹¹ is lifted, the pressure is transmitted through the valve by way of channel 426 and thence through pipe 423 to port 424. This pressure operates to lift the lower valve plunger 400, thereby closing the drain pipe 427 and opening a pipe line 428 to a pressure pipe 308ᵃ (see Fig. 45) forming a branch of the pressure line 308.

This pressure in the line 428 is transmitted through a branch pipe 428 (Fig. 45) to the safety interlock valve V⁸ and moves the valve piston 395 to the right, compressing the spring 396. The valve piston thereby closes the ports 397 and 398, thus cutting off the line 306 through which oil under pressure is supplied by way of the valve V⁵ to the lower end of the motor H¹, so that the upward movement of the finishing mold and its carrier is stopped. The actuation of the safety interlock valve piston also closes the ports 372 and 373, thereby cutting off the pressure line extending from the accumulator 366 to the motor H², so that closing of the finishing mold is prevented. The pressure in the line 428 is also transmitted to the safety shut-off valve V¹⁰ and operates to lower the valve piston 429 against the tension of a spring 430. This cuts off the pressure line 338 leading to the front end of the motor H² and locks the motor piston against forward movement, thereby positively preventing closing of the finishing mold.

Lifting of the finishing mold carrier and closing of the finishing mold may also be prevented by operating the hand wheel 409 to lift the rod 402 and with it the valve plunger 401. By means of the detent 414 (Fig. 82) the valve plunger may be retained in its lifted position. Thus any desired finishing mold unit or units may be temporarily held against operation for any desired length of time while the remaining units are operating normally.

Fig. 43 illustrates a valve V¹³ which is a modification of the valve V⁵ controlling the motor H¹ (Fig. 45) for lifting the finishing mold carrier. Valve V¹³ includes a safety feature which cooperates with the safety valve V¹¹ to prevent or arrest the upward movement of the finishing mold carrier independently of the safety interlock valve V³, so that the latter may be eliminted. The general construction of the valve V¹³ and particularly the arrangement of the ports are substantially similar to those of the valve V⁵ (Fig. 42). Fig. 43 shows the valve plunger 297' in its inward position to effect the lifting of the finishing mold carriage. Oil under pressure enters the valve through the port 304 and leaves the valve by way of port 305 to the pipe 278 (see Fig. 45). The inner end of the plunger 297' has a reduced shank 380' slidable within a piston 381' mounted to reciprocate within the valve chamber. A lost motion connection is provided between the said shank and piston by means of a pin 382' secured to the piston and extending through a slot 383' in the shank.

When the plunger 297' is drawn outward to its projected position, shown in broken lines, (corresponding to the position of the plunger 297 as shown in Fig. 45), it draws the piston 381' to the right and thereby closes the pressure port 304 and also opens the port 305 to the exhaust. This permits the finishing mold carrier to be lowered in the manner heretofore described. When the safety valve V¹¹ is operated in the manner heretofore described to supply pressure through the line 428, this pressure is admitted to the inner end of the valve V¹³ as shown in Fig. 43 and moves the piston 381' to the right, thereby closing the port 304 in the pressure lline leading to the motor H¹. This operates as already described to prevent further upward movement of the mold carrier.

Fig. 41 illustrates a valve V¹⁴ which is a modification of the valve V⁹ (Figs. 40 and 45), which controls the mold opening and closing motor H² and embodies a safety feature for locking the motor H² to prevent mold closing operation, which is one of the functions of the safety interlock valve when the latter is used. In Fig. 41 the inner end of the valve plunger 361 is provided with an enlargement or head 385' which forms a piston. The pipe 428 opens to a port 387' in front of the piston 385' so that when oil under pressure is admitted through said pipe, the plunger 361 is moved to the left against the tension of the spring 362. This closes the pressure line 337, 374 between the accumulator 366 and the motor H² thus preventing operation of the motor for closing the finishing mold.

*Parison mold and head group*

Figs. 49 to 61 inclusive illustrate the mechanism comprising a parison mold unit, the description of which follows:

The dip head 107 as heretofore described is carried on the dip frame 107ᵃ mounted for vertical sliding movement in slide rails 84. The cam roll 249 periodically connects the dip frame with the lowering and lifting means, hereinbefore described, for bringing the blank mold 102 into and out of contact with the supply body of molten glass. The mold 102 is supported on a head plate 435 (Fig. 50) forming part of the dip head 107 which is carried by and vertically adjustable on the dip frame 107ᵃ. The dip frame 107ᵃ which extends inwardly in substantially semi-circular form, is provided with vertical slideways 436 (Fig. 53) in which are mounted for vertical movement, ribs 437 on the mold supporting head plate 435.

Mechanism is provided for adjusting the dip head 107 up and down relative to the dip frame. Such mechanism includes a threaded rod 438 (Fig. 50), the upper end of which is journalled for rotation in a housing 439 secured to the dip frame. The lower end of the rod 438 is threaded into a sleeve 440 connected to the head plate 435. Rotation is imparted to the rod 438 by means of a worm gear 441 secured to the upper end thereof within the housing 439. The worm gear is engaged by a worm on a shaft provided with a hand wheel 442. Rotation of the hand wheel effects a vertical adjustment of the blank mold group in relation to the finishing mold unit, as is at times necessary to insure proper registration of the molds during the operation of the machine.

Each blank mold 102 comprises a pair of mold halves, supported by arms 443 journalled on a hinge pin 444 carried by the head plate 435. The opening and closing movements of the blank molds are effected by a stationary cam 445 (Figs. 50, 51) on which runs a cam roll 446 having operating connections with the mold through mechanism which will now be described.

Such mechanism includes pairs of links 447 pivoted to the mold arms 443 and connected through links 448 with crank arms 449 (Figs. 60, 61). The cranks 449 are mounted on shafts 450 (Fig. 61) journalled in the head plate 435 and extend upwardly therethrough. Secured to the shafts 450, near their upper ends, are arms 451 to which are pivoted rods 452 which extend through upstanding ears 453 on the head plate 435. Springs 454 carried on the rods are held under compression between the ears 453 and nuts threaded on the free ends of the rods.

The inner end of the head plate 435 is provided on its underside with slideways 455 adapted to receive a slide block 456 (Figs. 50, 56, 60 and 61). An equalizing bar 457 extending transversely through the slide block is connected by a pair of links 458 to the arms 448. By reference to Fig. 56, it will be seen that when the molds are in closed position, the links 447 and 448 have been pushed outwardly by the equalizing bar 457 and the links 458 slightly beyond the straight line position. The springs 454 operating through the rock shafts 450 also exert a pressure on the links 448, thus securing a positive locking of the molds in closed position.

The blank mold slide 456 is connected to a crank arm 460 by means of a draw link 461 connected by a pivot 462 to the slide block. The crank arm 460 is secured to a vertical shaft 463 journaled in the head plate 435. The upper end of the shaft 463 has a splined connection 464 with a bearing sleeve 465, mounted for rotation in a frame 466 mounted for rotation with the mold carriage. The frame 466 as shown in Figs. 58, 59 is of hollow rectangular form and extends radially of the mold carriage. A rock arm 467 is keyed to the sleeve 465 within the frame 466 and is adapted to impart motion to the shaft 463 for opening and closing the blank mold.

A pair of slide blocks 468 and 469 are mounted for horizontal reciprocating movement within the frame 466. The upper slide block 468 carries the cam roll 446 which, as above mentioned, runs on the cam track 445. Secured to the upper side of the block 468 at its inner end and extending rearwardly thereof, is a stop block 471 (Figs. 50 and 55) having pivoted thereto a latch 472 normally extending forwardly and downwardly.

The lower slide block 469 is connected to the rock arm 467 (see Fig. 58) by a link 473.

Operating connections between the upper slide block 468 and the lower slide block 469 include the downwardly inclined latch 472 which bears against shoulders 474 (Fig. 55) slightly inclined from the vertical, formed on a sleeve 475 mounted in a cylindrical opening in the lower slide block 469. The sleeve 475 is capable of limited horizontal movement against the pressure of a coil spring 476 mounted within the sleeve. The forward end of the spring bears against a collar 477 threaded into the block 469. A rod 470 secured at its inner end within the sleeve 475 forms a support for the spring. A latch releasing bar 478 having an upwardly and outwardly inclined face, is secured to the block 469 and extends between the inclined shoulders 474 on the sleeve 475.

It will be noted that outward pressure of the cam 445 against the cam roll 446 will cause the latch 472 to bear against the inclined shoulders 474. The coil spring 476 is of sufficient strength to withstand the normal pressure necessary for closing the molds, so that the relative positions of the latch and the shoulders 474 will remain unchanged during the mold closing movement. Should some obstruction or breakage occur which prevents the closing of the mold, the latch 472 bearing against the shoulders 474, moves the sleeve 475 forward against the pressure of the coil spring until the latch overrides the sloping face of the releasing bar 478 and is thereby disengaged from the shoulders 474. This breaks the driving connection between the upper and lower slide blocks 468 and 469.

*Neck mold mechanism*

The neck mold 103 (see Fig. 60) comprises a pair of standard neck mold halves supported in a pair of arms 480 pivoted on the hinge pin 444. The arms 480 are provided rearwardly of the hinge pin with extensions 481 which are connected through links 482, to a drawbar 483 slidably mounted (Fig. 61) in the slide block 456. A draw link 484 (Figs. 50, 56) pivoted to the drawbar 483 by a pivot 485, provides operating connection with a rock arm 486 mounted on a vertical shaft 487 (see Figs. 51, 52) carried at the inner end of the head plate 435.

A pair of meshing gear segments 488 and 489 are secured respectively on the shaft 487 and a shaft 490 so that the rotation of the shaft 490 imparts movement to the neck mold through the mechanism just described. The shaft 490 is splined and its upper end is disposed within a splined sleeve 491 (see Fig. 54) rotatably mounted in the frame 466 and held against vertical movement by a collar 492. An arm 493 carrying a cam roll 494 is keyed to the sleeve 491. A stationary cam plate 495 supports a cam 496 (shown in dotted lines in Fig. 51), which cam periodically engages the cam roll 494 and operates through the mechanism just described to open the neck molds.

Means for closing the neck molds comprises a spring 497 (Fig. 52) mounted on a rod 498 pivoted at one end to the gear segment 489 and having its opposite end extending freely through an opening in an upright flange 499 mounted on the plate 435. The tension spring 497 exerts pressure against the gear segment 489, thereby operating through the above described mechanism to close the neck mold and tending to hold it in closed position.

*Blank and neck mold lock*

Figs. 51, 53 and 58 further illustrate means whereby the blank and neck molds may be locked in open position should occasion arise which makes it desirable to maintain a particular head out of service during the operation of the machine.

The mechanism comprising the lock includes a housing 500 secured to one side of the frame 466. A latch member 501 (Fig. 58) is slidably mounted in the housing and consists of a rectangularly shaped bar formed at its inner end to fit a notch 502 cut in one of the ribs carried by the slide block 469. The outer end of the bar 501 is provided on one side with gear teeth 503 adapted to mesh with a gear 504 for moving the bar into and out of locking engagement with the slide block 469. A shaft 505 to which the gear 504 is secured, extends downwardly and carries a second gear meshing with teeth on a second latch bar 506. The bar 506 extends toward the neck mold shaft 490 and has locking engagement with an outwardly and upwardly extending ear 507 attached to the cam roll arm 493. A lug 508 (Fig. 51) formed on the sleeve 491 forms a stop for the latch bar 506 when the said bar is in locking position.

The latch bar 506 (see Fig. 53) is projected to locking position by a pressure spring 509, thereby effecting the simultaneous locking of both the blank and neck molds with the molds wide open. The latch bars 501 and 506 are forced by pressure of the spring 509 into their respective notches, thus holding the molds open until the bar 506 is withdrawn by a handle 510. The bar 506 is held in its retracted position by a suitable detent (not shown).

*Dip head support*

As before pointed out, each finishing mold is periodically lifted to a position at which it can be closed around the parison supported in the corresponding neck mold. It is important that the molds while thus in register be held against any relative movement. As a certain amount of vibration is imparted to the dip heads while they are supported by and travel along the stationary cam, means are provided for supporting each dip head directly on the corresponding finishing mold carrying frame 260 (Fig. 51) during such registration of the molds. For this purpose, each dip frame is provided with legs 512 in alignment with the finishing mold frame 260 therebeneath so that when the latter is lifted to bring the finishing mold into line with the neck mold, the frame 260 lifts the dip frame a short distance. This raises the cam roll 249 out of contact with its stationary cam track thus preventing vibration of movement of the dip head relative to the finishing mold frame.

Tapered levelling pins 513 mounted on the frame 260 are adapted to register with bushings in the legs 512. As the finishing molds rise, the pins 513 enter the bushings so that while the dip frame is supported on the finishing mold frame 260, it is securely held against lateral movement relative to the frame 260, and the finishing mold registers accurately with the neck mold.

*Plunger operating cylinder*

Each dip head 107 is provided with mechanism individual thereto for raising and lowering the plungers carried thereby and for operation of the associated blow slide, such mechanism being shown in Figs. 49, 50 and 51 and in detail in Figs. 69 to 72 inclusive.

The said mechanism comprises a vertical air cylinder motor 515 having therein a reciprocating piston 516 and a piston rod 517 extending through the lower end of the cylinder. The cylinder is mounted on a bracket 518 which is bolted to the lower part of the dip frame.

Secured to the lower end of the piston rod 517 is a cross head 519 adapted to receive a plunger holder 520 which carries plungers 521 and holds them properly spaced for causing the plunger tips to enter the neck mold 103 when the plungers are lowered. A guide rod 522 secured to the head 519 extends vertically through a guide opening in the bracket 518, thus maintaining proper alignment of the parts during raising and lowering of the plunger.

The plunger is lowered by air under pressure, regulated by a combined plunger and vacuum control valve $V^{15}$ (Figs. 102, 103 and 104) to be described later. The air enters the cylinder 515 through a pipe 524 (see Figs. 69, 70 and 102) connected to the cylinder head 525. An intake passage 526 leads from the pipe 524 through a ball check valve 527 under pressure of a coil spring 528, and thence through an opening 529 into the top of the cylinder.

During the up stroke of the piston 516, air escapes from the cylinder through a series of ports 530 in the side wall near the top of the cylinder communicating with a chamber 531 connected with the inlet 526 by passageways 532. A series of needle valves 533 placed in the side wall at right angles to the ports 530 regulate the flow of exhausting air after the piston has covered the ports 530, thereby allowing the pressure built up in the end of the cylinder to escape slowly until the piston has reached the end of the stroke. Passageways 534 connect the needle valves 53° with the inlet passage 526 and all exhausting air is caused to flow through the pipe 524 and escape through the valve $V^{15}$ (Fig. 102) as hereinafter described.

The valve $V^{15}$ further controls the raising of the piston 516 by admitting air to a pipe 535 (Figs. 103, 71) from whence it flows through check valve 536 and passageways 537 to enter the cylinder 515 at the bottom. The air exhausting from the cylinder as the piston descends, is regulated by needle valves 538 (Fig. 71) and a shut-off valve 539 to form a cushion for the downward stroke of the piston. A pipe 540 leads from the valve 539 to the pipe 535, thus causing the air to exhaust through the valve $V^{15}$.

Blow slides 542 individual to the heads are arranged for horizontal sliding movement on the heads 435, each slide being operated by means of a link 544 pivoted at 545 to the bracket 518. A yoke 546 pivoted to the upper end of the link 544 is pivotally connected to a pair of cam members 548 (see Fig. 72). The said cam members are connected at their inner ends by a spacing bar 549 and their outer ends are journaled on a shaft 550 mounted at the outer edge of the bracket 518. The cams 548 are provided on their inner surfaces with cam grooves 551 adapted to receive rollers 552 carried on either side of the head 519.

It will be noted by referring to Fig. 69 that as the plunger starts down the rollers 552 will draw the cam members 548 downwardly, causing the blow slide 542 by means of the link 544 and the yoke 546 to move inwardly toward the center of the machine, out of the path of the descending plunger tips. As the plungers continue their downward movement, the rollers 552 run out of the grooves 551, leaving the entrance of the grooves facing downwardly (see Fig. 50) to be re-engaged by the rollers on the return stroke.

*Plunger and vacuum control valves*

The plunger and vacuum control valve units $V^{15}$ shown in detail in Figs. 102, 103, 104, are located on the top of the machine (see Figs. 88 and 94) and are individual to the several heads, thus permitting separate control of the operation as indicated by conditions pertaining to individual heads.

Each valve unit $V^{15}$ comprises a valve body 555 which provides a housing for three separate valves namely, a vacuum control valve 557, a plunger lowering valve 558 and a plunger raising valve 559 (Fig. 104). The valves are fed from a common source of air supplied under pressure from the distributing head located on top of the machine. The air enters the valve unit on one side through a pipe 560 (Fig. 103) opening into horizontal passageways 561. Vertical passages 562 extend from the passageways 561 to valve chambers 563 in which the valves 557 and 558 are located. Coil springs 564 within the chambers 563 hold the valves seated. The stems of the valves 557 and 558 have cylindrical head portions 567 which form closures for the outer ends of valve chambers 568. The heads 567 extend beyond the valve casing and are adapted to be engaged by valve operating mechanism. The chambers 568 are provided with ports 569 to which are connected pipes leading to their respective motors. Thus the port 569 of the plunger lowering valve 558 opens to pipe 524 which as before described connects with the top of the plunger cylinder 515 (Fig. 69). The plunger raising valve 559 is in like manner connected through pipe 535 (Figs. 103 and 71) with the bottom of the plunger cylinder.

The mechanism for operating the valves 557 and 558 (see Figs. 102 to 104) comprises a horizontally disposed slide bar 570 parallel with the valves and mounted for reciprocation in a slideway 571 in the valve body 555. The bar 570 is provided with a cylindrical opening 572 longitudinally thereof in which is disposed a coil spring 573 adapted to hold the bar in a forward position. A stop block 574 secured rearwardly of the valve body projects into the opening 572 and bears against the spring 573. A lug 575 (Fig. 104)

projecting upwardly from the bar 570 carries a set screw 576 in line with and forming a stop for the valve 559. When the bar 570 is in its normal forward position as shown in Fig. 104, the valve 559 is held open by the stop 576. It will be noted that while the valve 559 is held open, the air pressure supply pipe 560 is open through the valve to the pipe 535 leading to the lower end of the plunger cylinder 515, so that the plunger piston 516 will remain in raised position.

A crosshead 577 formed as a part of the bar 570 carries a cam roll 578 adapted to be periodically engaged by cams (Fig. 100) to be described hereinafter. The crosshead 577 is further provided with set screws 579 in line with the valves 557 and 558 for actuating the said valves. As shown in Fig. 102 the valve 558 protrudes beyond the valve body a greater distance than the valve 557. The inward movement of the crosshead, as indicated by the dotted line position, opens the valve 558 slightly in advance of the opening of valve 557. Lowering the plungers into the mold head is thus effected before the vacuum or suction, controlled by valve 557, is applied to the mold cavities. The initial inward movement of the bar 570 allows the valve 559 (Fig. 104) to close an instant before the valve 558 is opened.

A latch 582 (Figs. 88 and 104) pivoted to the valve body is adapted to engage and hold the slide 570 in its inward position and thereby maintain the valves 557 and 558 in open position, thus holding the vacuum on in the molds without the aid of a continuous cam.

Vacuum pipe lines and valves

Each dip head is provided with a vacuum chamber 585 (Figs. 50 and 69) arranged in the head plate 435 adjacent the gathering molds 102 and 103 in a manner to permit the application of suction to the mold cavities for filling the molds at the proper predetermined time.

A constant source of vacuum supply is maintained within a vacuum chamber 586 (Fig. 89) in the distributing head 116 on top of the machine. The chamber 586 communicates through downwardly curved pipes 588 with the vacuum chamber 87. Communication between the vacuum chamber 585 and the upper vacuum chamber 87 is provided by means of a telescoping vacuum pipe 589 shown in detail in Figs. 62 to 65. The vacuum pipe includes an outer tube 590 extending downward from the vacuum chamber 87, and an inner, vertically reciprocating tube 591 secured at its lower end within a valve housing 592 bolted to a lateral extension on the head plate 435. A packing gland 593 bolted to the lower end of the outer tube 589 serves as a retainer for a series of packing rings 594 arranged to prevent the possibility of leakage due to excessive wear. The packing rings 594 are held in place by a ring 595 bolted to the tube 590.

The upper end of the tube 591 is formed with an upwardly and outwardly tapered flange 596, said flange being of slightly smaller diameter than the tube 590. An aggregate of steel balls 597 are held in place around the inner tube by a tapered ring 598 slidably mounted on said inner tube. The ring 598 is tapered in a direction opposite that of the flange 596, thus tending to force the balls outwardly against the wall of the tube 590. A coil spring 599 surrounding the tube 591 bears against a flange 501 bolted to the tube and exerts an upward pressure against the tapered ring 598, causing the steel balls to wipe along the inner surface of the outer tube 590 when the inner tube is reciprocated by the dipping action of the head.

Sediment in the form of crystallized sulphur, due to the use of sulphur for lubricating the molds, and also the residue from vapors or gases, has a tendency to collect on the interior surfaces of the vacuum system, necessitating periodic cleaning thereof. The action of the closely packed balls on the tube 590 tends to scrape the tube clean with each dip of the head, the balls also acting as a seal between the telescoping tubes.

Within the valve housing 592 is a vertically movable vacuum valve 602 which, in its lifted or closed position, seats on a valve seat 603. The valve stem 604 is connected to a rock-arm 608 keyed to a rock-shaft 609 which is mounted in the valve housing 592 and projects through one side thereof. A valve actuating arm 610 secured to the rock-shaft 609, is operatively connected to a valve operating piston motor 611 mounted on the tube 591.

The piston motor 611 comprises a cylinder having mounted therein a piston 614. A piston rod 615 pivotally connects the piston with the rock-arm 610. A coil spring 616 mounted on the piston rod holds the piston at the upper end of its stroke and at the same time holds the valve 602 closed.

Air for operating the motor 611 is admitted through a pipe 617 at the top of the motor cylinder, which pipe connects with the port 569 (Fig. 102) in the vacuum control valve 557.

Cut-off knife

Means for severing the glass from the mold after the charging operation as shown in Figs. 66 to 68, and 96, comprises a standard cut-off knife and its operating mechanism, such as disclosed for example, in Patent No. 1,879,712, to Schwenzfeier et al., to which mechanism have been added features of novelty adapting it more particularly to the present machine.

The knife mechanism includes a housing 620 in which is journalled a rock shaft 621 having fixed thereto the knife or shear blade 109. During the operation of the machine the rock shaft and shear blade are periodically moved up and down and also rocked about the axis of said shaft as more fully set forth hereinafter. A sleeve bushing 623 rotatably mounted within the housing 620 surrounds the shaft 621 and carries a gear 624. The said shaft 621 is slidably keyed to the bushing 623 to permit periodic up and down movement of the shaft and knife, and also to permit vertical adjustment of the knife during operation of the machine.

Vertical adjustment of the knife is accomplished by means of a hand wheel 625 mounted for rotation about the shaft 621. Screw threads 627 on the shaft engage corresponding threads in the hand wheel. The knife shaft 621 and knife 109 are moved up and down periodically by mechanism including a bell crank 628 as described hereinafter. One arm of the crank 628 is pivotally connected to a loosely mounted collar 630, thus allowing the knife shaft to be rocked while in either its lower or upper position.

Means for swinging the knife includes a rack bar 631 meshing with the gear 624. A rod 632 having one end threaded into the rack bar is connected at its opposite end to a slide plate 633 mounted for reciprocation in a guide frame 634. Movement of the slide plate 633 is transmitted to the rod 632 through a coil spring 635 carried by the rod. This provides a safety means which, in the event of any of the parts becoming jammed or any obstruction to the normal swing of the knife, allows the slide to move forward against the pressure of the spring without operating the knife. A cam roll 636 is carried on the underside of a second slide plate 633ª which also reciprocates in the guide frame 634. The cam roll follows a cam path 637 in a stationary cam plate 638 mounted on the central column 100. Parallel rack bars 640 and 641 are secured respectively to the slide plate 633 and the guide frame 634 and mesh with a pinion 642 mounted on the slide plate 633ª.

As the dip head approaches the position at which the cut-off or knife stroke takes place, the cam 637 operates through the cam roll 636 to move the slide plate 633ª outward radially of the mold carriage. This movement is transmitted through the mechanism above described to the knife shaft and imparts a cutting stroke to the knife 109. It will be noted that the rack and pinion mechanism 640, 641, 642, provides a speed multiplying means so that a comparatively rapid movement is imparted to the knife. This compensates for the retarded movement of the mold carriage during the charge gathering and severing operation.

The mechanism for lifting and lowering the knife 109 includes the bell crank 628 (Figs. 66, 67) as heretofore described. Pivotally connected to the upper end of the bell crank is a rod 647 extending inwardly and having a swivel connection 648 with the outer end of an arm 649. The arm 649 is pivoted at its inner end to a projecting bearing 650 (see Fig. 68) carried by the frame 634 of the preceding head. Coil springs 651 carried by the rod 647 on either side of the swivel 648, form a yielding connection between the arm 649 and said rod, and thereby provide a safety means whereby the knife is yieldingly supported.

A cam roll 652 mounted on the arm 649 near the outer end thereof, follows a cam path 653 formed on the cam plate 638. The said path 653 holds the knife in its upper position and ready to be swung under the mold. Following the swing of the knife, the cam roll 652 enters a widened section 653ª of the path 653. Thereafter the knife is permitted to drop away from the mold under the control of an air operated motor comprising a cylinder 655, a piston and a rod 656. An arm 657 formed as an extension on the bell crank 628, is pivotally connected to the piston rod by a link 658.

Air under pressure is admitted to the cylinder 655 by a valve V¹⁶ (Figs. 93 and 101) and pipe 660, thereby causing the knife to be held in its upward position during and after the entry of the cam roll 652 into widened portion 653ª of the cam path. At a predetermined point governed by a series of cams hereinafter described, which cams are individual to the dip heads and located on top of the machine, the air is released from the cylinder 655, allowing the knife to drop by its own weight. The air is supplied to the valve V¹⁶ through a pipe 661 connecting with the high pressure chamber 662 of the distributing head 116.

Blank crack mechanism

In the operation of machines of the general type herein shown, it is desirable, for the purpose of slightly chilling the newly formed parison, to open the blank mold a short distance and hold it so during a predetermined time interval before the mold is opened wide for transferring the blank therefrom. Mechanism for "cracking", that is, imparting an initial opening movement to the blank molds, hereinafter referred to as the blank crack mechanism, is shown in Figs. 73 to 78 inclusive. This mechanism includes a cam plate or slide 680 (Figs. 74, 75) mounted beneath the cam plate 241 for sliding movement radially of the machine. This cam slide 680 is supported and guided by means of slide bars 681 thereon, running in grooves 682 in the cam plate 241. The slide 680 is formed with a cam path 683 which registers at times with, and may be considered as a part of, the cam path 445 which, as hereinbefore described, controls the opening and closing movements of the blank molds. The ends of the cam path 683 are flared at 684 as shown in broken lines (Fig. 73) as a measure of safety. This provides an unobstructed path for the cam roll 446 in the event the slide 680 fails to perform its normal reciprocating movements.

The cam slide 680 is actuated by an air operated piston motor A¹⁷ mounted on the cam plate 241. The motor comprises a piston 685 having a piston rod 686 connected to a slide block 687 mounted for reciprocation in a guide frame 688. The slide block 687 is connected through a link 689 to one end of a lever 690 fulcrumed on a pivot pin 691. The other end of the lever is connected through a link 692 to a slide block 693 which reciprocates in a guide frame 694 mounted on the cam plate 241. The slide block 693 has a link connection with a rock arm 695 fixed to and depending from a rock shaft 696 journaled beneath the cam plate 638. Rock arms 697 keyed to the rock shaft 696 extend downward through openings in the cam plate 241. The lower ends of the rock arms 697 are connected through links 698 with the cam slide 680. The piston motor A¹⁷ operates through the connections just described to reciprocate the cam slide 680, forward movement of the motor piston serving to draw the cam slide radially inward for opening or "cracking" the blank mold. With the motor piston retracted as shown in Fig. 77, the blank mold is held in its closed position.

The air motor A¹⁷ is controlled by a valve V¹⁷ mounted on the motor casing. The valve comprises a reciprocating plunger 699, the forward end of which is pivoted to a rock arm or lever 700 having a pivotal connection with a bracket 701 on the valve casing. A rod 702 is pivoted at one end to the arm 700 and at its opposite end to one arm of a bell crank 703. The other arm of the bell crank is connected through a rod 704 to a rock arm 705 (Fig. 75) on one end of a rock shaft 706. On the other end of the rock shaft 706 is an arm 707 (Fig. 76) carrying a cam roll 708 in the path of adjustable cams 709 individual to the mold units and mounted to rotate with the mold carriage.

Each cam 709 comprises an arcuate slide member grooved to receive a tongue 740 formed on a frame 741 bolted to the head slide rails 84. The cam 709 is provided with gear teeth 742 meshing with a gear pinion 743 mounted on a stub shaft 744 journaled in the frame 741. The shaft 744 also carries a worm gear 745 which meshes with a worm on a worm shaft 746 having operating connections 747 to a wheel (not shown) or other means for manually adjusting the slidable cam 709.

As the mold carriage rotates, the cams 709 operate in succession through the mechanism above described to move the valve plunger 699 from its forward position shown in Fig. 77, inwardly or to the left. This movement of the valve plunger admits pressure behind the motor piston 685 so that the motor operates to move the cam slide 680 inward and thereby partially open or "crack" the blank mold.

Air under pressure is supplied to the valve $V^{17}$ through a pipe 712 connected to a source of continuous pressure. Passageways 713 and 714 lead from the valve chamber to the forward and rear ends respectively of the motor cylinder. The passageways 713 and 714 are alternately opened to the pressure pipe 712 by the reciprocating movements of the valve plunger. Ball check valves 715 in said passageways prevent backward flow of air therethrough, so that the air exhausted from the motor cylinder is forced through restricted cushioning ports 716. This cushioning of the motor piston prevents any sudden or too rapid movements of the slide valve 680, and insures a gradual slowing down and stopping of the motor piston at the end of each stroke.

Means for resetting the valve plunger 699 and motor piston 685 to the Fig. 77 position in readiness for repeating the blank cracking operation, will now be described. Such mechanism includes a cam 717 (Figs. 73 and 78) formed on a rock arm 718 attached to the lower end of a rock shaft 719 (see Fig. 74). An arm 720 on the shaft 719 is connected by a rod 721 to one arm of a lever 722, the other arm of said lever being connected to the stem of the valve plunger 699. When the valve plunger is in its retracted position, the cam 717 is projected into the path of the cam roll 446. As said roll advances the cam is moved thereby to the dotted line position Fig. 78 and through the above described connections operates to move the valve plunger 699 forward to the Fig. 77 position so that the motor piston 685 is retracted and the mold thereby closed.

It will be noted that the adjustable cams 709 being individual to the mold units, provide for adjusting the time at which each corresponding blank mold is cracked. This individual control is important in a machine of the character herein disclosed which is capable of producing a bottle or other article of different size and weight on each head. Provision for such individual adjustment aids in producing a uniformly fine grade of ware under varying conditions of operation.

*Upper spider*

Referring to Figs. 88 to 100 inclusive, the upper rotating table or spider 85 provides a support for the valves controlling the various operations of the machine. The valves are arranged in groups individual to the mold carrying heads, each group adjacent the corresponding head and comprising (see Fig. 88) a plunger and vacuum control valve unit $V^{15}$ (shown in detail in Figs. 102, 103, 104), the knife drop valve $V^{16}$ (Fig. 101), the blank straightening valve $V^{18}$ identical in construction with the knife drop valve, and blowing air valve $V^{19}$ which, as hereinafter described, controls the air supply for blowing the parison.

A plurality of series of individually adjustable cams control the operations of the valves. These include a group of knife drop cams 760 and a group of plunger and vacuum cams 761, both said groups being supported in an arc-shaped frame 762 suspended from arms 763 radiating from a flanged collar 764 mounted on the center post 286. The frame 762 as shown is curved to an arc concentric with the axis of the machine and extends approximately 130°. The frame is formed in two sections secured together by top and bottom plates 762$^a$ and 762$^b$ (Fig. 94) bolted thereto. Channels 766 formed by the joining of the frame sections provide space in which the cam operating gears are located.

The knife drop cams 760 disposed on the inner section of the frame, are arcuately shaped bars provided with longitudinal ribs 767 adapted to slide in corresponding grooves formed in the said frame. The cam members 760 are arranged one above the other in vertical alignment and the corresponding valves $V^{16}$ are likewise at different elevations to align with the cams, being supported at the several elevations on standards 770.

The cam members 760 are individually adjustable lengthwise by mechanism including a series of spur gears 771 (Fig. 98) mounted within a channel 766 and engaging rack teeth 772 on the cam members. The gears 771 are keyed to shafts 773 which extend vertically through the frame and into a gear casing 774 (Figs. 88, 94, 95). Each shaft 773 is provided with a worm gear 775 which is engaged by a worm 776 mounted on a horizontally disposed shaft 777. The shafts 777 (see Fig. 88) extend outwardly of the casing and are connected through rods 778 to hand wheels 779 mounted on the blowing cam support which will be described later. The cam members 760 are simple lift cams controlling only the opening and closing of the knife drop valves $V^{16}$. A stationary cam 780 mounted at the bottom of the frame 762, operates the blank straightening valves $V^{18}$ which are of identical construction with the knife drop valves $V^{16}$.

The blank straightening mechanism comprises a nozzle 781 (Fig. 50) secured to the lower end of the hinge pin 444 and arranged to direct a flow of air under relatively low pressure toward the parison suspended from the neck mold after the blank mold opens. This causes a localized surface chilling of the parison on the side facing the center of the machine, thereby contracting the glass and counteracting the tendency of the soft parison to swing outwardly due to the centrifugal force created by the rotation of the machine.

Air is conducted from the valves $V^{18}$ to the nozzles 781 through air lines 781$^b$, each including a channel extending lengthwise through the hinge pin 444. A chamber 823 (Figs. 89, 93) in the distributor head 116 supplies air under low pressure to the valves $V^{18}$ through pipes 824.

The series of cams 761 are mounted in the outer section of the frame 762 and are formed similarly to the previously described cams 760. As heretofore stated, these cams 761 serve to control the operation of the plunger and vacuum control valves. As brought out in the preceding description of the plunger and vacuum valve unit $V^{15}$ (Figs. 102, 104), the first lift 782 (Fig. 88) of the stationary cam 761 serves to open the valve 558 (Fig. 102) and cause the plunger to be lowered before the mold carrying head reaches the dipping position. The second lift 783 serves to open the vacuum valve 557, at which time the latch 582 drops into position to hold the valve open. A raised portion 784 (Figs. 88, 100) formed on the adjustable cam section 761 lifts the latch 582 and releases the valve at a predetermined time. Each of the cam members 761 is provided with gear teeth 785 (Fig. 98) meshing with gears 786 keyed to shafts 787 projecting vertically into a gear casing 788 (Figs. 94, 95). Worm gears 789 on the shafts 787 are engaged by worms 790 mounted on horizontal shafts 791 connected through rods 792 to hand wheels 793.

The blowing air valves $V^{19}$ which control the supply of air to the parison molds, are actuated by puff cams 795 (Figs. 88, 93) and blowing air cams 796, there being a puff cam and a blowing air cam for each said mold. These cams are supported in a stationary frame 797 (Figs. 49, 93) comprising a series of rings 798 spaced apart by blocks 799 through which is passed a bolt 800 for securing the rings together. The said frame 797 is bolted to the arms 763 and remains stationary throughout the movement of the machine. The frame 797 is supported on ball bearings 801 mounted on the rotating table 85. The cams 795 and 796 in the form of blocks are held in place between the rings 798 by bolts 803 (Figs. 49 and 93). Each puff cam 795 is formed with a pointed lift 805 (Fig. 88) in order that the corresponding blowing valve $V^{19}$ when actuated thereby, will be held open for a brief interval, only sufficient to allow a momentary puff of air to enter the parison.

Each of the valves $V^{19}$ (Figs. 88, 105 and 106) which control the supply of air under pressure to the parison molds, comprises a casing in which is mounted a valve plunger 808. A coil spring 809 carried by the plunger, normally holds the valve in closed position. Air is supplied to the valve through a pipe 810 (Fig. 106) to the chamber 662 (Fig. 89) in the distributing head. A pipe 811 (Fig. 106) communicates directly with the mold carrying head 435.

The valve plunger 808 is actuated by the puff cam 795 operating through means including a slide block 812 mounted in the valve casing. A cam roll 813 is mounted in a link 814 pivoted within the block 812 in such a manner that it is substantially free to move in the direction of machine travel. The link 814 is held in alignment with the block 812 by means of a coil spring 817 on a rod 815 pivotally connected to the link and projecting through an opening in the slide block.

The purpose of the swinging link 814 is to permit a quick closing of the valve. During the operation of the machine, there are intervals during which the valves travel at a reduced speed and there is a possibility of the travel of the blowing valve being slowed down while it passes one of the puff cams 795. By referring to Fig. 106, it will be seen that as the cam roll 813 rides up the cam lobe 795, the valve is opened, and as the roll passes the peak of the cam, the valve is snapped shut by the spring 809, the link being cammed upward about its pivot, thereby allowing the valve to close immediately without prolonging the puffing interval.

The valve casing is provided with an exhaust port 820 (Fig. 106) which is open to the atmosphere when the valve is in closed position. A latch 821 mounted on top of the valve casing and actuated by a coil spring 822 is adapted to hold the valve in open position after the plunger has been forced inwardly by one of the cams 796. The point 805 on the cam 795 opens the valve only a sufficient distance to permit a puff of air to escape, the movement not being such as to allow the engagement of the latch 821. The latch eliminates the necessity of a continuous cam for controlling the final blowing operation. The latch 821 is released by means of a cam 822$^a$, which is provided with a raised portion for engaging the projecting end of the latch member.

*Cooling wind passages*

Air for cooling the various parts of the machine enters the base (Fig. 2) from any suitable source through a conduit 825 arranged to align with an opening in the base of the machine when it is in operating position at the forebay 106 (Fig. 50). A chamber 826 (Figs. 1, 2 and 3) communicates with the hollow finishing mold guide frame 81 (Fig. 22) from which cooling air is conducted to the mold carrier, the dip heads and for cooling the cut-off knives. The carrier guide frame 81 is formed to provide vertical passageways 827 (Figs. 22 and 30) provided with ports 828 to allow the air to enter the carrier frames 260 and circulate through the finishing mold arms 322 (Figs. 20 and 30) and also through the blank mold cooling nozzles, one of which is shown in Fig. 20 at 829.

Referring to Figs. 96 and 97, the mechanism for cooling the charge severing knife 109 includes a pipe line comprising aligned pipe sections 831 and 834 to which cooling air is conducted from the hollow frame 81 through suitable connections (not shown). A slide valve 832 mounted for horizontal movement in a head 833 is adapted to open and close communication between the pipe sections 831 and 834. A rock arm 835 (Fig. 97) secured to the knife shaft 621 is connected through a link 836 to the slide valve 832. When the knife blade 109 is in its retracted position, in which it is directly beneath the pipe section or nozzle 834, the valve is in its open position so that cooling air is directed against the blade. When the knife commences its cutting stroke, in the manner heretofore described, the valve 832 is moved to closed position so that the cooling air is shut off from the nozzle 834 while the mold carrying head travels over the forebay or gathering area.

*Knock-out mechanism*

The knock-out mechanism for controlling the discharge of the bottles or other blown articles from the machine when the finishing molds are open, is illustrated in detail in Figs. 46, 47 and 48. This mechanism, which will now be described, comprises knock-out units individual to the finishing mold units. These knock-out units, except as to their actuating mechanism and the means for supplying blowing air therethrough, may be of conventional construction such as shown, for example, in the patent to La France, 1,319,098, October 21, 1919.

Each knock-out unit as herein shown, is supported in a bracket 840 secured to the mold carrier frame 81. A rock shaft 841 carries a rock arm 842 having a head 843 in which disks or holders 844 are yieldingly mounted and adapted to seat on the open ends of the bottles in the finishing mold. The shaft 841 is adapted to rock in a bearing sleeve 845 carrying a cam roll 846 which extends through a slot in the sleeve, the slot being elongated circumferentially of the sleeve to permit the rotation of the rock shaft therein. Surrounding the sleeve 845 is a casing 847 having a fixed mounting in the bracket 840 and provided with a cam slot 848 engaged by the cam roll 846. The cam slot 848 is so shaped that a downward movement of the rock shaft results first in a rocking movement of the shaft about its axis to bring the blow head over the mold, followed by a straight downward or axial movement by which the disks 844 are seated on the bottles in the mold.

Novel means for actuating the knock-out mechanism includes a cam actuated arm or lever 850 mounted in a bracket 851 for horizontal swinging movement about a pivot 852, the bracket 851 being mounted on the base plate 80 of the mold carriage. The arm 850 carries a cam roll 853 which runs on a stationary cam (Fig. 22) comprising adjustable sections 854 and 855 mounted on an arcuate cam plate 856 and adjustable thereon circumferentially of the machine.

The arm 850 carries a segmental sprocket 858 to which is attached a sprocket chain 859. A second sprocket chain 860 connected at one end to the chain 859 is guided around an idler sprocket wheel 861 and is connected at its opposite end to the sleeve 845.

Provision is made for supplying air under pressure through the knock-out head to the blown articles for supplying and maintaining pressure therein for a predetermined time interval after the articles have been blown to final form and prior to their discharge from the finishing mold. For a fuller statement of the function and purpose of the air pressure supplied through the knock-out heads, reference may be had to the patent to Kadow et al., 1,931,497, October 24, 1933. In the present invention, the means employed for this purpose include a valve 862 mounted on the bracket 851 and provided with a port 863 opening to a pipe line 864 (Fig. 46) which extends to the knock-out head 843 and communicates therethrough with the articles in the mold. A second port 865 in the valve is connected through a pressure line (not shown) to a source of air pressure. The valve plunger 866 has pivoted thereto a link 867 provided at its outer end with a slot 868 engaged by a pin on a cam lever 869, the latter being pivoted at 870 to the arm 850. A trip pin 871 having a fixed mounting on the bracket 851 is arranged to engage a cam surface 872 formed on the cam member 869 for tripping the latter as presently will appear.

The link 867 and swinging cam 869 form a toggle connection between the cam actuated lever 850 and the valve plunger. As shown in Fig. 48, these toggle elements are in straight line position with the valve closed. As the mold carriage rotates, the cam roll 853 is engaged by the cam section 855 (Fig. 22) so that the lever 850 is actuated thereby and swings the knock-out arm into holding position (Fig. 46). The arm 850 is swung from the full line position (Fig. 48) to the broken line position and through the toggle links moves the valve plunger inward against the tension of a spring 873, thereby opening the valve and admitting pressure through the line 864 to the blown articles in the mold. Shortly before the mold reaches the bottle discharging station the cam roll 853 engages the cam lobe 854 (Fig. 22) which imparts a slight additional forward movement of the arm 850. During this final forward movement the cam surface 872 being in contact with the trip pin 871, causes a swinging movement of the cam member 869 amout its pivot, thereby tripping the toggle and permitting the valve plunger to be moved by its spring 873 to closed position as shown in Fig. 47. The air pressure is thus shut off from the knock-out head before the latter is lifted from the bottles. The finishing mold is also opened, as usual, before the knock-out head is lifted.

Dip head adjustment

Figs. 83 to 87 inclusive illustrate an indicator used in connection with the dip head adjusting mechanism. The indicator includes a drum 875 mounted to rotate within a casing 876. The drum is keyed to a shaft 877 on the lower end of which is also keyed a worm wheel 878 running in mesh with a worm 879 on a shaft 880 adapted to be rotated by a hand crank 881 corresponding to the hand wheel 442 (Fig. 50). Rotation of the hand crank operates in the manner heretofore described to rotate the worm gear 441 and shaft 438 for adjusting the dip head up and down.

The drum 875 is formed with vertically disposed flat faces or panels 882 (Fig. 87) having their edges meeting in the vertical lines 883. In the particular construction shown the surface of the drum is divided into sixteen such panels or faces. A spiral groove 884 formed in the surface of the drum divides said faces 882 into sections on which are marked a spirally arranged series of index numbers 885 which, in the particular construction shown, run consecutively from number 1 up to 128, each number representing an adjustment of the dip head.

An indicating slide 886 is mounted for up and down movements on guide rods 887 mounted on the outside of the casing. Pins 879 secured to the slide 886, project into the spiral groove 884 so that the slide is moved up or down by the rotation of the drum. With this construction, rotation of the drum causes the indicating numbers to be brought in succession within the indicating slide 886 thereby indicating the extent to which the dip head has been adjusted up or down.

Mold carriage driving mechanism (mechanical)

Figs. 108 to 112 inclusive illustrate a modified form of mechanism for driving the mold carriage, in which the hydraulic pump P and hydraulic motor H³ (Fig. 3) are eliminated and the drive shaft 145 is operatively connected through mechanical driving connection to a power unit or driving element, which as here shown is an electric motor 890 (Fig. 108). The driving unit or motor operates at a constant speed and the mechanism interposed between the motor and the drive shaft 145 is designed to periodically vary the speed of the mold carriage, and particularly to slow it down during the gathering operation, for purposes hereinbefore set forth.

The motor 890 operates through speed reduction gearing contained within a gear casing 891, to drive a vertical shaft 892 which carries a pinion 893. This pinion runs in mesh with a ring gear 894 attached to the under side of a gear plate 895 loosely mounted on the driving shaft 145 to permit relative rotation of the gear and shaft. A member 896 in the form of a gear casing or carrier is mounted for oscillating movement about the axis of the shaft 145. Journaled within this casing is a gear pinion 897 running in mesh with internal gear teeth 898 on the ring gear 894. Integral with the pinion 897 is a second pinion 899 running in mesh with a sun gear 900 keyed to the drive shaft 145. The motor 890 operates through the above described gearing to rotate the ring gear 894 continuously, and the ring gear operates through the pinions 897, 899, and gear 900 to continuously rotate the drive shaft 145.

In order to periodically reduce the speed of the drive shaft 145 and thereby slow down the mold carriage during the gathering operation, mechanism is provided as follows for oscillating the gear carrier 896. A vertical shaft 901 mounted in the frame 126 carries a gear wheel 902 which meshes with the ring gear 894 and is driven thereby at the same angular speed. Eccentrically mounted on the underside of the gear 902 is a bearing member 903. A connecting rod 904 has attached to one end thereof a bearing sleeve or strap 905 journaled on the eccentric 903. The opposite end of the rod 904 is pivoted to the gear carrier 896.

It will be seen that with this construction the eccentric 903 as it rotates will reciprocate the rod 904 and thus oscillate the gear carrier 896. If the ring gear 894 were held stationary, oscillation of the carrier 896 would operate through the gears 897 to 900, to cause rotation of the drive shaft 145, first in one direction and then the other, at a speed proportional to that of the oscillating carrier. As the ring gear 894 is continuously driven at a constant speed, said oscillation of the carrier 896 causes a periodic variation in the speed of the drive shaft 145.

The extent of this variation in speed, or in other words the degree through which the speed is reduced and increased is in proportion to the angular speed at which the member 896 is rocked about the shaft, and this in turn is proportional to the throw of the eccentric 903. In order to adjustably vary this speed reduction and acceleration, the eccentric 903 is adjustable toward and from a position concentric with the gear 902. To permit such adjustment, the member 903 is slidably mounted in guideways 906 and is clamped in position by bolts 907 extending through slots 908 in the gear 902. The gearing is so proportioned that during each complete rotation of the mold carriage the gear 902 is given a number of rotations equal to the number of heads or units on the mold carriage, so that the latter is slowed down for each gathering operation.

In Figs. 113 to 117 inclusive we have illustrated another form of mechanical driving mechanism, the operation of which is similar in principle to that of the mechanism shown in Figs. 109 to 112. The construction now to be described comprises a modified form of machine base 910 on which the machine is supported. The speed changing gearing is arranged within a housing 911 below the machine base. An electric motor 912 for driving the mold carriage is supported on a bracket 913 attached to the machine base 910. The drive pinion 147, geared as heretofore described to the mold carriage, is keyed to the upper end of a drive shaft 914 which extends downward through the housing 911.

The motor 912 operates through speed reduction gearing to drive the shaft 914. Said gearing includes a worm on the motor shaft 915 and a worm gear 916 keyed to a shaft 917. A pinion 918 also keyed to the shaft 917 is in mesh with a ring gear 919 bolted to a gear carrying member 920. The member 920 is substantially in the form of an inverted cone and is journaled on the drive shaft 914. Bolted to the upper end of the cone 920 is a ring gear 921 with internal gear teeth, which drives a pair of pinions 922 mounted on stub shafts 923 journaled in a frame or carrier 924 mounted for oscillating movement about the shaft 914. Each said stub shaft has a second pinion 925 keyed thereto and running in mesh with a gear 926 keyed to the drive shaft 914. The motor 912 operates through the worm gearing to drive the cone 920 at a constant speed. The ring gear 921 on the cone operates through the pinions 922 and 925 and gear 926, to drive the shaft 914.

In order to periodically vary the speed of the drive shaft 914 for slowing down the mold carriage during the gathering of charges of glass, the carrier 924 is oscillated by the following mechanism: A gear 928 keyed to a shaft 929, runs in mesh with a ring gear 930 bolted to the cone 920. The gears 928 and 930 are of the same diameter and rotate at the same angular speed. The shaft 929 carries at its upper end a crank 931 which is connected to one end of a connecting rod 932. The other end of said rod is connected by means of a pivot bolt 933 with the frame 924. The rotation of the crank 931 operates through the rod 932 to oscillate the carrier 924 and with it the pinions 922 and 925. This movement of the pinions causes a variation in the speed at which the shaft 914 is driven. The gearing is proportioned to effect during each complete rotation of the mold carriage, a number of oscillations of the frame 924 corresponding to the number of dip heads on the mold carriage, so that the decelerations are synchronized with the movements of the dip heads to effect a slow movement of the mold carriage each time the mold is in dip.

Dip head safety lock

Figs. 118 to 120 illustrate a locking mechanism operable to retain a dip head in its lifted position when it is desired at any time to lock such dip head and the mold thereon out of dip without interfering with the continued rotation of the mold carriage. These locking devices are individual to the dip heads and are interconnected with the heretofore described mechanism for locking the blank mold and neck mold in their open position.

The mechanism for holding a head out of dip comprises a locking latch or bar 935 mounted for horizontal sliding movement within a recess formed in one of the vertical slide rails 84 in which the dip frame 107ª is guided in its up and down movements. A notch 936 in the dip frame is brought into register with the bar 935 when the dip head is raised to its normal position out of dip, permitting the latch bar to be projected into the notch and prevent the dip head from being lowered until the latch has been withdrawn.

The mechanism for actuating the latch bar 935 includes a segmental gear 937 engaging rack teeth 938 on the bar 935. The gear 937 is keyed to a rock shaft 939 journaled in a bracket 940 bolted to the rail 84. A crank 941 on the rock shaft 939 is connected through a link 942 to a crank 943 on the shaft 505. As heretofore described (see Fig. 58) rotation of the shaft 505 in a clockwise direction serves to project locking bars 501 and 506 for locking the blank mold and the neck mold in open position. As shown in Fig. 118, the shafts 505 and 939 are connected through the link 942 to be rotated in unison so that locking of the molds in open position at the same time projects the latch 935 into position to hold the dip head in its lifted position.

The means for operating the locking latches includes a lever 944 having a pivot rod 945 mounted in a bracket 946, said lever having a handle 947. A rod 948 pivoted at one end to the latch bar 506 is provided at its opposite end with a fork 949 which straddles a vertically disposed cam plate 950. A latch pin 951 carried by said fork extends through a cam slot 952 in the cam plate. The ends of the pin 951 protrude beyond the fork into position to overlie and be engaged by lugs 953 on the ends of the bifurcated lever 944.

When the handle 947 is moved downward from the full line to the broken line position (Fig. 120), the lugs 953 lift the pin 951 and the connected end of the rod 948, permitting said rod to be drawn rearwardly by a coil spring 954, the pin 951 being guided in the cam slot 952. At the completion of said movement, the pin 951 seats in a recess 955 at the end of said slot. A coil spring 956 applies a downward tension to the rod 948 and thereby holds the pin 951 seated. While the handle 947 remains in its lowered position, the locking latches are held thereby in their withdrawn position permitting normal operation of the dip head and molds thereon. When the handle is lifted the locking latches are projected to locking position and held in such position under the influence of the spring 954.

Modified hydraulic system for finishing mold carrier units

Figs. 121 to 132 inclusive illustrate a modified hydraulic system for lifting and lowering the finishing mold carriers and actuating the finishing molds. Said system, which will now be described, includes certain modifications of the controlling valves and valve operating mechanism and also certain changes in the construction of the machine base to accommodate the valve mechanism and hydraulic circuits.

Referring to Fig. 125, a pump $P^4$ supplies oil or other fluid under pressure for operating the piston motors $H^{10}$ which lift the mold carriers. A pump $P^5$ delivers oil under pressure to the hydraulic piston motors $H^{11}$ for opening and closing the finishing molds. The pumps $P^4$ and $P^5$ as shown are mounted on an oil tank 957 which may be separate from the machine base. The pump $P^4$ draws its oil directly from the tank and delivers it under comparatively high pressure, for example 800 pounds, through a pipe 958 to the distributing head 116 on top of the machine. From the high pressure chamber 287 (Fig. 89) the oil is delivered to a common header 959 or carrier supply pipe (Figs. 124, 125) through which the oil is supplied to the different units. The pump $P^5$ delivers oil at a reduced pressure, for example 400 pounds, to the motors $H^{11}$ for opening and closing the finishing molds. The pumps $P^4$ and $P^5$ may be driven by the same electric motor (not shown). The oil is delivered from the pump $P^5$ through a pipe 960 and a header pipe line 961.

Oil supplied through the header line 959 enters the safety interlock valve $V^{20}$ through a port 962 (Figs. 125, 128) which as shown is in communication with a valve port 963 open to pipe 964. The latter opens through a port 965 into the chamber of a valve $V^{21}$ which controls the carrier lifting motor $H^{10}$. The safety interlock valve $V^{20}$ comprises a valve plunger 966 which is operable manually to close the intake port 962 and thereby cut off the pressure supply to the motor $H^{10}$, so that the latter cannot operate to lift the mold carrier. A check valve 967 in the pipe line 964 prevents the oil which is being discharged from the motor $H^{10}$ from entering the valve $V^{20}$.

The valve $V^{21}$ (see Figs. 124, 125, 126) comprises a plunger 968 which has a link connection with a bell crank lever 969 (Fig. 124) pivoted at 970 to a bracket 971 mounted on a platform 972 which provides a support for the several valves. The bell crank 969 carries cam rolls 973 and 974 on opposite sides of its fulcrum. The cam roll 974 runs in the path of stationary cam 975 which operates to move the valve plunger inward and thereby effect the lifting of the mold carrier. The cam roll 973 runs in the path of a cam 976 (Fig. 123) operable to move the valve plunger 968 outwardly and cause the mold carrier to be lowered. The carrier raising cam 975 and the lowering cam 976 are adjustably mounted in grooves 977 (Fig. 121) in a ring 978 which encircles the platform 972 and is secured to the machine base.

When the valve plunger 968 is in its inward position as shown in Figs. 125 and 126, the port 965 is open to a port 980 from which a pipe 981 extends to a cushioning valve $V^{22}$ (Figs. 125, 129) operative to cushion the finishing mold carrier as it is completing its descent. The fluid under pressure supplied through the pipe 981 and valve $V^{22}$ enters the lower end of the piston motor $H^{20}$ and operates the latter for lifting the mold carrier. During this lifting movement the oil above the motor piston is expelled through a cushioning device 982 at the upper end of the motor cylinder and the pipe 983 which leads to a port 984 in the valve $V^{21}$, said port being open to the drain port 985 from whence the oil may be returned to the reservoir 957.

When the cam 976 (Fig. 123) which controls the lowering of the mold carrier, operates to shift the valve plunger 968 outwardly or to the left (Figs. 125 and 126) the mold carrier is lowered by gravity, the oil beneath the plunger of the motor $H^{10}$ being discharged through the cushioning valve $V^{22}$, pipe 981 and valve $V^{21}$, the port 980 being opened to the drain port 985. In order to insure the lowering of the mold carrier in the event it is not started downward immediately by gravity, an oil pressure line leading to the upper end of the motor cylinder, is established by the shifting of the valve plunger 968 outwardly. This pressure line is by way of pipe line 961, ports 986 and 984 in the valve $V^{21}$, and pipe 983.

Operation of the motor $H^{11}$ for opening and closing the finishing mold is controlled by the valve $V^{23}$ (Figs. 125 and 127). This valve comprises a plunger 988 connected (see Fig. 124) to a lever 989 which is fulcrumed on a bracket 990 and carries cam rolls 991 and 992. A cam 993, herein termed a mold opening cam, is mounted on and adjustable lengthwise of the ring 978. The cam is in the path of the roll 992 and operates to move the valve plunger 988 inwardly for causing operation of the motor $H^{11}$ to open the finishing mold. A mold closing cam 994 (Fig. 123) likewise adjustably mounted on the ring 978 in the path of the cam roll 991, operates the valve plunger 988 in the reverse direction for closing the finishing mold.

Referring to Fig. 125, when the valve plunger 988 is moved to its inward position as shown, a pressure line is established to the forward end of the motor $H^{11}$, said line including the pressure pipe 959 and a pipe 995 leading to a valve port 996 in communication with a port 997 opening to a pipe 998 which leads to the forward end of the motor $H^{11}$. The pressure through this line moves the motor piston to the right thereby opening the mold. The oil exhausted from the motor by this mold opening movement, is discharged through a pipe line 999 leading to a port 1000 which opens to a drain port 1001.

When the valve plunger 998 is reversed by the operation of the mold closing cam 994 (Fig. 123) the motor $H^{11}$ is actuated by pressure supplied from the low pressure pump $P^5$ through a pressure line as follows, namely, pipe 961, a pipe 1002 which leads to the safety interlock valve $V^{20}$, communicating ports 1003 and 1004 in the valve, a pipe 1005 which extends to a port 1006 in the valve $V^{23}$, which port 1006 is at this time open to port 1000, and pipe 999 leading to the motor $H^{11}$. As the motor piston moves forward for closing the mold, the oil escaping from the motor cylinder is conducted through pipe 998 to and through communicating ports 997 and 1007 in the valve $V^{23}$ and thence through a pipe 1008 to a port 1009 in the safety interlock valve. This latter port (see Fig. 128) communicates through a drilled opening in the valve plunger, with a passageway 1010 extending downward through the plunger to an exhaust port 1011.

The motor H[11] and the pipe connections therefor are shown in detail in Figs 121, 122, 130, 131 and 132. The motor comprises a casing 1012 in which the piston 1013 reciprocates. The motor is mounted on a connector block 1014 on the swing frame 262 and is connected to the pipe lines 998 and 999, through conduits comprising pipe sections 1015 having swivel joint connections to permit the swinging movements of the frame 262.

Pressure supplied through the pipe line 998 for opening the mold is transmitted through a passageway 1016 to the motor cylinder near the forward end thereof. A check valve 1017 (Fig. 122) in said passageway 1016 prevents direct return of the escaping oil when the motor piston is returned or moved forward for closing the mold. The passageway being closed by the check valve 1017, the exhausting oil is forced to escape through an adjustable metering valve 1018. The core of the valve is rotatively adjustable to bring any desired one of a graduated series of restricted openings 1019 into alignment with the exhaust port and thereby adjustably vary the cushioning of the piston stroke.

Pressure supplied through the pipe 999 for projecting the motor piston 1013 and thereby closing the mold, is conducted to the rear end of the motor cylinder through a passageway 1020. A check valve 1021 (Fig. 131) operates in a manner as substantially above described in connection with the check valve 1017, to cause the fluid which is being exhausted from the motor to pass through the metering valve for cushioning the mold opening stroke of the piston.

*Modified means for controlling dip head movements*

Fig. 133 illustrates a valve V[24] which is a modification of the valve V[4] shown in Figs. 8 and 9 for controlling the motor A which lifts a dip head. The valve V[24] is well adapted to control the motor A when used with a modified construction in which the connector block 242 and mechanism for actuating the same are eliminated. When the connector block is omitted, the cam plates 250 and 250', or a stationary cam section having the same general contour as said cam plates, controls the movements of the dip heads as heretofore set forth. When the connector block 242 is eliminated, its operating cam 108 (Fig. 3) and intermediate mechanism including the rod 236 and dip lever 238 can also be dispensed with.

The valve V[24] includes a valve casing 1030 in which a valve plunger 1031 is mounted to reciprocate, being moved to its inward position (shown in full lines) by the cam 226 operating through the cam roll 226[a]. Air pressure is supplied to the valve through a pressure port 1032. The pressure is transmitted through a channel 1033 in the valve casing to the inner end of the plunger so that when the plunger passes beyond the control of the cam 226, it is projected to the forward position (shown in broken lines). This opens the pressure port 1032 to the port 228 in the head of the motor cylinder so that air pressure is supplied for lifting the dip head in the manner heretofore described. The plunger is formed with a longitudinal passageway 1034 which is open to the atmosphere through ports 1035 near the outer end of the plunger. A series of graduated openings 1036 are drilled through the plunger to the passageway 1034. When the valve plunger is moved inward by the cam 226 the air is exhausted from the motor cylinder 216 by way of the restricted openings 1036 and thereby cushions the lowering movement of the dip head.

Modifications may be resorted to within the spirit and scope of our invention as defined in the appended claims.

We claim:

1. A machine for forming hollow glass articles comprising, in combination, a mold carriage rotatable about a vertical axis, parison molds thereon, finishing molds rotable with the carriage and movable up and down thereon to and from position for receiving parisons from the parison molds, a hydraulic pump, a hydraulic driving motor driven by said pump and operatively connected to drive the mold carriage, means combined with said hydraulic pump and motor to provide a hydraulic circuit containing said pump and motor, a second hydraulic motor, an electric motor operative to continuously drive said second hydraulic motor, hydraulic piston motors individual to the finishing molds and operative to lift the finishing molds to said parison receiving position, a switch in a circuit of said electric motor, and means in said hydraulic circuit for holding the switch closed while a predetermined pressure is maintained in said hydraulic circuit, said switch being open when the hydraulic pressure is below said predetermined amount, whereby lifting of the finishing molds is prevented upon failure of the pressure in the circuit of the said hydraulic driving motor.

2. A machine for molding glass articles comprising, in combination, a mold carriage, a mold thereon, a hydraulic motor having driving connections with the mold carriage for rotating it, a hydraulic circuit for said motor, a second motor, operating means between said second motor and said mold for moving the latter relative to the mold carriage, and means controlled by the hydraulic pressure in said circuit controlling said second motor and preventing its operation while the pressure in said hydraulic circuit is below a predetermined value.

3. The combination of a mold carriage, a hydraulic driving motor connected to rotate the carriage, a hydraulic circuit for said motor, a series of molds on the carriage, a second hydraulic motor, piston motors operative to move the molds relatively to the mold carriage, said piston motors being individual to the molds and actuated by said second hydraulic motor, and means to prevent the operation of said second motor while the pressure in the hydraulic circuit of said driving motor is below a predetermined value.

4. The combination of a mold carriage, a hydraulic driving motor connected to rotate the carriage, a hydraulic circuit for said motor, a series of molds on the carriage, a second hydraulic motor, piston motors operative to move the molds relatively to the mold carriage, said piston motors being individual to the molds and actuated by said second hydraulic motor, an electric motor for driving said second hydraulic motor, a switch in circuit with the electric motor, and means controlled by the pressure in the hydraulic circuit of said driving motor for actuating said switch.

5. A machine for molding glass articles comprising a mold carriage, a driving pump, a hydraulic motor driven by said pump and connected to drive the mold carriage, a reservoir containing an operating fluid for driving said pump and motor, hydraulic circuits for conducting the fluid from said reservoir through the pump and motor and returning it to the reservoir, said circuits including a by-pass between the reservoir and driving pump, short circuiting the motor and permitting the pump to work idly, and a valve in said by-pass for closing the latter and thereby directing the driving fluid from the pump through the motor for actuating the latter.

6. A machine for molding glass articles comprising a mold carriage, a driving pump, a hydraulic motor driven by said pump and connected to drive the mold carriage, a reservoir containing an operating fluid for driving said pump and motor, hydraulic circuits for conducting the fluid from said reservoir through the pump and motor and returning it to the reservoir, a back pressure valve in the return circuit between the motor and reservoir, and means for holding the valve closed until a predetermined pressure is built up between the pump and motor whereby circulation of the operating fluid through the motor is prevented until a predetermined operating pressure has been built up in the motor circuit.

7. A machine for molding glass articles comprising a mold carriage, a driving pump, a hydraulic motor driven by said pump and connected to drive the mold carriage, a reservoir containing an operating fluid for driving said pump and motor, hydraulic circuits for conducting the fluid from said reservoir through the pump and motor and returning it to the reservoir, a back pressure valve in the return circuit between the motor and reservoir, means for holding the valve closed, means for automatically opening said back pressure valve when a predetermined pressure is built up in the motor circuit, a high pressure relief valve interposed in the motor circuit between the motor and said back pressure valve, and a by-pass from said pressure relief valve around the back pressure valve, said relief valve being automatically operable when a predetermined excess pressure is built up therein to open said by-pass.

8. A machine for forming glass articles comprising a mold carriage, dip heads movable up and down thereon, molds carried by the dip heads, means for rotating the mold carriage about a vertical axis, fluid operated motors individual to the dip heads for lifting them periodically and in succession, and means operating automatically to insure the lifting of the dip heads upon failure of the motors to supply sufficient power to lift the dip heads.

9. A machine for forming glass articles comprising a mold carriage, dip heads movable up and down thereon, molds carried by the dip heads, means for rotating the mold carriage about a vertical axis, air motors mounted on the mold carriage, operating connections between said motors and the dip heads for actuating the latter periodically and in succession, and automatic means for actuating the dip heads upon failure of said motors.

10. A machine for forming glass articles comprising a mold carriage, dip heads movable up and down thereon, molds carried by the dip heads, means for rotating the mold carriage about a vertical axis, air motors mounted on the mold carriage, operating connections between said motors and the dip heads for actuating the latter periodically and in succession, and cam means for controlling the up and down movements of the dip heads independently of power supplied by said motors and while the dip heads are being actuated by said motors.

11. A machine for forming glass articles comprising a mold carriage rotatable about a vertical axis, dip heads on the carriage, molds carried by the dip heads, means for driving the carriage, motors individual to the dip heads for lifting them periodically and in succession, means controlling the operation of said motors, the dip heads being movable downward by gravity, and cam means for positively controlling the up and down movements of the dip heads independently of said first mentioned controlling means and during the lifting of the dip heads by said motors and their downward movement by gravity.

12. A machine for forming glass articles comprising a mold carriage rotatable about a vertical axis, dip heads on the carriage, molds carried by the dip heads, means for driving the carriage, motors individual to the dip heads for lifting them periodically and in succession, means controlling the operation of said motors, the dip heads being movable downward by gravity, a cam, and means for effecting an operating connection between the cam and the dip heads in succession by which the cam is caused to positively control the up and down movements of the dip head independently of said first mentioned controlling means and during the lifting of the dip heads by said motors and their downward movement by gravity.

13. A machine for forming glass articles comprising a mold carriage rotatable about a vertical axis, dip heads on the carriage, molds carried by the dip heads, means for driving the carriage, motors individual to the dip heads for lifting them periodically and in succession, means controlling the operation of said motors, the dip heads being movable downward by gravity, a cam, means for operating said cam in synchronism with the rotation of the mold carriage, and means for effecting an operative connection between the cam and the dip heads in successison and thereby positively controlling the up and down movements of the dip heads independently of said first mentioned controlling means and during the lifting of the dip heads by said motors and their downward movement by gravity.

14. A machine for forming glass articles comprising a mold carriage rotatable about a vertical axis, dip heads on the carriage, molds carried by the dip heads, means for driving the carriage, a stationary track, rolls on the dip heads and individual thereto, said rolls adapted to run on said track for supporting said heads during the major portion of their travel with the carriage, a cam, means for effecting a connection between each roll and said cam as the corresponding dip head approaches a dipping position, said cam operable to positively control the up and down movements of the dip heads and synchronize said movements with the rotation of the mold carriage, and motors individual to the dip heads and operative to lift the dip heads while the latter are under the control of said cam and at a speed determined by said cam control.

15. A machine of the Owens suction gathering type for making hollow glass articles, said machine comprising a hollow vertical center column, a mold carriage mounted to rotate about the axis of said column, an annular series of dip heads on the carriage and individually movable up and down thereon, suction gathering molds on said heads, a rotary cam, means for rotating the cam in synchronism with the rotation of the mold carriage and imparting to the cam during each complete rotation of the mold carriage a number of rotations corresponding to the number of dip heads on the carriage, means for effecting operating connections between said cam and the dip heads by which the movements of the dip heads relative to the carriage are positively controlled, said connections including a rod within and extending lengthwise of said center column, a lever having a stationary mounting and connected at one end of said rod, means for effecting an operating connection between said lever and the dip heads in succession as the latter approach a dipping position, and motors individual to the dip heads and each operable to lift its dip head while the latter is under the control of said cam and at a speed determined by the cam.

16. A suction gathering machine of the Owens type for making hollow glass articles, said machine comprising a mold carriage, means for rotating it about a vertical axis, an annular series of dip heads thereon, molds carried by the dip heads, said dip heads being movable up and down on a carriage, a rotary cam for controlling said up and down movements of the dip heads, means for rotating said cam in synchronism with the rotary movement of the mold carriage and imparting to the cam during each rotation of the mold carriage a number of rotations equal to the number of dip heads, means for effecting an operating connection between said cam and each dip head as the latter approaches a charge gathering position and for taking the dip head out of the control of the cam prior to its connection with the next succeeding dip head, and motors individual to the dip heads and operative to lift the latter while under the control of said cam and at a speed determined by the cam, said dip heads being movable downward by gravity while under the control of said cam.

17. A machine for forming glass articles comprising a rotatable mold carriage, molds thereon, means for driving the carriage, fluid operating motors individual to the molds, means for causing said motors to effect periodic movements of the molds on the carriage when the molds are brought to a predetermined position by their movement with the carriage, and supplemental mechanism operable automaticably to effect said periodic movements when the molds reach said position in the event said motors fail to operate.

18. A machine for forming hollow glass articles comprising a rotatable carriage, molds thereon, fluid operated motors individual to the molds for normally effecting periodic movements of the molds, mechanical means automatically operable to effect said movements in the event of failure of said motors to operate, said mechanical means being automatically operable also to positively control the speed of said movements and maintain a predetermined definite ratio between the speed of movement of the molds relative to the carriage and the speed of the carriage.

19. A suction gathering glass blowing machine of the Owens type comprising a mold carriage, means for rotating it about a vertical axis, an annular series of dip heads mounted for rotation with the mold carriage and movable up and down thereon, molds carried by said dip heads, a cam track, cam rools carried with the dip heads and running on said track, said track including a stationary section forming a support for the dip heads during the major portion of their rotation with the carriage and a section mounted for up and down movement and controlling the up and down movements of the dip heads, air motors individual to the dip heads and operatively connected thereto, and means for effecting the operation of each air motor while the corresponding dip head is within the control of said movable cam section and at a speed determined by said cam.

20. A machine for forming glass articles, comprising a mold carriage rotatable about a vertical axis, a dip head mounted for up and down movement on the carriage, a mold carried by the dip head, a stationary track extending along the path in which the mold travels with the carriage, a roll carried by the dip head and adapted to run on said track and thereby hold the dip head in its lifted position during the major portion of its travel with the mold carriage, a motor operative to lift the dip head, means for supplying operating power to the motor, and motor controlling means operable to cause said motor normally to hold the dip head lifted independently of said track during said major portion of its travel, with the dip head traveling in a path a short distance above that in which it travels when supported by the track and with said roll running above and in close proximity to the track so that the roll will engage the track automatically if the motor should fail, through a failure of the power supply, to hold the dip head lifted, and thereby transfer the support of the dip head to the track before the dip head has lowered to an objectionable degree.

21. A machine for forming glass articles comprising a mold carriage, means for rotating the carriage about a vertical axis, a dip head rotatable with the carriage and mounted thereon for up and down movement, a mold carried by the dip head and traveling with the carriage in a circular path, a stationary track extending along said circular path, a roll carried by the dip head and arranged to run on said track and thereby hold the dip head in a lifted position during the major portion of its travel with the mold carriage, an air motor mounted on the carriage, means for supplying air under pressure for operating the motor, operating connections between the motor and the dip head for causing the motor to lift the dip head, and means controlling said operation of the motor and causing it to hold the dip head lifted to a position above that in which it is held by the track, with the said roll spaced above and running in close proximity to said track, whereby upon failure of air pressure supply to the motor sufficient to hold the dip head lifted, the roll will automatically engage the track and transfer the support of the dip head to the track before the dip head is lowered to an objectionable degree.

22. A machine for forming hollow glass articles comprising a mold carriage, an annular series of dip heads mounted thereon for up and down movement, molds carried by the dip heads, means for rotating the mold carriage about a vertical axis and causing the dip heads to travel in an annular path, thereby bringing the molds in succession to a dipping station, each said dip head being free to be lowered and lifted while traveling through said station, a stationary track in position to support the dip heads in their lifted positions during the major portion of their travel with the mold carriage, a fluid motor, and means for supplying fluid to the motor and causing it to hold a dip head above said track during said major portion of its travel, with the dip head supported a short distance above said position of support by the track, whereby upon failure of the supply of fluid to said motor to hold a dip head lifted at any point of its travel along the track, the support of the dip head is thereby transferred automatically to the track.

23. A machine for forming hollow glass articles comprising a mold carriage, an annular series of dip heads mounted for up and down movement thereon, molds carried by the dip heads, means for rotating the mold carriage about a vertical axis and thereby bringing the molds in succession to a dipping station, each said dip head being free to be lowered and lifted while traveling through said station, a stationary track extending along the path of the dip heads in position to support them in their lifted positions during the major portion of their travel with the mold carriage, air motors individual to the dip heads, and means for supplying air under pressure to the air motors for operating them, said motors being operatively connected to the dip heads for lifting them and holding them lifted above the position in which they are supported by the track and independently of said track throughout said major portion of their travel, whereby said track automatically takes the support of a dip head when its said air motor through a failure of insufficiency of the air pressure supply thereto, fails to hold the dip head in its fully lifted position.

24. A machine for forming hollow glass articles comprising a mold carriage rotatable about a vertical axis, an annular series of dip heads on the carriage, suction gathering molds carried by the dip heads, an annular track surrounding and concentric with the axis of the mold carriage and along which the dip heads advance, said track comprising a major stationary section and a minor section movable up and down, means for effecting an operative connection between each dip head and said movable track section while the dip head is traveling along said movable section, means for effecting a lowering and lifting movement of each dip head while connected with said movable section, said stationary section being operative to hold the dip head in its lifted position while disconnected from said movable section, and means for holding each dip head lifted independently of said stationary section while the dip head is traveling along said stationary section, with the dip head a short distance above the position in which it is supported by said stationary section, so that upon failure of the last mentioned means to hold the dip head lifted at any point of its travel along said track, the support of the dip head is automatically transferred to the track.

25. A machine for forming hollow glass articles comprising a mold carriage rotatable about a vertical axis, an annular series of dip heads on the carriage, suction gathering molds carried by the dip heads, an annular track surrounding and concentric with the axis of the mold carriage and along which the dip heads travel, said track comprising a major stationary section and a minor section movable up and down, means for effecting an operative connection between each dip head and said movable track section while the dip head is traveling along said movable section, air motors individual to the dip heads and operable to lift each dip head while the latter is connected to said movable track section, and means for causing said air motors to support the dip heads in their lifted positions while the latter are traveling along said stationary track section, the parts being so arranged that said track automatically takes the support of a dip head when a said air motor fails to hold it in its fully lifted position.

26. An Owens type suction machine for forming glass articles, comprising a finishing mold carrier, a finishing mold thereon, a vertically disposed hydraulic piston motor for lifting the mold carrier, a hydraulic circuit for the motor, an operating liquid in said circuit, said motor comprising a cylinder and a piston movable up and down therein and connected to the carrier, and a means for cushioning the mold carrier as it completes its downward movement, said cushioning means comprising a throttle valve in the hydraulic circuit of the motor and positioned exteriorly to the motor, said valve including a plunger in the path of the mold carrier and operated thereby to gradually cut off the flow of fluid being discharged from the motor.

27. A machine for molding glass articles comprising a mold carriage, molds thereon, driving means for continuously rotating the mold carriage and causing the molds to traverse a charging station, means for introducing a charge of glass by suction into each mold as it traverses the charging station, said driving means including a motor operating at a constant speed, a train of gears interposed between the motor and the mold carriage, and means for automatically reducing the speed of the mold carriage during each charge gathering operation, said speed reducing means comprising mechanism for shifting certain of said gears and causing the shifting movement of the gears to change the speed ratio between the motor and the mold carriage.

28. The combination of a rotary mold carriage, molds thereon, a motor, a gear train providing a driving connection between the motor and the mold carriage, said train including concentric gears and an intermediate gear providing a driving connection therebetween, and automatic means for periodically oscillating said intermediate gear about the axis of said concentric gears and thereby varying the speed ratio between said concentric gears.

29. The combination of a rotary mold carriage, molds thereon, a motor, a gear train providing a driving connection between the motor and the mold carriage, said train including concentric gears and an intermediate gear providing a driving connection therebetween, and automatic means for periodically oscillating said intermediate gear about the axis of said concentric gears and thereby varying the speed ratio between said concentric gears, said gear oscillating means being interconnected with said gear train for synchronizing said oscillations with the movements of the mold carriage and timing them to effect a slowing down of the mold carriage while each mold is traversing a charge receiving station.

30. A machine for molding glass articles comprising a mold carriage, an annular series of molds thereon, a drive shaft geared to the mold carriage, a continuously driven electric motor, gear mechanism interposed between the motor and said drive shaft, said mechanism including a ring gear driven by the motor and rotatable about the axis of said drive shaft, a gear keyed to the drive shaft, a pinion providing a driving connection between said last mentioned gear and the ring gear, and means for periodically oscillating said pinion about the axis of the drive shaft and thereby alternately accelerating and decelerating the movement of the mold carriage.

31. A machine for molding glass articles comprising a mold carriage, an annular series of molds thereon, a drive shaft geared to the mold carriage, a continuously driven electric motor, gear mechanism interposed between the motor and said drive shaft, said mechanism including a ring gear driven by the motor and rotatable about the axis of said drive shaft, a gear keyed to the drive shaft, a pinion providing a driving connection between said last mentioned gear and the ring gear, and means for accelerating and decelerating the movement of the mold carriage including a carrier on which said pinion is mounted, a shaft connected to be driven by the motor, a crank carried by said last mentioned shaft, and a connecting rod between said crank and carrier for causing the rotation of the crank to oscillate said carrier.

32. A machine for forming glass articles comprising a mold carriage, means for rotating the carriage, a dip head on the carriage, a mold carried by the dip head, means for periodically lowering and lifting the dip head, means for introducing a charge of glass into the mold while in its lowered position, and locking mechanism separate from the dip head lifting means for locking the dip head in its lifted position without interfering with the continued rotation of the mold carriage, said locking mechanism comprising a locking bar mounted separately from the dip head and movable into and out of a locking position in which it locks the dip head in its lifted position, a hand lever operatively connected to the locking bar and operable while the carriage is rotating to move the locking bar to and from said locking position, and means for holding the locking bar and hand lever with the locking bar in locking position during said continued rotation of the mold carriage and until the locking bar is manually released by the hand lever, while the means for lifting the dip head is free for idle movement, said hand lever being operative to release the locking bar during the rotation of the mold carriage.

33. A machine for forming glass articles comprising a mold carriage, a dip head thereon, a suction gathering mold on the dip head, means for rotating the mold carriage and bringing the dip head and mold periodically to a charge gathering station, a motor for lowering and lifting the dip head while traversing said station, and a locking device mounted to rotate with the mold carriage and operable manually to lock the dip head in its lifted position while the motor is free for idle movement and causing the dip head to remain in its lifted position while traversing the gathering station, said locking device comprising a locking bar movable into and out of locking position, a hand lever operatively connected to the locking bar, means for holding the locking bar continuously in said locking position until released by the hand lever, and means for holding the locking bar continuously in released position until moved therefrom by the hand lever.

34. A machine for forming glass articles comprising a mold carriage, a dip head thereon, a suction gathering mold on the dip head, means for rotating the mold carriage and bringing the dip head and mold periodically to a charge gathering station, a motor for lowering and lifting the dip head while traversing said station, a locking device mounted to rotate with the mold carriage and operable manually to lock the dip head in its lifted position while the motor is free for idle movement and causing the dip head to remain in its lifted position while traversing the gathering station, said locking device comprising a locking bar movable into and out of locking position, a hand lever operatively connected to the locking bar, means for holding the locking bar continuously in said locking position until released by the hand lever, and means for holding the locking bar continuously in released position until moved therefrom by the hand lever, means for opening and closing the mold, and means for holding the mold open while the dip head is locked in its lifted position.

35. A machine for forming glass articles comprising a mold carriage, a dip head thereon, a suction gathering mold on the dip head, means for rotating the mold carriage and bringing the dip head and mold periodically to a charge gathering station, means for lowering and lifting the dip head while traversing said station, means for opening and closing the mold, a locking device for locking the mold in its open position, a locking device for holding the dip head in its lifted position, and manually operable interconnected mechanisms for actuating said locking devices for holding the dip head lifted and the mold open during any predetermined time interval while the normal rotation of the mold carriage is continued.

36. In a machine of the character described, the combination of a rotating mold carriage, a mold carrier thereon, a mold on the carrier, a fluid operated motor for lifting the carrier, said motor comprising a cylinder and a piston reciprocating therein, valves controlling the supply of fluid to the motor at opposite sides of the piston respectively, mechanism mechanically interconnecting said valves for simultaneous operation, and stationary cams in the path of said mechanism and operable respectively to actuate said mechanism in opposite directions.

37. In a machine of the character described, the combination of a rotating mold carriage, a mold carrier thereon, a piston motor connected to said carrier and operable when the motor piston is moved in one direction, to lift the carrier, a fluid circuit for the motor, a valve in said fluid circuit operable to control the supply of fluid to the motor for lifting the said carrier, a second valve in said fluid circuit operable to control a supply of fluid for operating the motor in the reverse direction, mechanical means interconnecting the valves for simultaneous operation, a stationary cam operable when the mold carriage reaches a predetermined position, to actuate said interconnected means and simultaneously operate the valves, each in one direction, and means for operating the valves simultaneously in the reverse direction.

38. A machine for molding glass articles comprising a mold carriage, a parison mold thereon including a body blank mold, means for forming a parison in the parison mold, means for opening said body blank mold and suspending the bare parison, a finishing mold carrier mounted to rotate with the mold carriage, a finishing mold on said carrier, a fluid operated piston motor operable to lift the carrier and thereby bring the open finishing mold into position to be closed around the suspended parison, and automatic means to prevent the lifting of the mold carrier upon failure of the body blank mold to open.

39. A machine for molding glass articles comprising a mold carriage, a parison mold thereon including a body blank mold, means for forming a parison in the parison mold, means for opening said body blank mold and suspending the bare parison, a finishing mold carrier mounted to rotate with the mold carriage, a finishing mold on said carrier, a fluid operated piston motor operable to lift the carrier and thereby bring the open finishing mold into position to be closed around the suspended parison, automatic safety valve mechanism controlling the fluid circuits for said piston motor, and means controlled by the opening movement of the blank mold to actuate said safety valve mechanism.

40. A machine for molding glass articles comprising a mold carriage, a parison mold thereon including a body blank mold, means for forming a parison in the parison mold, means for opening said body blank mold and suspending the bare parison, a finishing mold carrier mounted to rotate with the mold carriage, a finishing mold on said carrier, a fluid operated piston motor operable to lift the carrier and thereby bring the open finishing mold into position to be closed around the suspended parison, a lifting valve controlling the supply of fluid pressure to the motor for lifting the mold carrier, an automatic safety valve, means actuated by the mold carrier during its upward movement to actuate said safety valve and thereby effect a control of the fluid circuits by which operating pressure is cut off from said motor and the upward movement of the carrier arrested, and means operated by the opening movement of the blank mold to render said safety valve ineffective to control said circuits.

41. A machine for molding glass articles comprising a mold carriage, a parison mold thereon including a body blank mold, means for forming a parison in the parison mold, means for opening said body blank mold and suspending the bare parison, a finishing mold carrier mounted to rotate with the mold carriage, a finishing mold on said carrier, a fluid operated piston motor operable to lift the carrier and thereby bring the open finishing mold into position to be closed around the suspended parison, a lifting valve controlling the supply of fluid pressure to the motor for lifting the mold carrier, an automatic safety valve, means actuated by the mold carrier during its upward movement to actuate said safety valve and thereby effect a control of the fluid circuits by which operating pressure is cut off from said motor and the upward movement of the carrier arrested, means operated by the opening movement of the blank mold to render said safety valve ineffective to control said circuits, and manual means for actuating and setting said safety valve for preventing the motor from lifting the mold carrier.

42. The combination of a rotating mold carriage, a blank mold thereon, a finishing mold carrier movable up and down on the mold carriage, a finishing mold on the carrier, a fluid operated piston motor arranged to lift the mold carrier, a fluid circuit for said motor, an automatic safety valve controlling the flow of fluid in said circuit, said valve being movable into a position in which it is operable to cut off fluid pressure to the piston motor and to a position in which it is ineffective to cut off fluid pressure to the motor, and a second valve controlling the operation of said first mentioned valve, said second valve being arranged to be actuated by the opening movement of the blank mold and thereby render the safety valve ineffective for controlling said circuit for the motor.

43. A machine for molding glass articles comprising a rotating mold carriage, a blank mold thereon, means cooperating with the mold for forming and suspending a parison of glass, a finishing mold unit comprising a mold carrier, a finishing mold, a hydraulic piston motor for lifting the carrier and a hydraulic motor for closing the finishing mold around the suspended parison, motor valves operable to control the supply of fluid to said motors for actuating the latter, a safety interlocking valve controlling the fluid circuits for said motor valves, and means for actuating said interlocking valve and thereby preventing the operation of said motor valves.

44. A machine for molding glass articles comprising a rotating mold carriage, a blank mold thereon, means cooperating with the mold for forming and suspending a parison of glass, a finishing mold unit comprising a mold carrier, a finishing mold, a hydraulic piston motor for lifting the carrier and a hydraulic motor for closing the finishing mold around the suspended parison, motor valves operable to control the supply of fluid to said motors for actuating the latter, a safety interlocking valve controlling the fluid circuits for said motor valves, an automatic safety valve mechanism operable to effect an operation of the interlocking valve by which operating pressure is cut off from the said motors so that lifting and closing of the finishing mold are prevented, and means operated by the opening movement of the blank mold to render said safety valve mechanism ineffective.

45. In a machine of the character described, the combination of a finishing mold unit comprising a mold carrier, a finishing mold thereon, a piston motor for lifting the carrier, a piston motor for opening and closing said mold, and hydraulic circuits and valve mechanism controlling the operation of said piston motors, including a safety interlocking valve operable by fluid pressure and controlling fluid pressure lines leading to said motors, an automatic safety valve controlling the fluid pressure supply for operating the safety interlocking valve, and means for operating said automatic safety valve and thereby effecting an operation of the safety interlocking valve by which the supply of fluid pressure to the piston motors is cut off.

46. A machine for molding glass articles comprising a rotating mold carriage, a series of parison molds thereon, a series of finishing mold units each comprising a mold carrier, a finishing mold thereon, a piston motor for opening and closing the finishing mold, and a piston motor for lifting the carrier, hydraulic fluid circuits and valve mechanism controlling the supply of operating fluid to the motors including mold lifting valves individual to the mold carriers and controlling the supply of fluid pressure to the motors for lifting the carriers, valves controlling the motors for opening and closing the finishing molds, automatic safety valves individual to said carriers, automatic means for actuating said safety valves, and manual means for selectively operating the safety valves and thereby preventing the operation of the said piston motors of the corresponding units without interfering with the continued operation of the other units.

47. A machine for forming glass articles, comprising a mold carriage, a series of dip heads thereon, suction gathering molds on the dip heads, means for rotating the mold carriage and bringing the dip heads in succession to a charge-gathering station, a motor operable automatically to effect a lowering and lifting of each dip head while traversing said station, and locking devices individual to the dip heads and each operable manually to lock the associated dip head in its lifted position while said motor is free to operate idly, and to hold the dip head in said lifted position while traversing the gathering station, each said locking device comprising a locking element movable into and out of a locking position in which the dip head is locked thereby in said lifted position, and a hand lever operatively connected to said locking element for effecting said movements of the locking element, and means for holding the locking element in each of said positions until released by said hand lever.

48. A machine for forming glass articles, comprising a mold carriage, a series of dip heads thereon, suction gathering molds on the dip heads, means for rotating the mold carriage and bringing the dip heads in succession to a charge-gathering station, a motor operable automatically to effect a lowering and lifting of each dip head while traversing said station, means for opening and closing the molds, and locking mechanisms individual to the dip heads, each said locking mechanism including a locking device operable to hold the associated dip head in its lifted position and cause it to remain in its lifted position while traversing the gathering station and also comprising a second locking device operable to lock the mold in open position while the dip head is locked in its lifted position.

49. A machine for forming glass articles, comprising a mold carriage, a series of dip heads thereon, suction gathering molds on the dip heads, means for rotating the mold carriage and bringing the dip heads in succession to a charge-gathering station, a motor operable automatically to effect a lowering and lifting of each dip head while traversing said station, locking mechanisms individual to the dip heads, each said mechanism comprising a lock for locking the associated dip head in its lifted position, a second lock for locking the associated mold in open position while the dip head is locked, and a manually operable device for actuating said locks.

JOSEPH P. BENOIT.
CLARENCE C. KINKER.
RUSSELL G. ALLEN.
HAROLD A. ROHRICH.
CARL W. SCHREIBER.